United States Patent
Kim et al.

(10) Patent No.: US 11,246,157 B2
(45) Date of Patent: *Feb. 8, 2022

(54) METHOD AND USER EQUIPMENT FOR TRANSMITTING RANDOM ACCESS CHANNEL SIGNAL, AND METHOD AND BASE STATION FOR RECEIVING RANDOM ACCESS CHANNEL SIGNAL

(71) Applicant: LG Electronics Inc., Seoul (KR)

(72) Inventors: Eunsun Kim, Seoul (KR); Hyunsoo Ko, Seoul (KR); Kijun Kim, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/425,481

(22) Filed: May 29, 2019

(65) Prior Publication Data

US 2019/0281624 A1    Sep. 12, 2019

Related U.S. Application Data

(63) Continuation of application No. PCT/KR2018/004959, filed on Apr. 27, 2018.
(Continued)

(51) Int. Cl.
*H04W 74/00*    (2009.01)
*H04L 5/00*    (2006.01)
(Continued)

(52) U.S. Cl.
CPC ........... *H04W 74/004* (2013.01); *H04J 13/00* (2013.01); *H04L 5/0007* (2013.01); *H04L 27/26* (2013.01);
(Continued)

(58) Field of Classification Search
CPC ........... H04W 74/004; H04W 72/0453; H04W 74/0833; H04L 5/0007; H04L 27/2607
See application file for complete search history.

(56) References Cited

U.S. PATENT DOCUMENTS

2009/0067540 A1   3/2009 Lee et al.
2010/0232318 A1   9/2010 Sarkar
(Continued)

FOREIGN PATENT DOCUMENTS

CN    101159476    4/2008
CN    101335986    12/2008
(Continued)

OTHER PUBLICATIONS

ZTE, ZTE Microelectronics, "PRACH Design Considerations", R1-1701580, 3GPP TSG RAN WG1 Meeting #88, Athens, Greece, Feb. 13-17, 2017, 13 pages.
(Continued)

*Primary Examiner* — Benjamin H Elliott, IV
*Assistant Examiner* — Nevena Zecevic Sandhu
(74) *Attorney, Agent, or Firm* — Fish & Richardson P.C.

(57) ABSTRACT

A user equipment in a wireless communication system receives RACH configuration information including preamble format information indicating a first format and transmits a RACH preamble with the first format. The RACH preamble with the first format includes a cyclic prefix (CP) part and a sequence part in a time domain. The RACH preamble with the first format satisfies: a CP length of the RACH preamble of the first format is N times a CP length $N_{CP}$ of an orthogonal frequency division multiplexing (OFDM) symbol, where N is the number of OFDM symbols used to transmit a RACH preamble and is greater than 1.

18 Claims, 36 Drawing Sheets

Related U.S. Application Data

(60) Provisional application No. 62/501,086, filed on May 3, 2017, provisional application No. 62/507,752, filed on May 17, 2017, provisional application No. 62/517,198, filed on Jun. 9, 2017, provisional application No. 62/535,941, filed on Jul. 23, 2017.

(51) Int. Cl.
*H04L 27/26* (2006.01)
*H04W 72/04* (2009.01)
*H04W 74/08* (2009.01)
*H04J 13/00* (2011.01)

(52) U.S. Cl.
CPC ...... *H04L 27/2607* (2013.01); *H04L 27/2692* (2013.01); *H04W 72/0453* (2013.01); *H04W 74/002* (2013.01); *H04W 74/08* (2013.01); *H04W 74/0833* (2013.01)

(56) References Cited

U.S. PATENT DOCUMENTS

| | | | |
|---|---|---|---|
| 2012/0051251 | A1 | 3/2012 | Seo et al. |
| 2013/0315342 | A1* | 11/2013 | Um ............ H04L 27/2602 375/295 |
| 2014/0098761 | A1 | 4/2014 | Lee et al. |
| 2014/0241186 | A1* | 8/2014 | Garcia ............ H04W 24/02 370/252 |
| 2015/0078219 | A1 | 3/2015 | Li et al. |
| 2016/0337988 | A1 | 11/2016 | Nan et al. |
| 2017/0135135 | A1 | 5/2017 | Pelletier et al. |
| 2018/0220466 | A1* | 8/2018 | Park ............ H04W 74/0833 |
| 2018/0324870 | A1* | 11/2018 | Noh ............ H04W 74/006 |
| 2019/0313464 | A1 | 10/2019 | Einhaus et al. |
| 2019/0350010 | A1 | 11/2019 | Guo et al. |

FOREIGN PATENT DOCUMENTS

| | | |
|---|---|---|
| CN | 101809896 | 8/2010 |
| JP | 2010536223 | 11/2010 |
| JP | 2015537422 | 12/2015 |
| KR | 20080112077 | 12/2008 |
| KR | 1020100020472 | 2/2010 |
| KR | 101134820 | 4/2012 |
| KR | 101226819 | 1/2013 |
| KR | 20130020803 | 2/2013 |
| KR | 101430462 | 8/2014 |
| KR | 101540418 | 7/2015 |
| KR | 101586158 | 1/2016 |
| KR | 1020160030252 | 3/2016 |
| KR | 20160082247 | 7/2016 |
| RU | 2446596 | 3/2012 |
| WO | WO2003010994 | 2/2003 |
| WO | WO2005055527 | 6/2005 |
| WO | WO2009023681 | 2/2009 |

OTHER PUBLICATIONS

Samsung, ZTE, ZTE Microelectronics, Ericsson, NTT DOCOMO, "WF on RACH preamble format", R1-1703741, 3GPP TSG RAN WG1 #88, Athens, Greece, Feb. 13-17, 2017, 3 pages.

U.S. Appl. No. 62/474,053, Sukhyon Yoon, et al., RACH Resource Construction and Allocation Method in Multi Beam Scenario, filed Mar. 20, 2017, 23 pages (with English translation).

Intel Corporation, "PRACH Preamble and Resource Allocation," 3GPP TSG RAN WG1 Meeting NR Ad-hoc, R1-1700332, dated Jan. 16-20, 2017, 8 pages.

Samsung, "RACH preamble design," 3GPP TSG RAN WG1 #88, R1-1702908, dated Feb. 13-17, 2017, 10 pages.

Huawei et al., "RACH preamble design for NR," 3GPP TSG RAN WG1 NR Ad Hoc Meeting, R1-1700034, dated Jan. 16-20, 2017, 13 pages.

Ericsson, "NR PRACH design," R1-1702127, 3GPP TSG-RAN WG1 Meeting #88, Athens, Greece, dated Feb. 13-17, 2017, 19 pages, XP051209287.

Extended European Search Report in European Application No. 18795177.7, dated Feb. 10, 2020, 10 pages.

Huawei, HiSilicon, "Multiple/repeated PRACH preamble formats for NR," R1-1705056, 3GPP TSG RAN WG1 Meeting #88bis, Spokane, USA, dated Apr. 3-7, 2017, 9 pages, XP051243187.

Russian Office Action in Russian Application No. 2019139050, dated Feb. 27, 2020, 17 pages (with English translation).

United States Notice of Allowance in U.S. Appl. No. 16/065,443, dated Nov. 27, 2019, 7 pages.

CATT, "Short random access preamble parameters considerations for FS2," R1-080521, 3GPP TSG RAN WG1 Meeting #51bis, Sevilla, Spain, dated Jan. 14-18, 2008, 3 pages.

Japanese Office Action in Japanese Application No. 2019-521442, dated Jul. 7, 2020, 4 pages (with English translation).

LG Electronics, "Discussion on NR PRACH Preamble for Single-beam and Multi-beam Operation," R1-1611790, 3GPP TSG RAN WG1 Meeting #87, Reno, USA, dated Nov. 14-18, 2016, 4 pages.

NTT Docomo, Inc., "NR PRACH design," R1-1702830, 3GPP TSG RAN WG1 Meeting #88, Athens, Greece, dated Feb. 13-17, 2017, 10 pages.

ZTE Corporation, ZTE Microelectronics, "Random access preamble structure and signaling," R1-1611271, 3GPP TSG RAN WG1 Meeting #87, Reno, USA, dated Nov. 14-18, 2016, 6 pages.

ZTE, ZTE Microelectronics, "PRACH Design Considerations," R1-1700103, 3GPP TSG RAN WG1 AH_NR Meeting, Spokane, USA, dated Jan. 16-20, 2017, 8 pages.

Office Action in Chinese Appln. No. 201880027470.3, dated Sep. 22, 2021, 13 pages (with English translation).

* cited by examiner

FIG. 18

(Slot position, Starting OFDM symbol position for preamble, Preamble format #X, Number of sequence repetition, # of Preamble)

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| CP | SEQ | SEQ | SEQ | SEQ | CP | SEQ | SEQ | SEQ | SEQ | | | | |

$N^{th}$ SLOT (N = 0,...,19, SS block periodicity = 20)

RACH slot        RACH slot

{N, 0, Preamble format #1, 4, 1} {N, 5, Preamble format #1, 4, 1}

FIG. 19

| | | ZC index (OCC index, Cyclic shift version) | | | | | | |
|---|---|---|---|---|---|---|---|---|
| | | (0,0) | (0,1) | (0,2) | (0,3) | (1,0) | (1,1) | (1,2) | (1,3) |
| root code index | 15 | SS block #N | | | | | | | → |
| | 27 | | | | | | | | → |
| | 127 | SS block #N+1 | | | | | | | → |
| | 138 | | | | | | | | → |

symbol index  0  1  2  3  4  5  6  7  8  9  10  11  12  13

| DC | Gap/DC /DD | DD/UD | DD/UD | DD/UD | DD/UD | DD/UD | DD/UD | DD/UD | DD/UD | DD/UD | DD/UD | DD/UD | UC/UD |

DC : DL control
DD : DL data
UD : UL Data
UC : UL Control (b)

symbol index  0  1  2  3  4  5  6

| DC | Gap/DC /DD | DD/UD | DD/UD | DD/UD | DD/UD | UC/UD |

DC : DL control
DD : DL data
UD : UL Data
UC : UL Control

FIG. 33
< Slot Type A >
(a) preamble format with 12 symbols 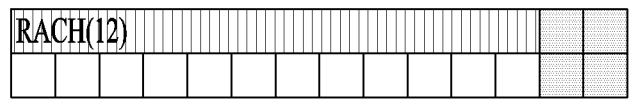
(b) preamble format with 6 symbols 
(c) preamble format with 4 symbols 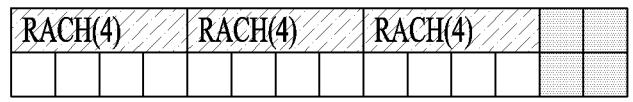
(d) preamble format with 3 symbols 
(e) preamble format with 2 symbols 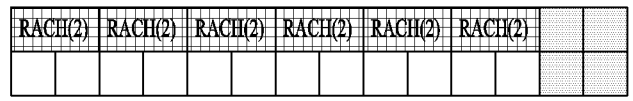
(f) preamble format with 1 symbols 

FIG. 34
< Slot Type B >
(a) preamble format with 12 symbols
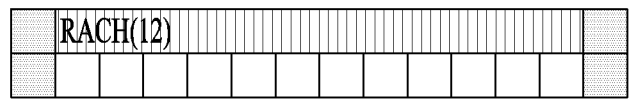
(b) preamble format with 6 symbols
(c) preamble format with 4 symbols
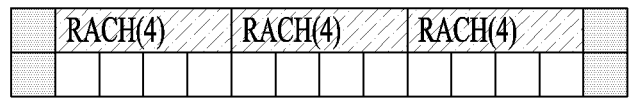
(d) preamble format with 3 symbols
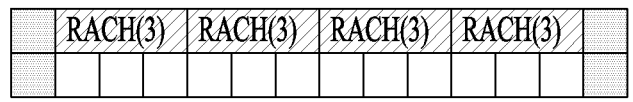
(e) preamble format with 2 symbols
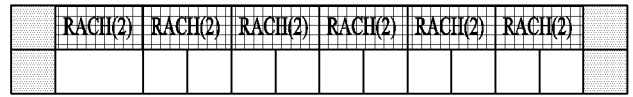
(f) preamble format with 1 symbols
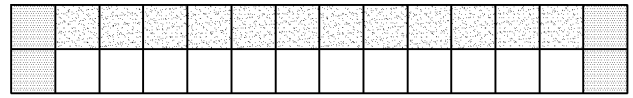

FIG. 35
< Slot Type C >
(a) preamble format with 12 symbols
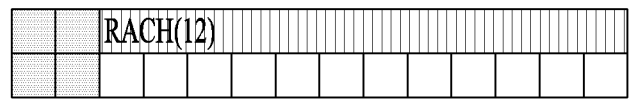
(b) preamble format with 6 symbols
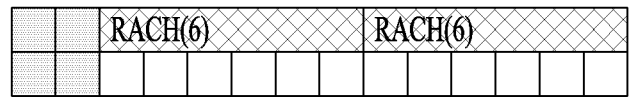
(c) preamble format with 4 symbols
(d) preamble format with 3 symbols
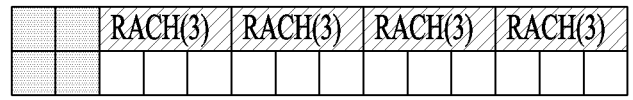
(e) preamble format with 2 symbols
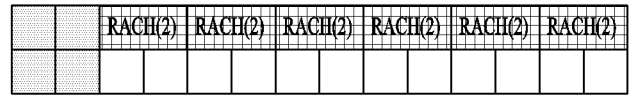
(f) preamble format with 1 symbols

METHOD AND USER EQUIPMENT FOR TRANSMITTING RANDOM ACCESS CHANNEL SIGNAL, AND METHOD AND BASE STATION FOR RECEIVING RANDOM ACCESS CHANNEL SIGNAL

CROSS-REFERENCE TO RELATED APPLICATIONS

This application is a continuation of International Application No. PCT/KR2018/004959, filed on Apr. 27, 2018, which claims the benefit of U.S. Provisional Application No. 62/501,086, filed on May 3, 2017, U.S. Provisional Application No. 62/507,752, filed on May 17, 2017, U.S. Provisional Application No. 62/517,198, filed on Jun. 9, 2017, and U.S. Provisional Application No. 62/535,941, filed on Jul. 23, 2017. The disclosures of the prior applications are incorporated by reference in their entirety.

TECHNICAL FIELD

The present invention relates to a wireless communication system. More particularly, the present invention relates to a method and apparatus for transmitting/receiving a random access channel (RACH) signal.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services anytime and anywhere by connecting a plurality of devices and objects to each other is one main issue to be considered in future-generation communication.

Further, a communication system to be designed in consideration of services/UEs sensitive to reliability and latency is under discussion. The introduction of future-generation RAT has been discussed by taking into consideration eMBB communication, mMTC, ultra-reliable and low-latency communication (URLLC), and the like.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

In addition, a signal transmission/reception method is required in the system supporting new radio access technologies using high frequency bands.

The technical objects that can be achieved through the present invention are not limited to what has been particularly described hereinabove and other technical objects not described herein will be more clearly understood by persons skilled in the art from the following detailed description.

Technical Solution

According to an aspect of the present invention, provided herein is a method of transmitting a random access channel (RACH) signal by a user equipment in a wireless communication system. The method includes receiving RACH configuration information including preamble format information indicating a first format; and transmitting a RACH preamble with the first format. The RACH preamble with the first format includes a cyclic prefix (CP) part and a sequence part in a time domain. The RACH preamble with the first format satisfies: a CP length of the RACH preamble with the first format is N times a CP length $N_{CP}$ of an orthogonal frequency division multiplexing (OFDM) symbol, where N is the number of OFDM symbols used for transmission of a RACH preamble and is greater than 1.

According to another aspect of the present invention, provided herein is a user equipment for transmitting a random access channel (RACH) signal in a wireless communication system. The user equipment includes a transceiver, and a processor configured to control the transceiver.

The processor is configured to: control the transceiver to receive RACH configuration information including preamble format information indicating a first format; and control the transceiver to transmit a RACH preamble with the first format. The RACH preamble with the first format includes a cyclic prefix (CP) part and a sequence part in a time domain. The RACH preamble with the first format satisfies: a CP length of the RACH preamble with the first format is N times a CP length $N_{CP}$ of an orthogonal frequency division multiplexing (OFDM) symbol, where N is the number of OFDM symbols used for transmission of a RACH preamble and is greater than 1.

According to another aspect of the present invention, provided herein is a method of receiving a random access channel (RACH) signal by a base station in a wireless communication system. The method includes transmitting RACH configuration information including preamble format information indicating a first format; and detecting a RACH preamble with the first format. The RACH preamble with the first format includes a cyclic prefix (CP) part and a sequence part in a time domain. The RACH preamble of the first format satisfies: a CP length of the RACH preamble with the first format is N times a CP length $N_{CP}$ of an orthogonal frequency division multiplexing (OFDM) symbol, where N is the number of OFDM symbols used for transmission of a RACH preamble and is greater than 1.

According to another aspect of the present invention, provided herein is a base station for receiving a random access channel (RACH) signal in a wireless communication system. The base station includes a transceiver, and a processor configured to control the transceiver. The processor is configured to: control the transceiver to transmit RACH configuration information including preamble format information indicating a first format; and detect a RACH preamble with the first format. The RACH preamble with the first format includes a cyclic prefix (CP) part and a sequence part in a time domain. The RACH preamble with the first format satisfies: a CP length of the RACH preamble with the first format is N times a CP length $N_{CP}$ of an orthogonal frequency division multiplexing (OFDM) symbol, where N is the number of OFDM symbols used for transmission of a RACH preamble and is greater than 1.

In each aspect of the present invention, a length of the RACH preamble with the first format may be equal to a total length of OFDM symbols used for transmission of the RACH preamble of the first format.

In each aspect of the present invention, the first format may be a preamble format comprised of a CP part having a length of $N*144*T_s$ and a sequence part having a length of $N*2048*T_s$, where $T_s$ is a sampling time.

In each aspect of the present invention, $144*T_s$ may be equal to $N_{CP}$ and $2048*T_s$ may be equal to a length of a data part per OFDM symbol.

In each aspect of the present invention, the first format may be a preamble format having N being 2, 4, or 6.

In each aspect of the present invention, the sequence part may include a Zadoff-Chu sequence having a length of 139, N times.

In each aspect of the present invention, the RACH configuration information may further include information about a slot used for a RACH.

In each aspect of the present invention, when the preamble format information indicates a combination of the first preamble format and a second preamble format, the user equipment may transmit the RACH preamble with the first format in a RACH resource associated with a synchronization signal (SS) block detected by the user equipment among RACH resources of the slot if the associated RACH resource is not a last RACH resource of the slot in the time domain and transmit a RACH preamble with the second format in the associated RACH resource if the associated RACH resource is the last RACH resource of the slot.

In each aspect of the present invention, if the preamble format information indicates a combination of the first preamble format and a second preamble format, the base station may attempt to detect the RACH preamble with the first format in a RACH resource other than a last RACH resource of the slot in the time domain among RACH resources of the slot and attempt to detect a RACH preamble with the second format in the last RACH resource.

In each aspect of the present invention, the second format may be a preamble format including a guard time with no signal after a sequence part in the RACH preamble with the second format.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, a random access channel suitable for an NR system can be transmitted by a UE and received by a BS. The random access channel can be efficiently transmitted/received and therefore throughput of the NR system can be improved.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

FIG. 18 illustrates RACH time resource information.

FIG. 19 illustrates an example of allocating RACH preamble sequences.

FIG. 23 illustrates a slot structure.

FIGS. 33 to 35 illustrate locations of RACH resources in a slot according to RACH slot types.

MODE FOR CARRYING OUT THE INVENTION

Figure 1:
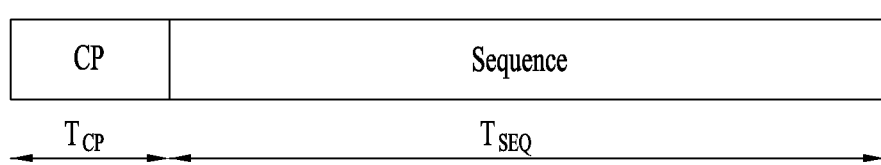
FIG. 1 illustrates a random access preamble format in a legacy LTE/LTE-A system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP based communication system, e.g. LTE/LTE-A, NR. However, the technical features of the present invention are not limited thereto. For example, although the following detailed description is given based on a mobile communication system corresponding to a 3GPP LTE/LTE-A/NR system, aspects of the present invention that are not specific to 3GPP LTE/LTE-A/NR are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In embodiments of the present invention described below, the term "assume" may mean that a subject to transmit a channel transmits the channel in accordance with the corresponding "assumption". This may also mean that a subject to receive the channel receives or decodes the channel in a form conforming to the "assumption", on the assumption that the channel has been transmitted according to the "assumption".

In the present invention, puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Particularly, a BS of a UTRAN is referred to as a Node-B, a BS of an E-UTRAN is referred to as an eNB, and a BS of a new radio access technology network is referred to as a gNB. In describing the present invention, a BS will be referred to as a gNB.

In the present invention, a node refers to a fixed point capable of transmitting/receiving a radio signal through communication with a UE. Various types of gNBs may be used as nodes irrespective of the terms thereof. For example, a BS, a node B (NB), an e-node B (eNB), a pico-cell eNB (PeNB), a home eNB (HeNB), gNB, a relay, a repeater, etc. may be a node. In addition, the node may not be a gNB. For example, the node may be a radio remote head (RRH) or a radio remote unit (RRU). The RRH or RRU generally has a lower power level than a power level of a gNB. Since the RRH or RRU (hereinafter, RRH/RRU) is generally connected to the gNB through a dedicated line such as an optical cable, cooperative communication between RRH/RRU and the gNB can be smoothly performed in comparison with cooperative communication between gNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with a gNB or a node which provides a communication service to the specific cell. In addition, a DL/UL signal of a specific cell refers to a DL/UL signal from/to a gNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between a gNB or node which provides a communication service to the specific cell and a UE. In the 3GPP based communication system, the UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node.

Meanwhile, a 3GPP based communication system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP communication standards use the concept of a cell to manage radio resources. The "cell"

associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

3GPP based communication standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of a gNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For terms and technologies which are not described in detail in the present invention, reference can be made to the standard document of 3GPP LTE/LTE-A, for example, 3GPP TS 36.211, 3GPP TS 36.212, 3GPP TS 36.213, 3GPP TS 36.321, and 3GPP TS 36.331 and the standard document of 3GPP NR, for example, 3GPP TS 38.211, 3GPP TS 38.212, 3GPP 38.213, 3GPP 38.214, 3GPP 38.215, 3GPP TS 38.321, and 3GPP TS 36.331.

In an LTE/LTE-A system, when a UE is powered on or desires to access a new cell, the UE perform an initial cell search procedure including acquiring time and frequency synchronization with the cell and detecting a physical layer cell identity $N^{cell}_{ID}$ of the cell. To this end, the UE may receive synchronization signals, for example, a primary synchronization signal (PSS) and a secondary synchronization signal (SSS), from an eNB to thus establish synchronization with the eNB and acquire information such as a cell identity (ID). After the initial cell search procedure, the UE may perform a random access procedure to complete access to the eNB. To this end, the UE may transmit a preamble through a physical random access channel (PRACH) and receive a response message to the preamble through a PDCCH and a PDSCH. After performing the aforementioned procedures, the UE may perform PDCCH/PDSCH reception and PUSCH/PUCCH transmission as a normal UL/DL transmission procedure. The random access procedure is also referred to as a random access channel (RACH) procedure. The random access procedure is used for various purposes including initial access, adjustment of UL synchronization, resource assignment, and handover.

After transmitting the RACH preamble, the UE attempts to receive a random access response (RAR) within a preset time window. Specifically, the UE attempts to detect a PDCCH with a random access radio network temporary identifier (RA-RNTI) (hereinafter, RA-RNTI PDCCH) (e.g., CRC is masked with RA-RNTI on the PDCCH) in the time window. In detecting the RA-RNTI PDCCH, the UE checks the PDSCH corresponding to the RA-RNTI PDCCH for presence of an RAR directed thereto. The RAR includes timing advance (TA) information indicating timing offset information for UL synchronization, UL resource allocation information (UL grant information), and a temporary UE identifier (e.g., temporary cell-RNTI (TC-RNTI)). The UE may perform UL transmission (of, e.g., Msg3) according to the resource allocation information and the TA value in the RAR. HARQ is applied to UL transmission corresponding to the RAR. Accordingly, after transmitting Msg3, the UE may receive acknowledgement information (e.g., PHICH) corresponding to Msg3.

FIG. 1 illustrates a random access preamble format in a legacy LTE/LTE-A system.

In the legacy LTE/LTE-A system, a random access preamble, i.e., a RACH preamble, includes a cyclic prefix having a length $T_{CP}$ and a sequence part having a length $T_{SEQ}$ in a physical layer. The parameter values $T_{CP}$ and $T_{SEQ}$ are listed in the following table, and depend on the frame structure and the random access configuration. Higher layers control the preamble format. In the 3GPP LTE/LTE-A system, PRACH configuration information is signaled through system information and mobility control information of a cell. The PRACH configuration information indicates a root sequence index, a cyclic shift unit $N_{CS}$ of a Zadoff-Chu sequence, the length of the root sequence, and a preamble format, which are to be used for a RACH procedure in the cell. In the 3GPP LTE/LTE-A system, a PRACH opportunity, which is a timing at which the preamble format and the RACH preamble may be transmitted, is indicated by a PRACH configuration index, which is a part of the RACH configuration information (refer to Section 5.7 of 3GPP TS 36.211 and "PRACH-Config" of 3GPP TS 36.331). The length of the Zadoff-Chu sequence used for the RACH preamble is determined according to the preamble format (refer to Table 4)

TABLE 1

| Preamble format | $T_{CP}$ | $T_{SEQ}$ |
| --- | --- | --- |
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4 | $448 \cdot T_s$ | $4096 \cdot T_s$ |

In the LTE/LTE-A system, the RACH preamble is transmitted in a UL subframe. The transmission of a random access preamble is restricted to certain time and frequency resources. These resources are called PRACH resources, and enumerated in increasing order of the subframe number within the radio frame and the PRBs in the frequency domain such that index 0 correspond to the lowest numbered PRB and subframe within the radio frame. Random access resources are defined according to the PRACH configuration index (refer to the standard document of 3GPP TS 36.211). The PRACH configuration index is given by a higher layer signal (transmitted by an eNB).

The sequence part of the RACH preamble (hereinafter, preamble sequence) uses a Zadoff-Chu sequence. The preamble sequences for RACH are generated from Zadoff-Chu sequences with zero correlation zone, generated from one or several root Zadoff-Chu sequences. The network configures the set of preamble sequences the UE is allowed to use. In the legacy LTE/LTE-A system, there are 64 preambles available in each cell. The set of 64 preamble sequences in a cell is found by including first, in the order of increasing cyclic shift, all the available cyclic shifts of a root Zadoff-Chu sequence with the logical index RACH_ROOT_SEQUENCE, where RACH_ROOT_SEQUENCE is broadcasted as part of the system information. Additional preamble sequences, in case 64 preambles cannot be generated from a single root Zadoff-Chu sequence, are obtained from the root sequences with the consecutive logical indexes until all the 64 sequences are found. The logical root sequence order is cyclic: the logical index 0 is consecutive to 837. The relation between a logical root sequence index and physical root sequence index u is given by Table 2 and Table 3 for preamble formats 0~3 and 4, respectively.

TABLE 2

| Logical root sequence number | Physical root sequence number u (in increasing order of 상기 corresponding logical sequnce number) |
| --- | --- |
| 0~23 | 129, 710, 140, 699, 120, 719, 210, 629, 168, 671, 84, 755, 105, 734, 93, 746, 70, 769, 60, 779, 2, 837, 1, 838 |
| 24~29 | 56, 783, 112, 727, 148, 691 |
| 30~35 | 80, 759, 42, 797, 40, 799 |

TABLE 2-continued

| Logical root sequence number | Physical root sequence number u (in increasing order of corresponding logical sequnce number) |
|---|---|
| 36~41 | 35, 804, 73, 766, 146, 693 |
| 42~51 | 31, 808, 28, 811, 30, 809, 27, 812, 29, 810 |
| 52~63 | 24, 815, 48, 791, 68, 771, 74, 765, 178, 661, 136, 703 |
| 64~75 | 86, 753, 78, 761, 43, 796, 39, 800, 20, 819, 21, 818 |
| 76~89 | 95, 744, 202, 637, 190, 649, 181, 658, 137, 702, 125, 714, 151, 688 |
| 90-115 | 217, 622, 128, 711, 142, 697, 122, 717, 203, 636, 118, 721, 110, 729, 89, 750, 103, 736, 61, 778, 55, 784, 15, 824, 14, 825 |
| 116~135 | 12, 827, 23, 816, 34, 805, 37, 802, 46, 793, 207, 632, 179, 660, 145, 694, 130, 709, 223, 616 |
| 136~167 | 228, 611, 227, 612, 132, 707, 133, 706, 143, 696, 135, 704, 161, 678, 201, 638, 173, 666, 106, 733, 83, 756, 91, 748, 66, 773, 53, 786, 10, 829, 9, 830 |
| 168~203 | 7, 832, 8, 831, 16, 823, 47, 792, 64, 775, 57, 782, 104, 735, 101, 738, 108, 731, 208, 631, 184, 655, 197, 642, 191, 648, 121, 718, 141, 698, 149, 690, 216, 623, 218, 621 |
| 204~263 | 152, 687, 144, 695, 134, 705, 138, 701, 199, 640, 162, 677, 176, 663, 119, 720, 158, 681, 164, 675, 174, 665, 171, 668, 170, 669, 87, 752, 169, 670, 88, 751, 107, 732, 81, 758, 82, 757, 100, 739, 98, 741, 71, 768, 59, 780, 65, 774, 50, 789, 49, 790, 26, 813, 17, 822, 13, 826, 6, 833 |
| 264~327 | 5, 834, 33, 806, 51, 788, 75, 764, 99, 740, 96, 743, 97, 742, 166, 673, 172, 667, 175, 664, 187, 652, 163, 676, 185, 654, 200, 639, 114, 725, 189, 650, 115, 724, 194, 645, 195, 644, 192, 647, 182, 657, 157, 682, 156, 683, 211, 628, 154, 685, 123, 716, 139, 700, 212, 627, 153, 686, 213, 626, 215, 624, 150, 689 |
| 328~383 | 225, 614, 224, 615, 221, 618, 220, 619, 127, 712, 147, 692, 124, 715, 193, 646, 205, 634, 206, 633, 116, 723, 160, 679, 186, 653, 167, 672, 79, 760, 85, 754, 77, 762, 92, 747, 58, 781, 62, 777, 69, 770, 54, 785, 36, 803, 32, 807, 25, 814, 18, 821, 11, 828, 4, 835 |
| 384~455 | 3, 836, 19, 820, 22, 817, 41, 798, 38, 801, 44, 795, 52, 787, 45, 794, 63, 776, 67, 772, 72, 767, 76, 763, 94, 745, 102, 737, 90, 749, 109, 730, 165, 674, 111, 728, 209, 630, 204, 635, 117, 722, 188, 651, 159, 680, 198, 641, 113, 726, 183, 656, 180, 659, 177, 662, 196, 643, 155, 684, 214, 625, 126, 713, 131, 708, 219, 620, 222, 617, 226, 613 |
| 456~513 | 230, 609, 232, 607, 262, 577, 252, 587, 418, 421, 416, 423, 413, 426, 411, 428, 376, 463, 395, 444, 283, 556, 285, 554, 379, 460, 390, 449, 363, 476, 384, 455, 388, 451, 386, 453, 361, 478, 387, 452, 360, 479, 310, 529, 354, 485, 328, 511, 315, 524, 337, 502, 349, 490, 335, 504, 324, 515 |
| 514~561 | 323, 516, 320, 519, 334, 505, 359, 480, 295, 544, 385, 454, 292, 547, 291, 548, 381, 458, 399, 440, 380, 459, 397, 442, 369, 470, 377, 462, 410, 429, 407, 432, 281, 558, 414, 425, 247, 592, 277, 562, 271, 568, 272, 567, 264, 575, 259, 580 |
| 562~629 | 237, 602, 239, 600, 244, 595, 243, 596, 275, 564, 278, 561, 250, 589, 246, 593, 417, 422, 248, 591, 394, 445, 393, 446, 370, 469, 365, 474, 300, 539, 299, 540, 364, 475, 362, 477, 298, 541, 312, 527, 313, 526, 314, 525, 353, 486, 352, 487, 343, 496, 327, 512, 350, 489, 326, 513, 319, 520, 332, 507, 333, 506, 348, 491, 347, 492, 322, 517 |
| 630~659 | 330, 509, 338, 501, 341, 498, 340, 499, 342, 497, 301, 538, 366, 473, 401, 438, 371, 468, 408, 431, 375, 464, 249, 590, 269, 570, 238, 601, 234, 605 |
| 660~707 | 257, 582, 273, 566, 255, 584, 254, 585, 245, 594, 251, 588, 412, 427, 372, 467, 282, 557, 403, 436, 396, 443, 392, 447, 391, 448, 382, 457, 389, 450, 294, 545, 297, 542, 311, 528, 344, 495, 345, 494, 318, 521, 331, 508, 325, 514, 321, 518 |
| 708~729 | 346, 493, 339, 500, 351, 488, 306, 533, 289, 550, 400, 439, 378, 461, 374, 465, 415, 424, 270, 569, 241, 598 |
| 730~751 | 231, 608, 260, 579, 268, 571, 276, 563, 409, 430, 398, 441, 290, 549, 304, 535, 308, 531, 358, 481, 316, 523 |
| 752~765 | 293, 546, 288, 551, 284, 555, 368, 471, 253, 586, 256, 583, 263, 576 |
| 766-777 | 242, 597, 274, 565, 402, 437, 383, 456, 357, 482, 329, 510 |
| 778~789 | 317, 522, 307, 532, 286, 553, 287, 552, 266, 573, 261, 578 |
| 790~795 | 236, 603, 303, 536, 356, 483 |
| 796~803 | 355, 484, 405, 434, 404, 435, 406, 433 |
| 804~809 | 235, 604, 267, 572, 302, 537 |
| 810~815 | 309, 530, 265, 574, 233, 606 |
| 816~819 | 367, 472, 296, 543 |
| 820~837 | 336, 503, 305, 534, 373, 466, 280, 559, 279, 560, 419, 420, 240, 599, 258, 581, 229, 610 |

TABLE 3

| Logical root sequence number | Physical root sequence number u (in increasing order of the corresponding logical sequence number) | | | | | | | | | | | | | | | | | | | |
|---|---|---|---|---|---|---|---|---|---|---|---|---|---|---|---|---|---|---|---|---|
| 0-19 | 1 | 138 | 2 | 137 | 3 | 136 | 4 | 135 | 5 | 134 | 6 | 133 | 7 | 132 | 8 | 131 | 9 | 130 | 10 | 129 |
| 20-39 | 11 | 128 | 12 | 127 | 13 | 126 | 14 | 125 | 15 | 124 | 16 | 123 | 17 | 122 | 18 | 121 | 19 | 120 | 20 | 119 |
| 40-59 | 21 | 118 | 22 | 117 | 23 | 116 | 24 | 115 | 25 | 114 | 26 | 113 | 27 | 112 | 28 | 111 | 29 | 110 | 30 | 109 |
| 60-79 | 31 | 108 | 32 | 107 | 33 | 106 | 34 | 105 | 35 | 104 | 36 | 103 | 37 | 102 | 38 | 101 | 39 | 100 | 40 | 99 |
| 80-99 | 41 | 98 | 42 | 97 | 43 | 96 | 44 | 95 | 45 | 94 | 46 | 93 | 47 | 92 | 48 | 91 | 49 | 90 | 50 | 89 |
| 100-119 | 51 | 88 | 52 | 87 | 53 | 86 | 54 | 85 | 55 | 84 | 56 | 83 | 57 | 82 | 58 | 81 | 59 | 80 | 60 | 79 |
| 120-137 | 61 | 78 | 62 | 77 | 63 | 76 | 64 | 75 | 65 | 74 | 66 | 73 | 67 | 72 | 68 | 71 | 69 | 70 | — | — |
| 138-837 | | | | | | | | | | N/A | | | | | | | | | | | u-th root Zadoff-Chu sequence is defined by the following equation.

$$x_u(n) = e^{-j\frac{\pi u n(n+1)}{N_{ZC}}}, 0 \leq n \leq N_{ZC} - 1 \quad \text{Equation 1}$$

TABLE 4

| Preamble format | $N_{ZC}$ |
|---|---|
| 0~3 | 839 |
| 4 | 139 |

From the u-th root Zadoff-Chu sequence, random access preambles with zero correlation zones of length $N_{ZC}-1$ are defined by cyclic shifts according to $x_{u,v}(n)=x_u((n+C_v) \bmod N_{ZC})$, where the cyclic shift is given by the following equation.

$$C_v = \begin{cases} vN_{CS} & v = 0, 1, \ldots, \lfloor N_{ZC}/N_{CS} \rfloor - 1, N_{CS} \neq 0 & \text{for unrestricted sets} \\ 0 & N_{CS} = 0 & \text{for unrestricted sets} \\ d_{start}\lfloor v/n_{shift}^{RA} \rfloor + (v \bmod n_{shift}^{RA})N_{CS} & v = 0, 1, \ldots, n_{shift}^{RA}n_{group}^{RA} + \bar{n}_{shift}^{RA} - 1 & \text{for restricted sets} \end{cases} \quad \text{Equation 2}$$

$N_{CS}$ is given by Table 5 for preamble formats 0~3 and by Table 6 for preamble format 4.

TABLE 5

| zeroCorrelationZoneConfig | $N_{CS}$ value | |
|---|---|---|
| | Unrestricted set | Restricted set |
| 0 | 0 | 15 |
| 1 | 13 | 18 |
| 2 | 15 | 22 |
| 3 | 18 | 26 |
| 4 | 22 | 32 |
| 5 | 26 | 38 |
| 6 | 32 | 46 |
| 7 | 38 | 55 |
| 8 | 46 | 68 |
| 9 | 59 | 82 |
| 10 | 76 | 100 |
| 11 | 93 | 128 |
| 12 | 119 | 158 |
| 13 | 167 | 202 |
| 14 | 279 | 237 |
| 15 | 419 | — |

TABLE 6

| zeroCorrelationZoneConfig | $N_{CS}$ value |
|---|---|
| 0 | 2 |
| 1 | 4 |
| 2 | 6 |
| 3 | 8 |
| 4 | 10 |
| 5 | 12 |
| 6 | 15 |
| 7 | N/A |
| 8 | N/A |
| 9 | N/A |
| 10 | N/A |
| 11 | N/A |
| 12 | N/A |
| 13 | N/A |
| 14 | N/A |
| 15 | N/A |

The parameter zeroCorrelationZoneConfig is provided by higher layers. The parameter High-speed-flag provided by higher layers determines if unrestricted set or restricted set shall be used.

The variable $d_u$ is the cyclic shift corresponding to a Doppler shift of magnitude $1/T_{SEQ}$ and is given by the following equation.

$$d_u = \begin{cases} p & 0 \leq p \leq N_{ZC}/2 \\ N_{ZC} - p & \text{otherwise} \end{cases} \quad \text{Equation 3}$$

p is the smallest non-negative integer that fulfils (pu) mod $N_{ZC}=1$ .... The parameters for restricted sets of cyclic shifts depend on $d_u$. For $N_{ZC} \leq d_u \leq N_{ZC}/3$, the parameters are given by the following equation.

$$n_{shift}^{RA} = \lfloor d_u/N_{CS} \rfloor$$

$$d_{start} = 2d_u + n_{shift}^{RA} N_{CS}$$

$$n_{group}^{RA} = \lfloor N_{ZC}/d_{start} \rfloor$$

$$\bar{n}_{shift}^{RA} = \max(\lfloor (N_{ZC} - 2d_u - n_{group}^{RA} d_{start})/N_{CS} \rfloor, 0) \quad \text{Equation 4}$$

For $N_{ZC}/3 \leq d_u < (N_{ZC}-N_{CS})/2$, the parameters are given by the following equation.

$$n_{shift}^{RA} = \lfloor (N_{ZC} - 2d_u)/N_{CS} \rfloor$$

$$d_{start} = N_{ZC} - 2d_u + n_{shift}^{RA} N_{CS}$$

$$n_{group}^{RA} = \lfloor d_u/d_{start} \rfloor$$

$$\bar{n}_{shift}^{RA} = \min(\max(\lfloor (d_u - n_{group}^{RA} d_{start})/N_{CS} \rfloor, 0), n_{shift}^{RA}) \quad \text{Equation 5}$$

For all other values of $d_u$, there are no cyclic shifts in the restricted set.

The time-continuous random access signal s(t) which is the baseband signal of RACH is defined by the following Equation.

$$s(t) = \beta_{PRACH} \quad \text{Equation 6}$$

$$\sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+K(k_0+1/2))\Delta f_{RA}(t-T_{CP})}$$

where $0 \leq t \leq T_{SEQ} - T_{CP}$, $\beta_{PRACH}$ is an amplitude scaling factor in order to conform to the transmit power specified in 3GPP TS 36.211, and $k_0 = n^{RA}{}_{PRB} N^{RB}{}_{sc} - N^{UL}{}_{RB} N^{RB}{}_{sc}/2$. $N^{RB}{}_{sc}$ denotes the number of subcarriers constituting one resource block (RB). $N^{UL}{}_{RB}$ denotes the number of RBs in a UL slot and depends on a UL transmission bandwidth. The location in the frequency domain is controlled by the parameter $n^{RA}{}_{PRB}$ is derived from the section 5.7.1 of 3GPP TS 36.211. The factor $K = \Delta f / \Delta f_{RA}$ accounts for the difference in subcarrier spacing between the random access preamble and uplink data transmission. The variable $\Delta f_{RA}$, the subcarrier spacing for the random access preamble, and the variable $\varphi$, a fixed offset determining the frequency-domain location of the random access preamble within the physical resource blocks, are both given by the following table.

TABLE 7

| Preamble format | $\Delta f_{RA}$ | $\varphi$ |
|---|---|---|
| 0~3 | 1250 Hz | 7 |
| 4 | 7500 Hz | 2 |

In the LTE/LTE-A system, a subcarrier spacing $\Delta f$ is 15 kHz or 7.5 kHz. However, as given by Table 7, a subcarrier spacing $\Delta f_{RA}$ for a random access preamble is 1.25 kHz or 0.75 kHz.

As more communication devices have demanded higher communication capacity, there has been necessity of enhanced mobile broadband relative to legacy radio access technology (RAT). In addition, massive machine type communication for providing various services irrespective of time and place by connecting a plurality of devices and objects to each other is one main issue to be considered in future-generation communication. Further, a communication system design in which services/UEs sensitive to reliability and latency are considered is under discussion. The introduction of future-generation RAT has been discussed by taking into consideration enhanced mobile broadband communication, massive MTC, ultra-reliable and low-latency communication (URLLC), and the like. In current 3GPP, a study of the future-generation mobile communication system after EPC is being conducted. In the present invention, the corresponding technology is referred to as a new RAT (NR) or 5G RAT, for convenience.

An NR communication system demands that much better performance than a legacy fourth generation (4G) system be supported in terms of data rate, capacity, latency, energy consumption, and cost. Accordingly, the NR system needs to make progress in terms of bandwidth, spectrum, energy, signaling efficiency, and cost per bit.

<OFDM Numerology>

The new RAT system uses an OFDM transmission scheme or a similar transmission scheme. The new RAT system may follow the OFDM parameters different from OFDM parameters of the LTE system. Alternatively, the new RAT system may conform to numerology of the legacy LTE/LTE-A system but may have a broader system bandwidth (e.g., 100 MHz) than the legacy LTE/LTE-A system. One cell may support a plurality of numerologies. That is, UEs that operate with different numerologies may coexist within one cell.

<Subframe Structure>

In the 3GPP LTE/LTE-A system, radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s = 1/(2048*15 \text{ kHz})$. The basic time unit for LTE is $T_s$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like. The TTI refers to an interval during which data can be scheduled. For example, in a current LTE/LTE-A system, a transmission opportunity of a UL grant or a DL grant is present every 1 ms and several transmission opportunities of the UL/DL grant are not present within a shorter time than 1 ms. Therefore, the TTI in the legacy LTE/LTE-A system is 1 ms.

Figure 2:
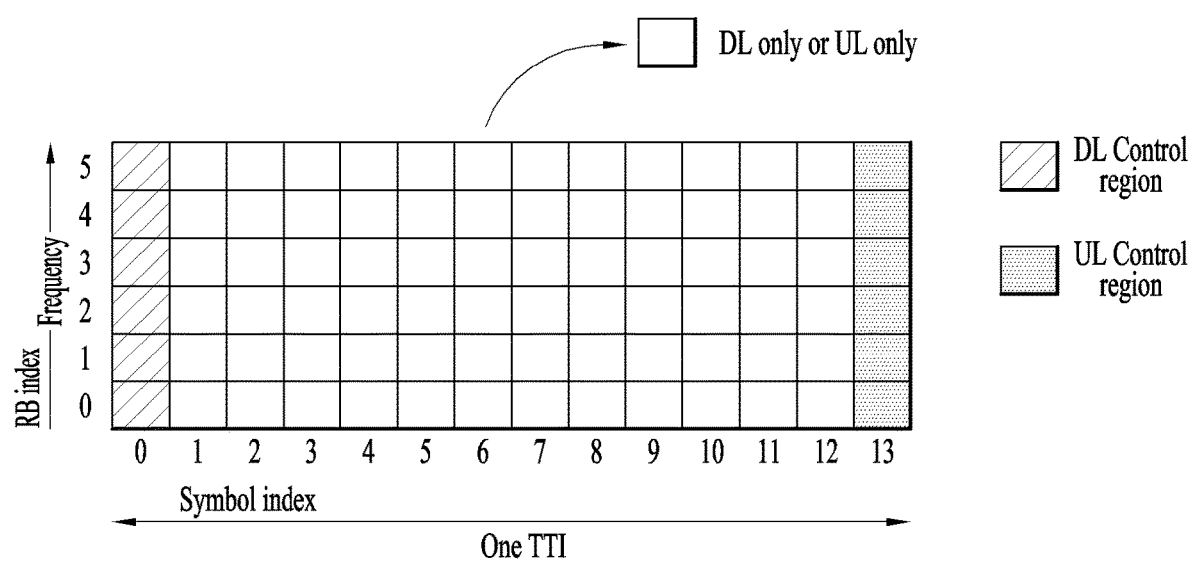
FIG. 2 illustrates a slot structure available in a new radio access technology (NR).

FIG. 2 illustrates a slot structure available in a new radio access technology (NR).

To minimize data transmission latency, in a 5G new RAT, a slot structure in which a control channel and a data channel are time-division-multiplexed is considered.

In FIG. 2, the hatched area represents the transmission region of a DL control channel (e.g., PDCCH) carrying the DCI, and the black area represents the transmission region of a UL control channel (e.g., PUCCH) carrying the UCI. Here, the DCI is control information that the gNB transmits to the UE. The DCI may include information on cell configuration that the UE should know, DL specific information such as DL scheduling, and UL specific information such as UL grant. The UCI is control information that the UE transmits to the gNB. The UCI may include a HARQ ACK/NACK report on the DL data, a CSI report on the DL channel status, and a scheduling request (SR).

In FIG. 2, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the slot structure of FIG. 2, DL transmission and UL transmission may be sequentially performed in one slot, and thus transmission/reception of DL data and reception/transmission of UL ACK/NACK for the DL data may be performed in one slot. As a result, the time taken to retransmit data when a data transmission error occurs may be reduced, thereby minimizing the latency of final data transmission.

In such a slot structure, a time gap is needed for the process of switching from the transmission mode to the reception mode or from the reception mode to the transmission mode of the gNB and UE. On behalf of the process of switching between the transmission mode and the reception mode, some OFDM symbols at the time of switching from DL to UL in the slot structure are set as a guard period (GP).

In the legacy LTE/LTE-A system, a DL control channel is time-division-multiplexed with a data channel and a PDCCH, which is a control channel, is transmitted throughout an entire system band. However, in the new RAT, it is expected that a bandwidth of one system reaches approximately a minimum of 100 MHz and it is difficult to distribute the control channel throughout the entire band for transmission of the control channel. For data transmission/reception of a UE, if the entire band is monitored to receive the DL control channel, this may cause increase in battery consumption of the UE and deterioration in efficiency. Accordingly, in the present invention, the DL control channel may be locally transmitted or distributively transmitted in a partial frequency band in a system band, i.e., a channel band.

In the NR system, a basic transmission unit is a slot. A slot duration may consist of 14 symbols with a normal cyclic prefix (CP) or 12 symbols with an extended CP. The slot is scaled in time as a function of a used subcarrier spacing. That is, if the subcarrier spacing increases, the length of the slot is shortened. For example, when the number of symbols per slot is 14, the number of slots in a 10-ms frame is 10 at a subcarrier spacing of 15 kHz, 20 at a subcarrier spacing of 30 kHz, and 40 at a subcarrier spacing of 60 kHz. If a subcarrier spacing increases, the length of OFDM symbols is shortened. The number of OFDM symbols in a slot depends on whether the OFDM symbols have a normal CP or an extended CP and does not vary according to subcarrier spacing. A basic time unit used in the LTE system, $T_s$, is defined as $T_s=1/(15000*2048)$ seconds in consideration of a basic subcarrier spacing of 15 kHz and a maximum TFT size 2048 of the LTE system and corresponds to a sampling time for a subcarrier spacing of 15 kHz. In the NR system, various subcarrier lengths in addition to the subcarrier spacing of 15 kHz may be used. Since the subcarrier spacing and a corresponding time length are inversely proportional, an actual sampling time corresponding to subcarrier spacings greater than 15 kHz is shorter than $T_s=1/(15000*2048)$ seconds. For example, actual sampling times for subcarrier spacings of 30 kHz, 60 kHz, and 120 kHz will be $1/(2*15000*2048)$ seconds, $1/(4*15000*2048)$ seconds, and $1/(8*15000*2048)$ seconds, respectively.

<Analog Beamforming>

A recently discussed fifth generation (5G) mobile communication system is considering using an ultrahigh frequency band, i.e., a millimeter frequency band equal to or higher than 6 GHz, to transmit data to a plurality of users in a wide frequency band while maintaining a high transmission rate. In 3GPP, this system is used as NR and, in the present invention, this system will be referred to as an NR system. Since the millimeter frequency band uses too high a frequency band, a frequency characteristic thereof exhibits very sharp signal attenuation depending on distance. Therefore, in order to correct a sharp propagation attenuation characteristic, the NR system using a band of at least above 6 GHz uses a narrow beam transmission scheme to solve a coverage decrease problem caused by sharp propagation attenuation by transmitting signals in a specific direction so as to focus energy rather than in all directions. However, if a signal transmission service is provided using only one narrow beam, since a range serviced by one BS becomes narrow, the BS provides a broadband service by gathering a plurality of narrow beams.

In the millimeter frequency band, i.e., millimeter wave (mmW) band, the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.5λ (wavelength). Therefore, in mmW, increasing the coverage or the throughput by increasing the beamforming (BF) gain using multiple antenna elements is taken into consideration.

As a method of forming a narrow beam in the millimeter frequency band, a beamforming scheme is mainly considered in which the BS or the UE transmits the same signal using a proper phase difference through a large number of antennas so that energy increases only in a specific direction. Such a beamforming scheme includes digital beamforming for imparting a phase difference to a digital baseband signal, analog beamforming for imparting a phase difference to a modulated analog signal using time latency (i.e., cyclic shift), and hybrid beamforming using both digital beamforming and analog beamforming. If a transceiver unit (TXRU) is provided for each antenna element to enable adjustment of transmit power and phase, independent beamforming is possible for each frequency resource. However, installing TXRU in all of the about 100 antenna elements is less feasible in terms of cost. That is, the millimeter frequency band needs to use numerous antennas to correct the sharp propagation attenuation characteristic. Digital beamforming requires as many radio frequency (RF) components (e.g., a digital-to-analog converter (DAC), a mixer, a power amplifier, a linear amplifier, etc.) as the number of antennas. Therefore, if digital beamforming is desired to be implemented in the millimeter frequency band, cost of communication devices increases. Hence, when a large number of antennas is needed as in the millimeter frequency band, use of analog beamforming or hybrid beamforming is considered. In the analog beamforming method, multiple antenna elements are mapped to one TXRU and a beam direction is adjusted using an analog phase shifter. This analog beamforming method may only make one beam direction in the whole band, and thus may not perform frequency selective beamforming (BF), which is disadvantageous. The hybrid BF method is an intermediate type of digital BF and analog BF and uses B TXRUs less in number than Q antenna elements. In the case of hybrid BF, the number of directions in which beams may be transmitted at the same time is limited to B or less, which depends on the method of collection of B TXRUs and Q antenna elements.

As mentioned above, digital BF may simultaneously transmit or receive signals in multiple directions using multiple beams by processing a digital baseband signal to be transmitted or received, whereas analog BF cannot simultaneously transmit or receive signals in multiple directions exceeding a coverage range of one beam by performing BF in a state in which an analog signal to be transmitted or received is modulated. Typically, the BS simultaneously performs communication with a plurality of users using broadband transmission or multi-antenna characteristics. If the BS uses analog or hybrid BF and forms an analog beam in one beam direction, the eNB communicates with only users included in the same analog beam direction due to an analog BF characteristic. A RACH resource allocation method and a resource use method of the BS according to the present invention, which will be described later, are proposed considering restrictions caused by the analog BF or hybrid BF characteristic.

<Hybrid Analog Beamforming>

Figure 3:
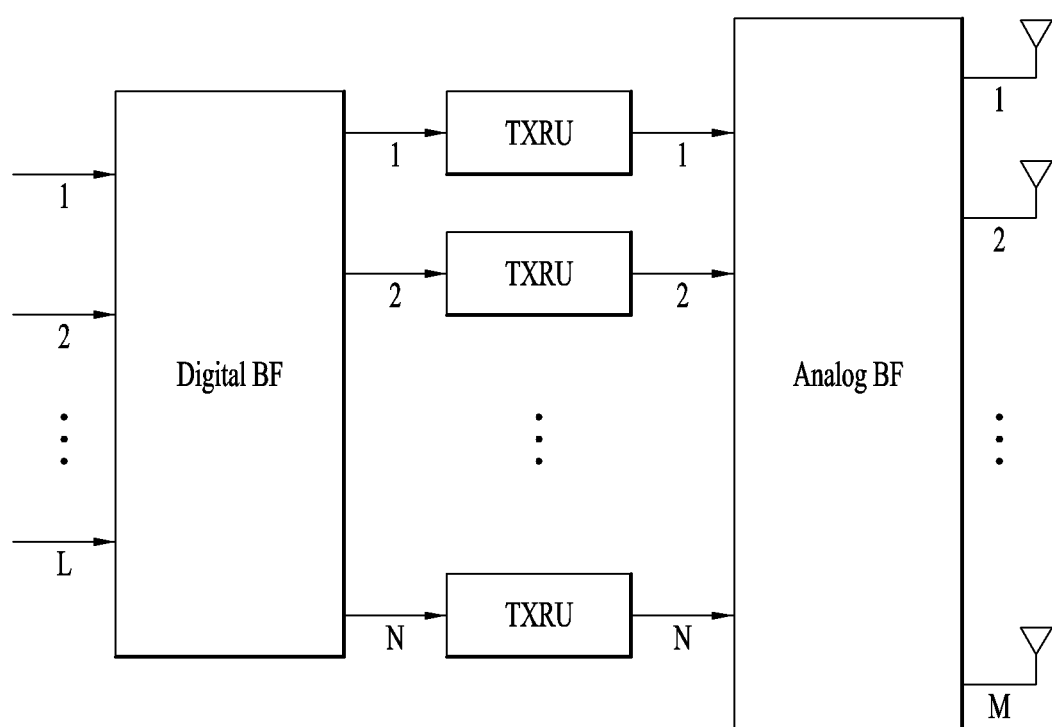
FIG. 3 abstractly illustrates transceiver units (TXRUs) and a hybrid beamforming structure in terms of physical antennas.

FIG. 3 abstractly illustrates TXRUs and a hybrid BF structure in terms of physical antennas.

When a plurality of antennas is used, a hybrid BF method in which digital BF and analog BF are combined is considered. Analog BF (or RF BF) refers to an operation in which an RF unit performs precoding (or combining). In hybrid BF, each of a baseband unit and the RF unit (also referred to as a transceiver) performs precoding (or combining) so that performance approximating to digital BF can be obtained while the number of RF chains and the number of digital-to-analog (D/A) (or analog-to-digital (A/D)) converters is reduced. For convenience, the hybrid BF structure may be expressed as N TXRUs and M physical antennas. Digital BF for L data layers to be transmitted by a transmitter may be expressed as an N-by-L matrix. Next, N converted digital signals are converted into analog signals through the TXRUs and analog BF expressed as an M-by-N matrix is applied to the analog signals. In FIG. 3, the number of digital beams is L and the number of analog beams is N. In the NR system, the BS is designed so as to change analog BF in units of symbols and efficient BF support for a UE located in a specific region is considered. If the N TXRUs and the M RF antennas are defined as one antenna panel, the NR system considers even a method of introducing plural antenna panels to which independent hybrid BF is applicable. In this way, when the BS uses a plurality of analog beams, since which analog beam is favorable for signal reception may differ according to each UE, a beam sweeping operation is considered so that, for at least a synchronization signal, system information, and paging, all UEs may have reception opportunities by changing a plurality of analog beams, that the BS is to apply, according to symbols in a specific slot or subframe.

Recently, a 3GPP standardization organization is considering network slicing to achieve a plurality of logical networks in a single physical network in a new RAT system, i.e., the NR system, which is a 5G wireless communication system. The logical networks should be capable of supporting various services (e.g., eMBB, mMTC, URLLC, etc.) having various requirements. A physical layer system of the NR system considers a method supporting an orthogonal frequency division multiplexing (OFDM) scheme using variable numerologies according to various services. In other words, the NR system may consider the OFDM scheme (or multiple access scheme) using independent numerologies in respective time and frequency resource regions.

Recently, as data traffic remarkably increases with appearance of smartphone devices, the NR system needs to support of higher communication capacity (e.g., data throughput). One method considered to raise the communication capacity is to transmit data using a plurality of transmission (or reception) antennas. If digital BF is desired to be applied to the multiple antennas, each antenna requires an RF chain (e.g., a chain consisting of RF elements such as a power amplifier and a down converter) and a D/A or A/D converter. This structure increases hardware complexity and consumes high power which may not be practical. Accordingly, when multiple antennas are used, the NR system considers the above-mentioned hybrid BF method in which digital BF and analog BF are combined.

Figure 4:
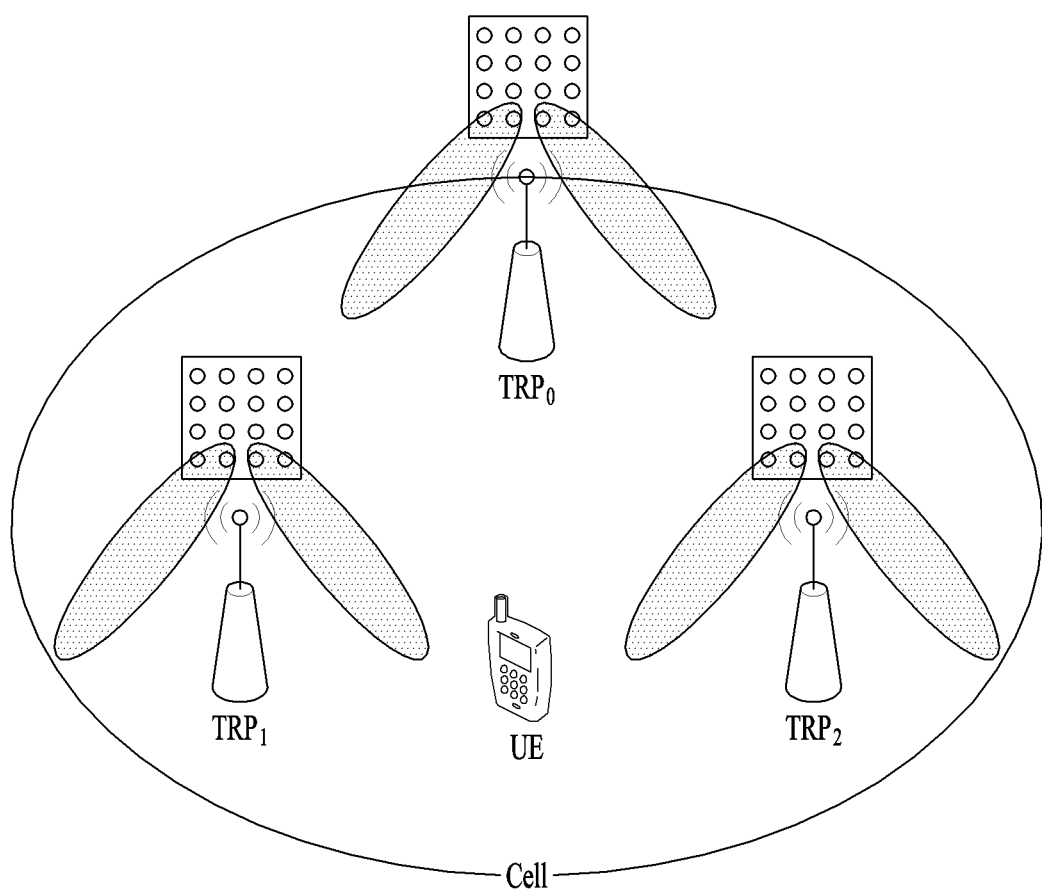
FIG. 4 illustrates a cell of a new radio access technology (NR) system.

FIG. 4 illustrates a cell of a new radio access technology (NR) system.

Referring to FIG. 4, in the NR system, a method in which a plurality of transmission and reception points (TRPs) form one cell is being discussed unlike a wireless communication system of legacy LTE in which one BS forms one cell. If the plural TRPs form one cell, seamless communication can be provided even when a TRP that provides a service to a UE is changed so that mobility management of the UE is facilitated.

In an LTE/LTE-A system, a PSS/SSS is transmitted omni-directionally. Meanwhile, a method is considered in which a gNB which uses millimeter wave (mmWave) transmits a signal such as a PSS/SSS/PBCH through BF while sweeping beam directions omni-directionally. Transmission/reception of a signal while sweeping beam directions is referred to as beam sweeping or beam scanning. In the present invention, "beam sweeping" represents a behavior of a transmitter and "beam scanning" represents a behavior of a receiver. For example, assuming that the gNB may have a maximum of N beam directions, the gNB transmits a signal such as a PSS/SSS/PBCH in each of the N beam directions. That is, the gNB transmits a synchronization signal such as the PSS/SSS/PBCH in each direction while sweeping directions that the gNB can have or the gNB desires to support. Alternatively, when the gNB can form N beams, one beam group may be configured by grouping a few beams and the PSS/SSS/PBCH may be transmitted/received with respect to each beam group. In this case, one beam group includes one or more beams. The signal such as the PSS/SSS/PBCH transmitted in the same direction may be defined as one synchronization (SS) block and a plurality of SS blocks may be present in one cell. When the plural SS blocks are present, SS block indexes may be used to distinguish between the SS blocks. For example, if the PSS/SSS/PBCH is transmitted in 10 beam directions in one system, the PSS/SSS/PBCH transmitted in the same direction may constitute one SS block and it may be understood that 10 SS blocks are present in the system. In the present invention, a beam index may be interpreted as an SS block index.

Figure 5:
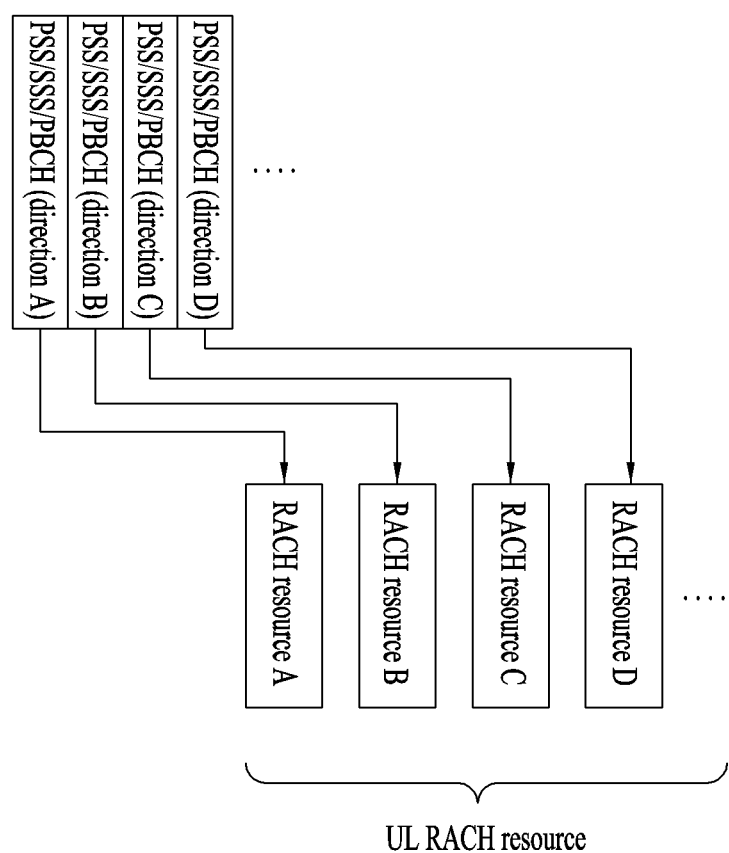
FIG. 5 illustrates transmission of a synchronization signal (SS) block and a RACH resource linked to the SS block.

FIG. 5 illustrates transmission of an SS block and a RACH resource linked to the SS block.

To communicate with one UE, the gNB should acquire an optimal beam direction between the gNB and the UE and should continuously track the optimal beam direction because the optimal beam direction is changed as the UE moves. A procedure of acquiring the optimal beam direction between the gNB and the UE is referred to as a beam acquisition procedure and a procedure of continuously tracking the optimal beam direction is referred to as a beam tracking procedure. The beam acquisition procedure is needed for 1) initial access in which the UE first attempts to access the gNB, 2) handover in which the UE is handed over from one gNB to another gNB, or 3) beam recovery for recovering from a state in which the UE and gNB cannot maintain an optimal communication state or enter a communication impossible state, i.e., beam failure, as a result of losing an optimal beam while performing beam tracking for searching for the optimal beam between the UE and the gNB.

In the case of the NR system which is under development, a multi-stage beam acquisition procedure is under discussion, for beam acquisition in an environment using multiple beams. In the multi-stage beam acquisition procedure, the gNB and the UE perform connection setup using a wide beam in an initial access stage and, after connection setup is ended, the gNB and the UE perform communication with optimal quality using a narrow band. In the present invention, although various methods for beam acquisition of the NR system are mainly discussed, the most actively discussed method at present is as follows.

1) The gNB transmits an SS block per wide beam in order for the UE to search for the gNB in an initial access procedure, i.e., performs cell search or cell acquisition, and to search for an optimal wide beam to be used in a first stage of beam acquisition by measuring channel quality of each wide beam. 2) The UE performs cell search for an SS block per beam and performs DL beam acquisition using a cell detection result of each beam. 3) The UE performs a RACH procedure in order to inform the gNB that the UE will access the gNB that the UE has discovered. 4) The gNB connects or associates the SS block transmitted per beam and a RACH resource to be used for RACH transmission, in order to cause the UE to inform the gNB of a result of the RACH procedure and simultaneously a result of DL beam acquisition (e.g., beam index) at a wide beam level. If the UE performs the RACH procedure using a RACH resource connected to an optimal beam direction that the UE has discovered, the gNB obtains information about a DL beam suitable for the UE in a procedure of receiving a RACH preamble.

<Beam Correspondence (BC)>

In a multi-beam environment, whether a UE and/or a TRP can accurately determine a transmission (Tx) or reception (Rx) beam direction between the UE and the TRP is problematic. In the multi-beam environment, signal transmission repetition or beam sweeping for signal reception may be considered according to a Tx/Rx reciprocal capability of the TRP (e.g., eNB) or the UE. The Tx/Rx reciprocal capability is also referred to as Tx/Rx beam correspondence (BC) in the TRP and the UE. In the multi-beam environment, if the Tx/Rx reciprocal capability in the TRP or the UE does not hold, the UE may not transmit a UL signal in a beam direction in which the UE has received a DL signal because an optimal path of UL may be different from an optimal path of DL. Tx/Rx BC in the TRP holds, if the TRP can determine a TRP Rx beam for UL reception based on DL measurement of UE for one or more Tx beams of the TRP and/or if the TRP can determine a TRP Tx beam for DL transmission based on UL measurement for one or more Rx beams of the TRP. Tx/Rx BC in the UE holds if the UE can determine a UE Rx beam for UL transmission based on DL measurement of UE for one or more Rx beams of the UE and/or if the UE can determine a UE Tx beam for DL reception according to indication of the TRP based on UL measurement for one or more Tx beams of the UE.

In the LTE system and the NR system, a RACH signal used for initial access to the gNB, i.e., initial access to the gNB through a cell used by the gNB, may be configured using the following elements.

Cyclic prefix (CP): This element serves to prevent interference generated from a previous/front (OFDM) symbol and group RACH preamble signals arriving at the gNB with various time delays into one time zone. That is, if the CP is configured to match a maximum radius of a cell, RACH preambles that UEs in the cell have transmitted in the same resource are included in a RACH reception window corresponding to the length of RACH preambles configured by the gNB for RACH reception. A CP length is generally set to be equal to or greater than a maximum round trip delay.

Preamble: A sequence used by the gNB to detect signal transmission is defined and the preamble serves to carry this sequence.

Guard time (GT): This element is defined to cause a RACH signal arriving at the gNB with delay from the farthest distance from the gNB on RACH coverage not to create interference with respect to a signal arriving after a RACH symbol duration. During this GT, the UE does not transmit a signal so that the GT may not be defined as the RACH signal.

Figure 6:
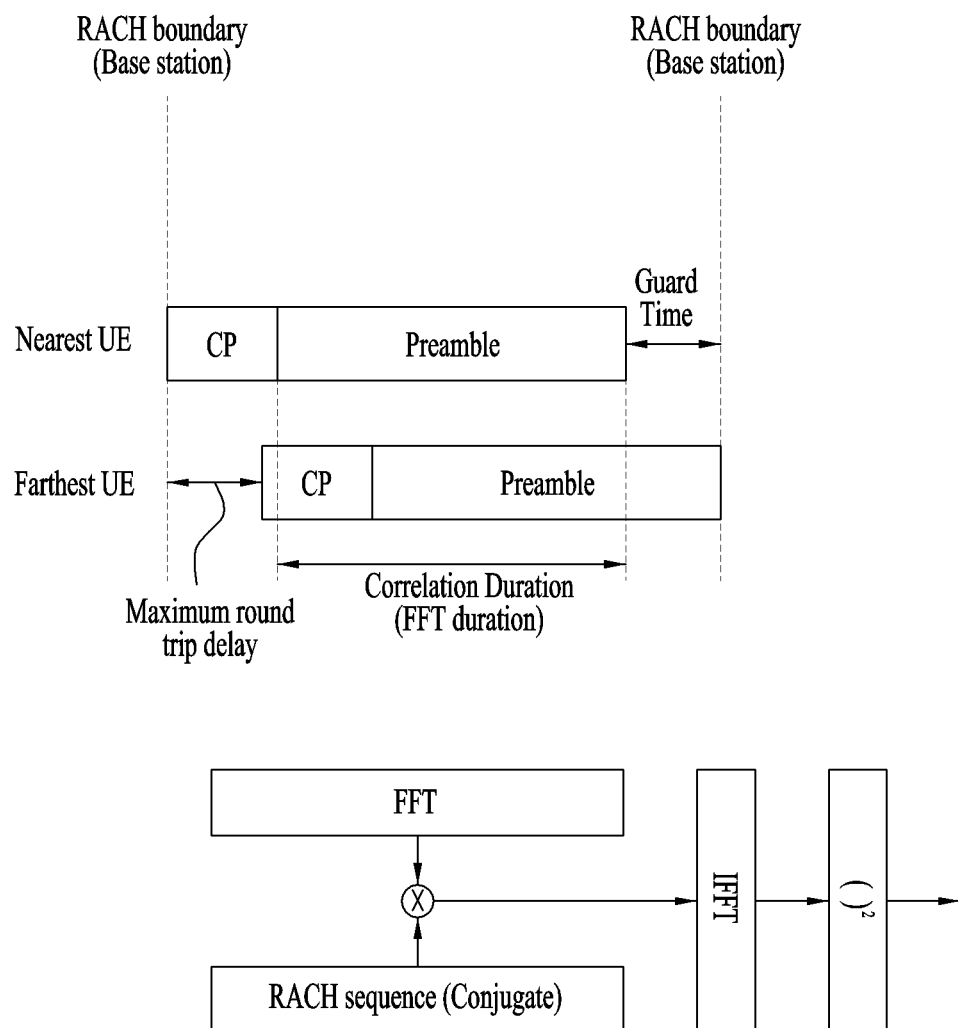
FIG. 6 illustrates configuration/format of a random access channel (RACH) preamble and a receiver function.

FIG. 6 illustrates configuration/format of a RACH preamble and a receiver function.

The UE transmits a RACH signal through a designated RACH resource at a system timing of the gNB obtained through an SS. The gNB receives signals from multiple UEs. Generally, the gNB performs the procedure illustrated in FIG. 5 for RACH signal reception. Since a CP for the RACH signal is set to a maximum round trip delay or more, the gNB may configure an arbitrary point between the maximum round trip delay and the CP length as a boundary for signal reception. If the boundary is determined as a start point for signal reception and if correlation is applied to a signal of a length corresponding to a sequence length from the start point, the gNB may acquire information as to whether the RACH signal is present and information about the CP.

If a communication environment operated by the gNB such as a millimeter band uses multiple beams, the RACH signal arrives at the eNB from multiple directions and the gNB needs to detect the RACH preamble (i.e., PRACH) while sweeping beam directions to receive the RACH signal arriving from multiple directions. As mentioned above, when analog BF is used, the gNB performs RACH reception only in one direction at one timing. For this reason, it is necessary to design the RACH preamble and a RACH procedure so that the gNB may properly detect the RACH preamble. The present invention proposes the RACH preamble and/or the RACH procedure for a high frequency band to which the NR system, especially, BF, is applicable in consideration of the case in which BC of the gNB holds and the case in which BC does not hold.

Figure 7:
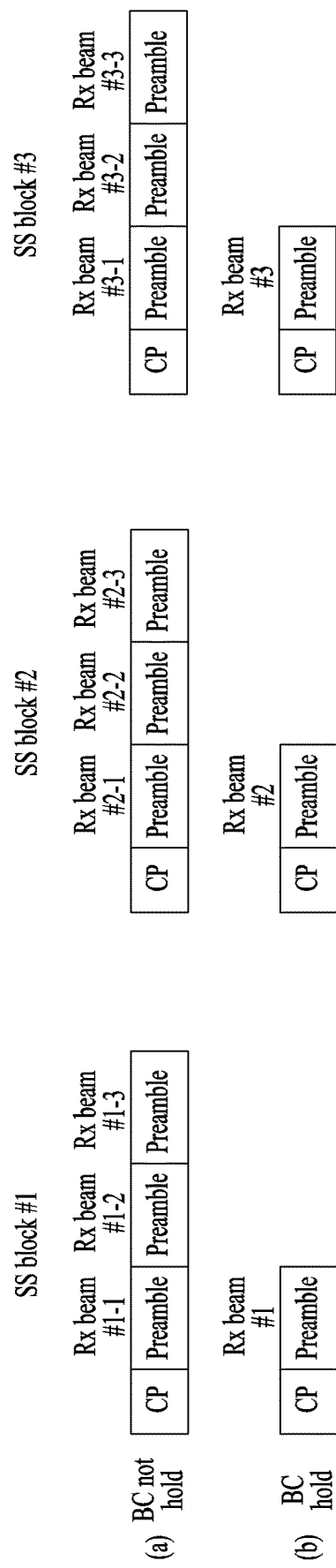
FIG. 7 illustrates a reception (Rx) beam formed at a gNB to receive a RACH preamble.

FIG. 7 illustrates a reception (Rx) beam formed at a gNB to receive a RACH preamble.

If BC does not hold, beam directions may be mismatched even when the gNB forms an Rx beam in a Tx beam direction of an SS block in a state in which a RACH resource is linked to the SS block. Therefore, a RACH preamble may be configured in a format illustrated in FIG. 7(a) so that the gNB may perform beam scanning for performing/attempting to perform RACH preamble detection in multiple directions while sweeping Rx beams. Meanwhile, if BC holds, since the RACH resource is linked to the SS block, the gNB may form an Rx beam in a direction used to transmit the SS block with respect to one RACH resource and detect the RACH preamble only in that direction. Therefore, the RACH preamble may be configured in a format illustrated in FIG. 7(b).

As described previously, a RACH signal and a RACH resource should be configured in consideration of two purposes of a DL beam acquisition report and a DL preferred beam report of the UE and beam scanning of the gNB according to BC.

Figure 8:
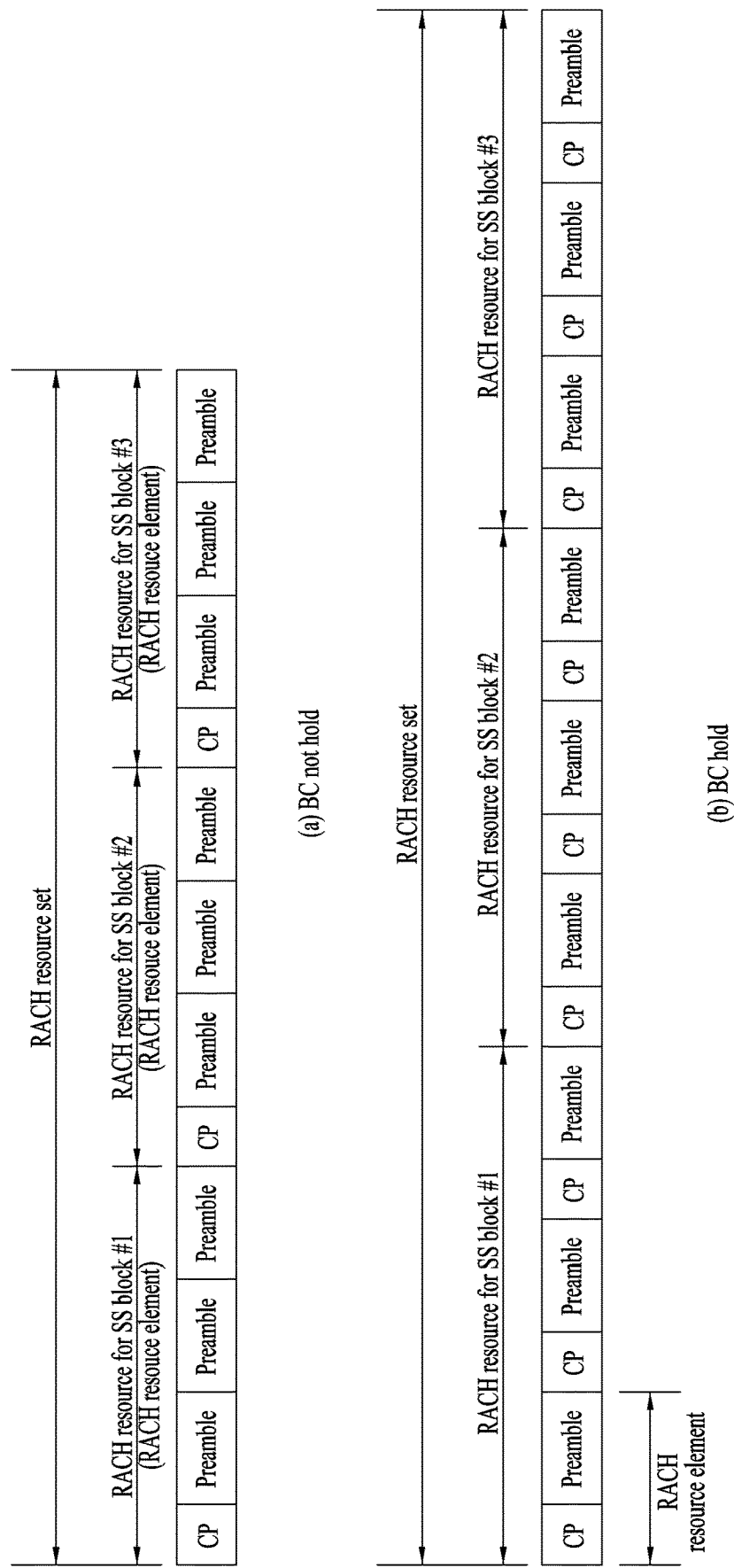
FIG. 8 illustrates a RACH signal and a RACH resource to explain terms used to describe the present invention.

FIG. 8 illustrates a RACH signal and a RACH resource to explain terms used to describe the present invention. In the present invention, the RACH signal may be configured as follows.

RACH resource element: The RACH resource element is a basic unit used when the UE transmits the RACH signal. Since different RACH resource elements may be used for RACH signal transmission by different UEs, respectively, a CP is inserted into the RACH signal in each RACH resource element. Protection for signals between UEs is already maintained by the CP and, therefore, a GT is not needed between RACH resource elements.

RACH resource: The RACH resource is defined as a set of concatenated RACH resource elements connected to one SS block. If RACH resources are consecutively allocated contiguously, two successive RACH resources may be used for signal transmission by different UEs, respectively, like the RACH resource elements. Therefore, the CP may be inserted into the RACH signal in each RACH resource. The GT is unnecessary between RACH resources because signal detection distortion caused by time delay is prevented by the CP. However, if only one RACH resource is configured, i.e., RACH resources are not consecutively configured, since a PUSCH/PUCCH may be allocated after the RACH resource, the GT may be inserted in front of the PUSCH/PUCCH.

RACH resource set: The RACH resource set is a set of concatenated RACH resources. If multiple SS blocks are present in a cell and RACH resources connected respectively to the multiple SS blocks are concatenated, the concatenated RACH resources may be defined as one RACH resource set. The GT is inserted into the last of the RACH resource set which is a part where the RACH resource set including RACH resources and another signal such as a PUSCH/PUCCH may be encountered. As mentioned above, since the GT is a duration during which a signal is not transmitted, the GT may not be defined as a signal. The GT is not illustrated in FIG. 8.

RACH preamble repetition: When a RACH preamble for Rx beam scanning of the gNB is configured, i.e., when the gNB configures a RACH preamble format so that the gNB may perform Rx beam scanning, if the same signal (i.e., same sequence) is repeated within the RACH preamble, the CP is not needed between the repeated signals because the repeated signals serve as the CP. However, when preambles are repeated within the RACH preamble using different signals, the CP is needed between the preambles. The GT is not needed between RACH preambles. Hereinafter, the present invention is described under the assumption that the same signal is repeated. For example, if the RACH preamble is configured in the form of 'CP+preamble+preamble', the present invention is described under the assumption that the preambles within the RACH preamble are configured by the same sequence.

FIG. 8 illustrates RACH resources for a plurality of SS blocks and RACH preambles in each RACH resource in terms of the gNB. The gNB attempts to receive a RACH preamble in each RACH resource in a time region in which the RACH resources are configured. The UE transmits a RACH preamble thereof through RACH resource(s) linked to specific SS block(s) (e.g., SS block(s) having better Rx quality) rather than transmitting the RACH preamble in each of RACH resources for all SS blocks of the cell. As mentioned above, different RACH resource elements or different RACH resources may be used to transmit RACH preambles by different UEs.

Figure 9:
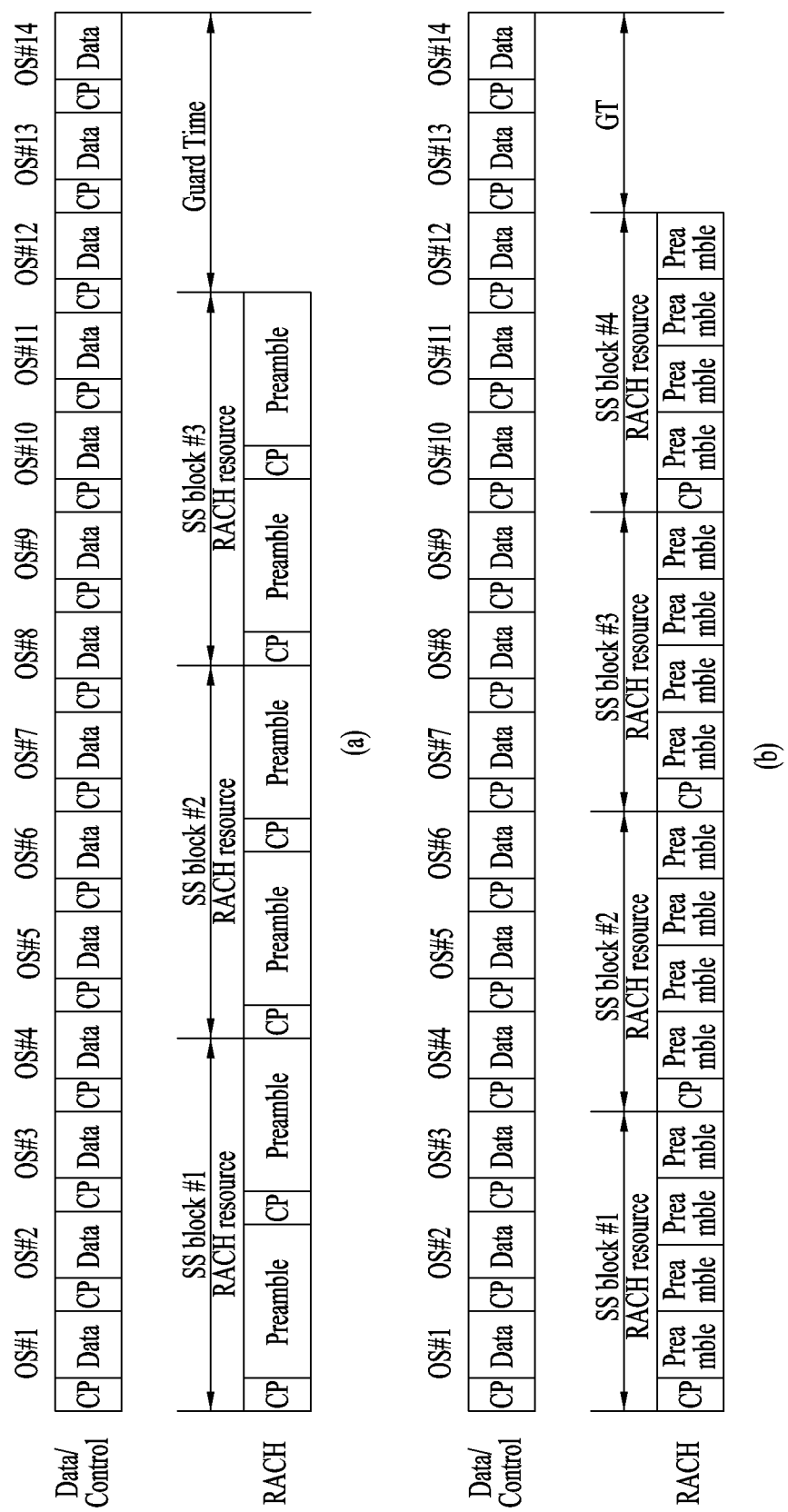
FIG. 9 illustrates a RACH resource set.

FIG. 9 illustrates a RACH resource set. FIG. 9(a) illustrates the case in which two RACH resource elements per RACH resource are configured in a cell of the gNB in which BC holds. FIG. 9(b) illustrates the case in which one RACH resource element per RACH resource is configured in the cell of the gNB in which BC holds. Referring to FIG. 9(a), two RACH preambles may be transmitted in a RACH resource linked to an SS block. Referring to FIG. 9(b), one RACH preamble may be transmitted in a RACH resource linked to an SS block.

A RACH resource set may be configured as illustrated in FIG. 9 so as to maximize the efficiency of a RACH resource using the RACH signal configuration characteristic described in FIG. 8. As illustrated in FIG. 9, in order to raise use/allocation efficiency of the RACH resource, RACH resources or RACH resource elements may be configured to be completely concatenated without allocating a blank duration between RACH resources in the RACH resource set.

However, if RACH resources are configured as illustrated in FIG. 9, the following problems may arise. 1) When BC holds and the gNB receives a RACH resource corresponding to SS block #N by forming a beam in the direction of SS block #N, since an Rx beam is changed at a middle of OFDM symbols (OSs) defined for a data or control channel, the gNB only partially uses resources other than a frequency resource allocated as the RACH resource. That is, as illustrated in FIG. 9(a), if the gNB forms an Rx beam to receive SS block #1, OS #4 cannot be used for the data channel or the control channel. 2) When BC does not hold and the gNB performs Rx beam scanning within a RACH resource element, the gNB may perform RACH preamble detection while receiving a data/control signal by forming an Rx beam on each of OSs at a boundary of OS #1/OS #2/OS #3 with respect to a RACH resource corresponding to SS block #1. However, when the gNB performs beam scanning for a RACH resource corresponding to SS block #2, a beam direction for receiving the data/control signal and a beam direction for receiving a RACH preamble are not matched in a duration corresponding to OS #4 so that a problem occurs in detecting the RACH preamble.

In summary, if the gNB performs beam scanning while changing the direction of an Rx beam for RACH signal reception and a timing at which the Rx beam is changed mismatches an OFDM symbol boundary defined for the data or control channel, there is a problem of lowering resource use/allocation efficiency of the data or control channel serviced in a frequency region other than a frequency resource allocated as the RACH resource. To solve this problem, the present invention proposes allocating a RACH resource as a structure aligned with an OFDM symbol boundary, in order for the gNB to perform RACH preamble detection while changing a beam direction in a multi-beam scenario and simultaneously for the gNB to use all radio resources other than the RACH resource for the data and control channels. When BC holds, by way of example, a RACH resource or a RACH preamble transmitted through the RACH resource may be aligned with an OFDM symbol boundary using two methods as illustrated in FIG. 10.

Figure 10:
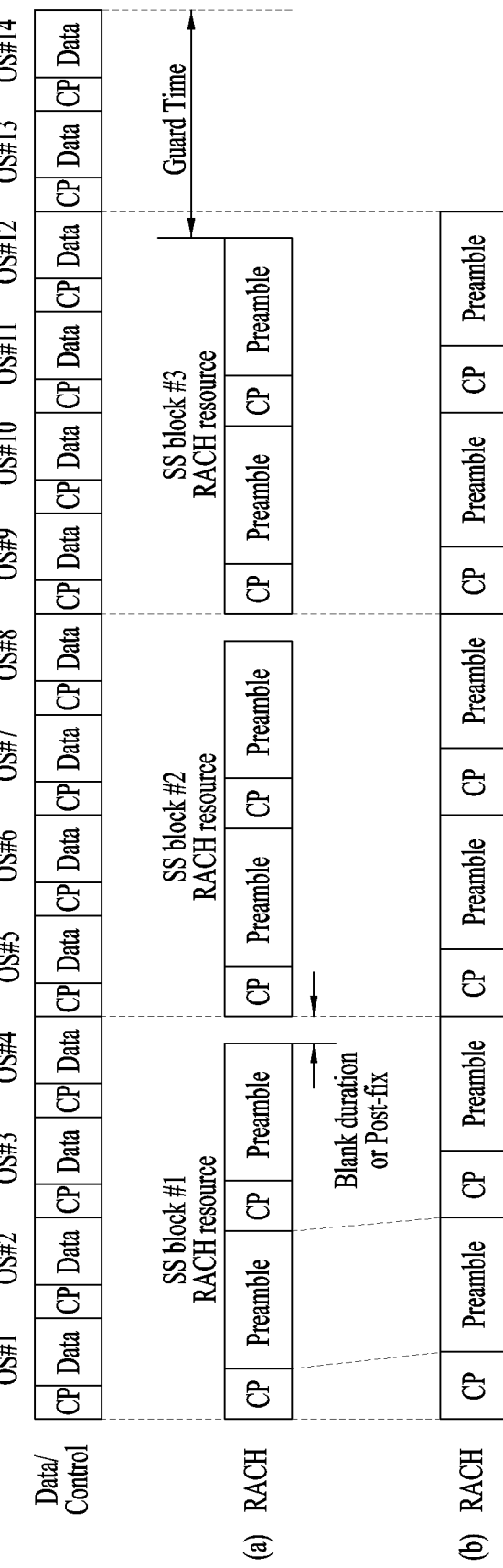
FIG. 10 illustrates boundary alignment of a RACH resource according to the present invention.

FIG. 10 illustrates boundary alignment of a RACH resource according to the present invention. An example illustrated in FIG. 10 corresponds to the case in which BS holds and two RACH resource elements can be transmitted on one RACH resource. When BC does not hold, one RACH preamble may be configured by one CP and a plurality of consecutive preambles as illustrated in FIG. 7(a) or FIG. 8(a). Even in this case, the present invention is applicable. Only one RACH resource element may be transmitted on one RACH resource and the present invention is applicable thereto.

1) One (hereinafter, Method 1) of methods for aligning an OFDM symbol boundary and a RACH resource boundary determines a CP length and a preamble length of a RACH preamble by taking into consideration RACH preamble detection capability by the gNB, coverage of the gNB, and a subcarrier spacing of the RACH preamble and then configure an RACH resource element using the CP length and the preamble length, as illustrated in FIG. 10(a). The gNB may configure the RACH resource by determining the number of RACH resource elements per RACH resource in consideration of the capacity of the RACH resource. The gNB configures RACH resource(s) such that a boundary of each of RACH resources which are to be consecutively used is aligned with a boundary of OFDM symbol(s) which are to be used for the data and control channels. In this case, a blank duration may occur between RACH resources. The blank duration may be configured as a duration during which no signals are transmitted. Alternatively, a signal may be additionally transmitted as a post-fix only to the last RACH resource element in the RACH resource. That is, the UE that transmits a RACH preamble using the last RACH resource element in the time domain among RACH resource elements in a RACH resource may add a post-fix signal to the RACH preamble thereof and then transmit the RACH preamble. The UE that transmits a RACH preamble using a RACH resource element other than the last RACH resource element may transmit the RACH preamble without adding the post-fix signal.

2) Another method (hereinafter, Method 2) among the methods of aligning the OFDM symbol boundary and the RACH resource boundary configures a CP length and a preamble length in order to align the RACH resource boundary with the OFDM symbol boundary as illustrated in FIG. 10(b). However, since the number of RACH resource elements in each RACH resource may vary, if the length of the RACH preamble is changed to match the OFDM symbol boundary, there is a danger of changing characteristics of a preamble sequence in the RACH preamble. That is, the length of a Zadoff-Chu (ZC) sequence used to generate a preamble is determined as 839 or 130 according to a preamble format as illustrated in Table 4. If the length of the preamble is changed in order to align the length of the RACH preamble with the OFDM symbol boundary, the characteristics of the ZC sequence which is the preamble sequence may vary. Therefore, if a RACH preamble format is determined and RACH resource elements per RACH resource are determined, the length of the RACH preamble may be fixed but a CP length may become greater than a length determined in configuring the RACH preamble format so that the RACH resource is aligned with the OFDM symbol boundary. That is, this method serves to align a RACH resource boundary, i.e., a RACH preamble boundary transmitted through the RACH resource with an OFDM symbol used to transmit the data/control channel (i.e., normal OFDM symbol) by fixing the length of each preamble in the RACH preamble and increasing the CP length to match the OFDM symbol boundary so as to maintain characteristics of the preamble sequence. In this case, only CP lengths of some RACH resource elements may be configured to be increased (i.e., only CP lengths of some RACH preambles are configured to be increased) or CP lengths of all RACH resource elements may be configured to be properly increased (i.e., a CP length of each RACH preamble is configured to be properly increased). For example, if the gNB configures the RACH resource in the time domain configured by OFDM symbols, the gNB configures a preamble format indicating a CP length and a sequence part length such that the sequence part length is a multiple of a positive integer of a preamble length obtained from a specific length (e.g., the length of a ZC sequence for a RACH) according to the number of preambles to be included in a corresponding RACH preamble and the CP length is equal to a value obtained by subtracting the sequence part length from a total length of the normal OFDM symbols. If the lengths of OFDM symbols are all the same, the RACH preamble format according to the present invention will be defined such that the sum of a multiple of a positive integer of a predefined preamble length (e.g., a preamble length obtained from a predefined length of a ZC sequence) and a CP length is a multiple of an OFDM symbol length. When the UE detects an SS block of a cell and generates a RACH preamble to be transmitted on a RACH resource connected to the SS block, the UE generates the RACH preamble by generating each preamble to be included in the RACH preamble using a sequence of a specific length (e.g., ZC sequence) according to a preamble format configured by the gNB and adding a CP to a front part of the preamble or repetition(s) of the preamble.

Method 1 and Method 2 may be equally applied even when the gNB performs Rx beam scanning because BC does not hold. When BC holds for Method 1 and Method 2, there is a high possibility that a RACH preamble is configured in a format including one preamble. Meanwhile, except that there is a high possibility that the RACH preamble is configured to include preamble repetition when BC does not hold, Method 1 and Method 2 described with reference to FIG. 10 may be equally applied to the case in which the gNB desires to perform Rx beam scanning because BS does not hold. For example, when BC does not hold so that the gNB desires to perform Rx beam scanning, the gNB configures and signals a preamble format (e.g., refer to FIG. 7(a) or FIG. 8(a)) in the form of including preamble repetition. Herein, the RACH resource may be configured in the form of Method 1 so as to monitor RACH preamble(s) by considering a duration from the end of one RACH resource to a part immediately before the start of the next RACH resource as a blank duration or a post-fix duration. Alternatively, the RACH resource may be configured in the form of Method 2 so as to monitor RACH preamble(s) in each RACH resource configured by the gNB under the assumption that the RACH preamble boundary is equal to the OFDM symbol boundary.

The RACH resource allocation method proposed in the present invention serves to efficiently use a frequency resource, other than a frequency resource occupied by the RACH resource, in one slot or multiple slots used for the RACH resource, as a data resource or a control channel resource. Therefore, for efficient use of the data/control channel resource considering the RACH resource, the gNB needs to schedule the data or control channel using information as to which unit is used to form a beam with respect to a slot to which the RACH resource is allocated. The UE may receive information as to which OFDM symbol unit is used when the gNB performs scheduling and transmit the data or control channel based on the information. To this end, two methods may be considered so that the gNB may schedule the data or control channel in a time region to which the RACH resource is allocated.

Mini Slot Allocation

When a channel is scheduled in a time region to which the RACH resource is allocated, since the scheduled channel should be included in one beam region, a time length of a resource to which the channel is allocated should be shorter than a time length of the RACH resource and a plurality of slots of a short length may be included for one RACH resource.

If the gNB operates by configuring a beam direction for each RACH resource and time units in which the gNB allocates a resource to the UE are not matched in a time region to which the RACH resource is allocated and in a time region to which the RACH resource is not allocated, the gNB should define a slot for scheduling in a time region occupied by the RACH resource and inform the UE of information related to the slot. Hereinafter, the slot used for scheduling in the time region occupied by the RACH resource will be referred to as a mini slot. In this structure, there are some considerations in order to transmit the data or control channel through the mini slot. For example, the following considerations are given.

Figure 11:
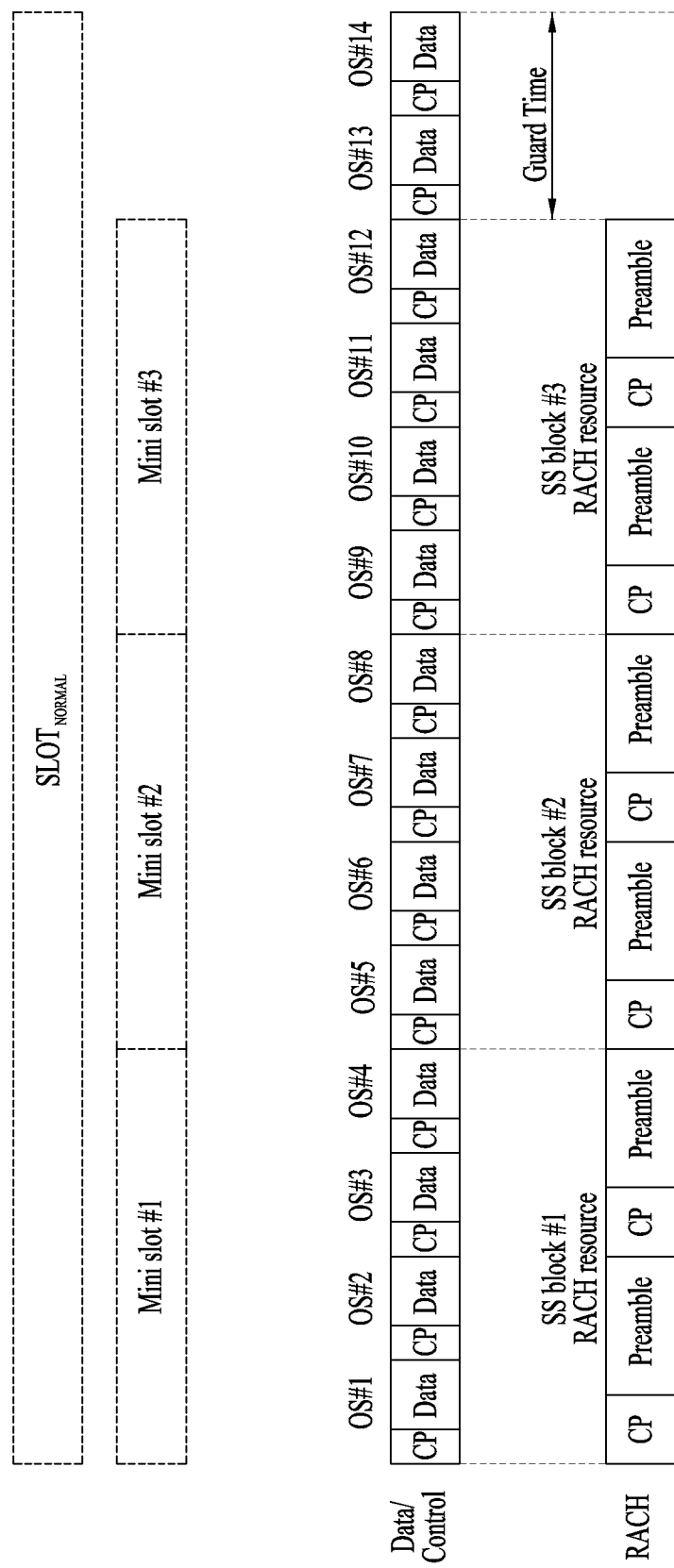
FIG. 11 illustrates a method of configuring a mini slot within a RACH slot $SLOT_{RACH}$ when BC holds.

1) The Case in which One Mini Slot is Defined for a Slot to which the RACH Resource is Allocated:

FIG. 11 illustrates a method of configuring a mini slot within a RACH slot $SLOT_{RACH}$ when BC holds.

The UE is aware of all information about RACH resources that the gNB uses through system information. Therefore, a set of minimum OFDM symbols including a whole RACH resource allocated per SS block may be defined as one mini slot. When the gNB performs scheduling at a time to which the RACH resource is allocated, the UE interprets the mini slot as a TTI and transmits the data or control channel in the TTI. If multiple mini slots are included in one normal slot, the UE needs to determine through which mini slot the UE is to transmit the data/control channel. A method for the UE to determine a mini slot to be used to transmit the data/control channel may broadly include the following two schemes.

A. If the gNB schedules transmission of a UL data/control channel, the gNB may designate, for the UE, which mini slot within a slot the UE should use for transmission, through DCI.

B. The UE continuously performs beam tracking in a multi-beam scenario. If the UE previously receives, from the gNB, information about an SS block to which a serving beam from which the UE currently receives a service is connected, the UE interprets the same time region as a time region to which the RACH resource connected to the SS block associated with the serving beam is allocated as a time region in which the UE should perform transmission. If the RACH resource connected to the SS block associated with the serving beam of the UE is not present in a slot scheduled for the UE, the UE may determine that beam mismatch has occurred.

Figure 12:
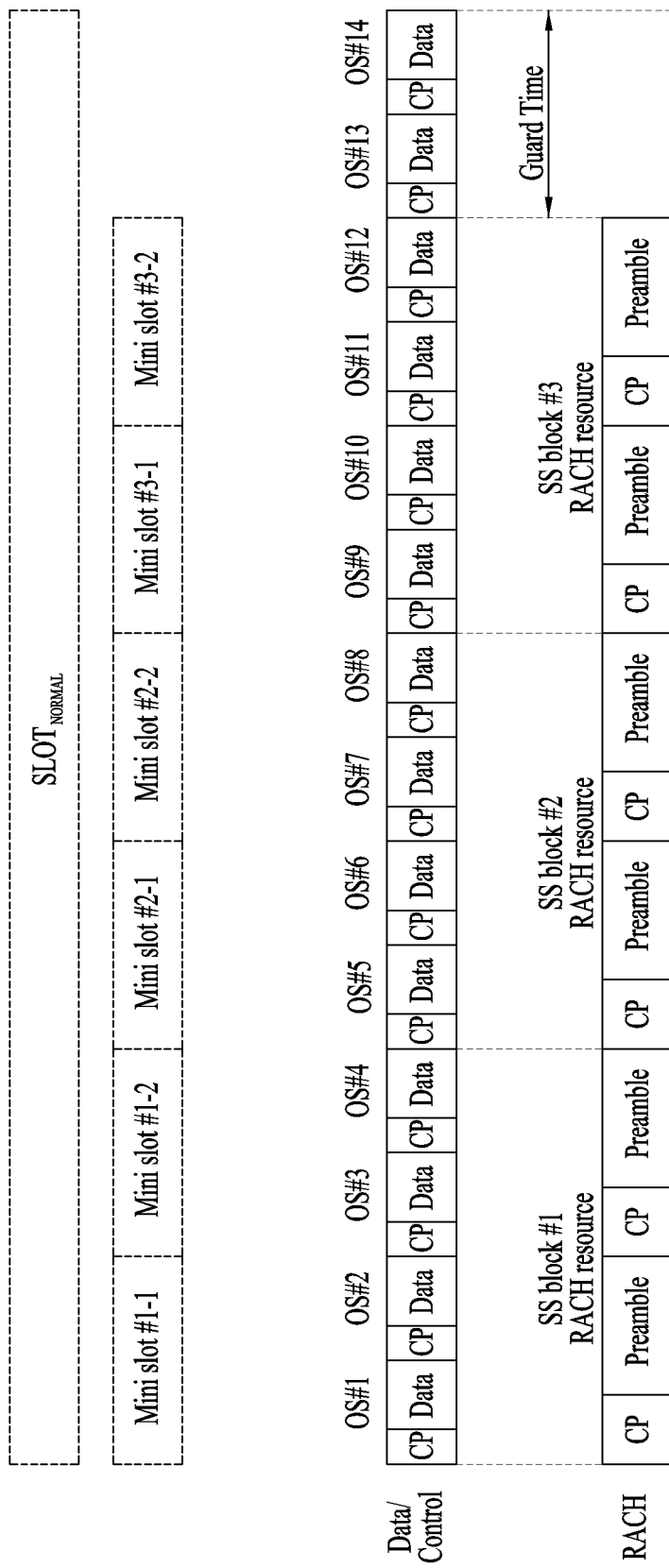
FIG. 12 illustrates another method of configuring a mini slot within a RACH slot $SLOT_{RACH}$ when BC holds.

2) The Case in which Multiple Mini Slots are Defined in a Slot to which the RACH Resource is Allocated:

FIG. 12 illustrates another method of configuring a mini slot within a RACH slot $SLOT_{RACH}$ when BC holds.

When multiple mini slots are defined in a slot to which a RACH resource is allocated, this is basically similar to the case in which multiple mini slots are defined in a slot to which a RACH resource is allocated except that multiple mini slots are present in a slot to which one RACH resource is allocated. The same operation as the method proposed in FIG. 11 is performed. However, as illustrated in FIG. 12, a set of minimum OFDM symbols including a whole RACH resource is divided into a few subsets and each subset is defined as a mini slot. In this case, the gNB should first inform the UE of how the set of minimum OFDM symbols including a RACH resource should be divided to use the mini slots. For example, the gNB may indicate, in a bitmap form, how the minimum OFDM symbols including the RACH resource are divided to the UE. Alternatively, when the minimum OFDM symbols including the RACH resource can be divided into a plurality of equal subsets, the gNB may inform the UE of the number of allocated mini slots. In addition, the gNB should indicate, to the scheduled UE, through which mini slot among the multiple mini slots the UE should transmit the data/control channel. The gNB may directly indicate a mini slot through which the data/control channel should be transmitted through the DCI. Alternatively, when the UE is scheduled in a time region to which the RACH resource is allocated, the gNB may inform the UE of a mini slot to be used, in advance (e.g., during connection setup). Alternatively, it is possible to determine a mini slot to be used by a predetermined rule using information, such as a UE ID, which is shared between the UE and the gNB.

Figure 13:
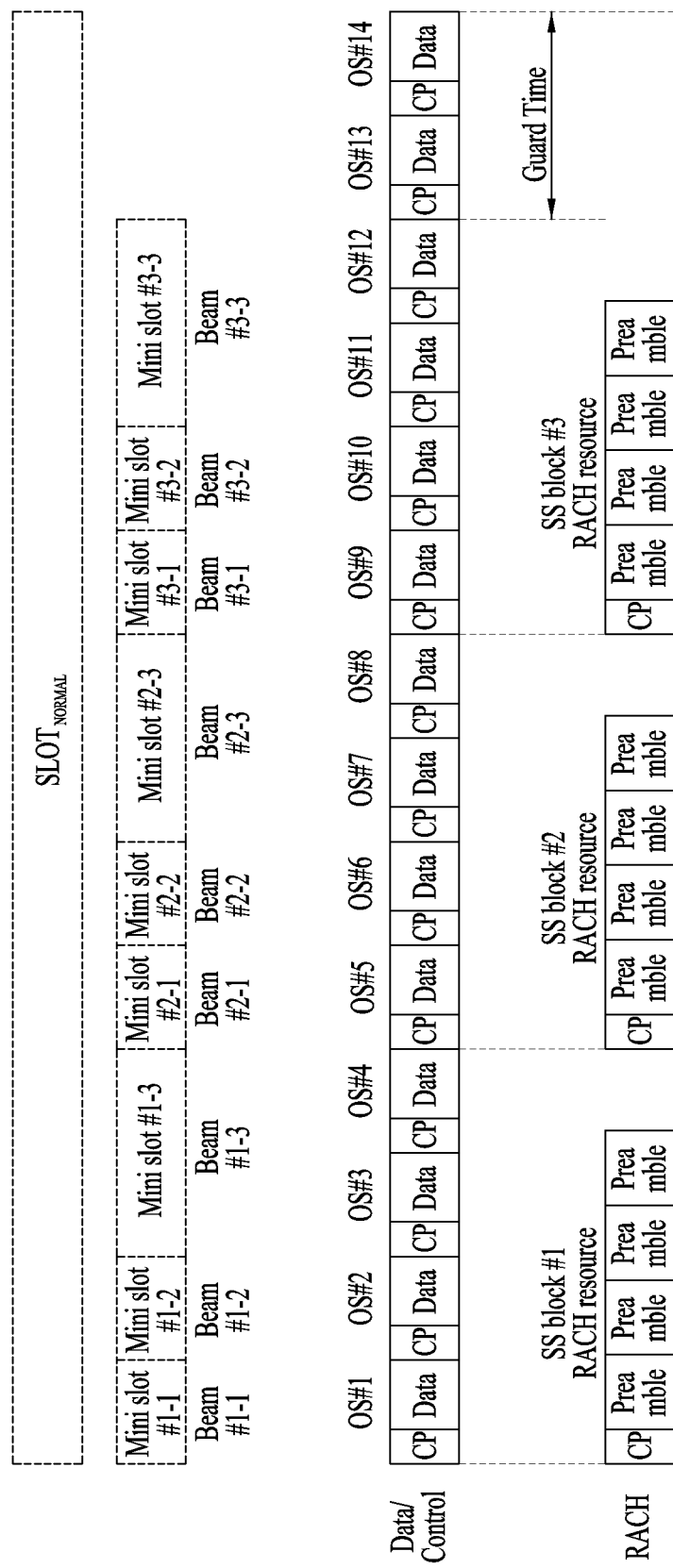
FIG. 13 illustrates a method of configuring a mini slot within a RACH slot $SLOT_{RACH}$ when beam correspondence (BC) does not hold.

3) The Case in which BC does not Hold and, Thus, Beam Scanning is Performed During Preamble Repetition:

FIG. 13 illustrates a method of configuring a mini slot within a RACH slot $SLOT_{RACH}$ when BC does not hold.

When BC does not hold, the gNB performs beam scanning while sweeping beam directions of a receiver in a slot to which one RACH resource is allocated, as described above. Therefore, this case may operate similarly to a scheme in which BC holds and multiple mini slots are present in a slot to which the RACH resource is allocated. To this end, similarly to the method described in FIG. 12, the gNB transmits, to the UE, information as to how beam scanning will be performed with respect to a set of minimum OFDM symbols including the RACH resource and information as to which SS block each beam is connected. This information may be used as information about which mini slot can be scheduled for the UE. In this case, similarly to the method described in FIG. 12, the UE may receive, through the DCI, the information about which mini slot among the multiple mini slots which can be scheduled for the UE is scheduled to transmit the data/control channel. Alternatively, the information may be prescheduled through an RRC signal or may be defined by a predefined rule using information shared between the gNB and the UE.

4) The Case of Grant-Free Scheduling:

A. When a time resource of a data/control channel transmitted by the UE on a grant-free resource overlaps a RACH resource, the data/control channel may be transmitted in a mini slot defined in a time region of the RACH resource. However, when grant-free scheduling is used and a signal format of the data/control channel that the UE is to transmit through the grant-free scheduling, i.e., through a grant-free resource, is a normal slot or a slot which is shorter than the normal slot but is longer than the mini slot defined in a RACH resource region and when the length of the mini slot is too short, so that a code rate of transmission of the data/control channel through the mini slot is too high relative to a designate code rate, the UE may i) drop transmission, ii) change a transport block size, or iii) transmit the data/control channel using multiple mini slots when the multiple mini slots are available. On the other hand, when the code rate of transmission of the data/control channel is lower than the designated code rate even if the data/control channel is transmitted with the length of the mini slot, the UE may transmit the data/control channel with a designated transport block size.

B. When grant-free scheduling is used and the signal format of the data/control channel that the UE is to transmit through the grant-free scheduling, i.e., through the grant-free resource, is shorter than the mini slot, the data/control channel may be normally transmitted at a mini slot location determined in the above-mentioned scheme. That is, if the data/control channel through grant-free scheduling requires a resource of a shorter length than the mini slot in the time domain, the UE transmits the data/control channel through a mini slot corresponding to the same gNB Rx beam as the data/control channel among mini slots configured to match the length of the RACH resource (i.e., RACH preamble). In this case, the transport block size may increase according to a predetermined rule in proportion to a mini slot length compared with a preconfigured signal format. For example, if the signal format in which the data/control channel is transmitted through grant-free scheduling is defined as using two OFDM symbols and the mini slot length in a RACH slot corresponds to three OFDM symbols, the transport block size capable of carrying the data/control channel of grant-free scheduling may increase by 1.5 times.

Figure 14:
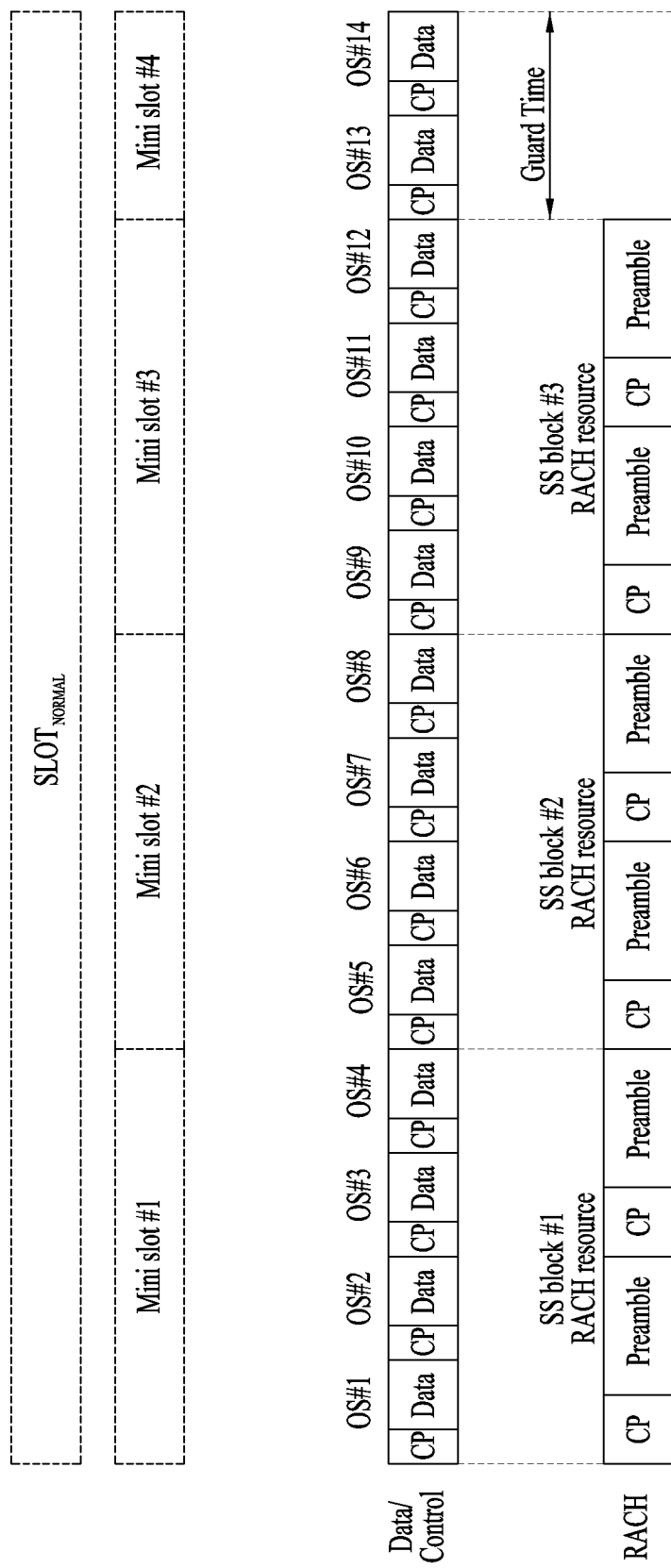
FIG. 14 illustrates a method of configuring a mini slot using a guard time.

5) Allocation of Mini Slot to Guard Time or Blank Duration:

FIG. 14 illustrates a method of configuring a mini slot using a guard time.

The gNB may freely configure an Rx beam with respect to a part of a duration configured as the guard time, or a blank duration in a slot remaining after configuring a RACH resource in one slot even though the blank duration is not for usage of the guard time. Accordingly, the gNB may inform the UE of information about a mini slot capable of being used independently of a beam for RACH resource reception together with information related to the RACH resource and the UE may expect that dynamic scheduling will be performed with respect to the mini slot configured in the guard time. The location(s) of allocated mini slot(s) may be determined by the above-described methods (e.g., methods of indicating the length and locations of mini slots configured in a RACH slot and a beam direction).

6) Allocation of Short PUCCH Resource:

In a TDD system, a control channel may be transmitted during a partial duration of one slot by configuring the control channel with a short length. In an NR system, schemes in which a DL control channel is transmitted in a front part of one slot and a UL control channel is transmitted in the last part of one slot are under discussion. Particularly, the UL control channel transmitted in this way is referred to as a short PUCHH. Since the short PUCCH is configured to be transmitted on the last one or two symbols, the short PUCCH may be transmitted in the above-described mini slot. However, as mentioned previously, since a beam direction may vary within one slot, the short PUCCH cannot always be located at the last part of the slot. Accordingly, when the short PUCCH is scheduled in a slot region to which a RACH resource is allocated, the UE transmits the short PUCCH in a mini slot in which a beam in the same direction as a beam from which the UE receives a service (i.e., a gNB Rx beam, or a UE Tx beam corresponding to the gNB Rx beam) or a beam in which the gNB previously forms a link for the short PUCCH (i.e., a gNB Rx beam, or a UE Tx beam corresponding to the gNB Rx beam) is present. In this case, the PUCCH may be transmitted at the last symbol location in the mini slot, a symbol location designated by the gNB through signaling, or a symbol location determined by a rule. However, the UE may drop transmission of the short PUCCH when the beam in the same direction as a beam from which the UE receives a service or the beam in which the gNB previously forms a link for the short PUCCH is not present.

Mini Slot Concatenation

In the procedure of forming the Rx beam for the RACH resource set, if Rx beam directions of respective RACH resources are not greatly different, the data or control channel may be transmitted through a long slot for performing transmission throughout a duration of the RACH resource set. This may be referred to as mini slot concatenation in which the above-described mini slots are used through concatenation as described above.

Figure 15:
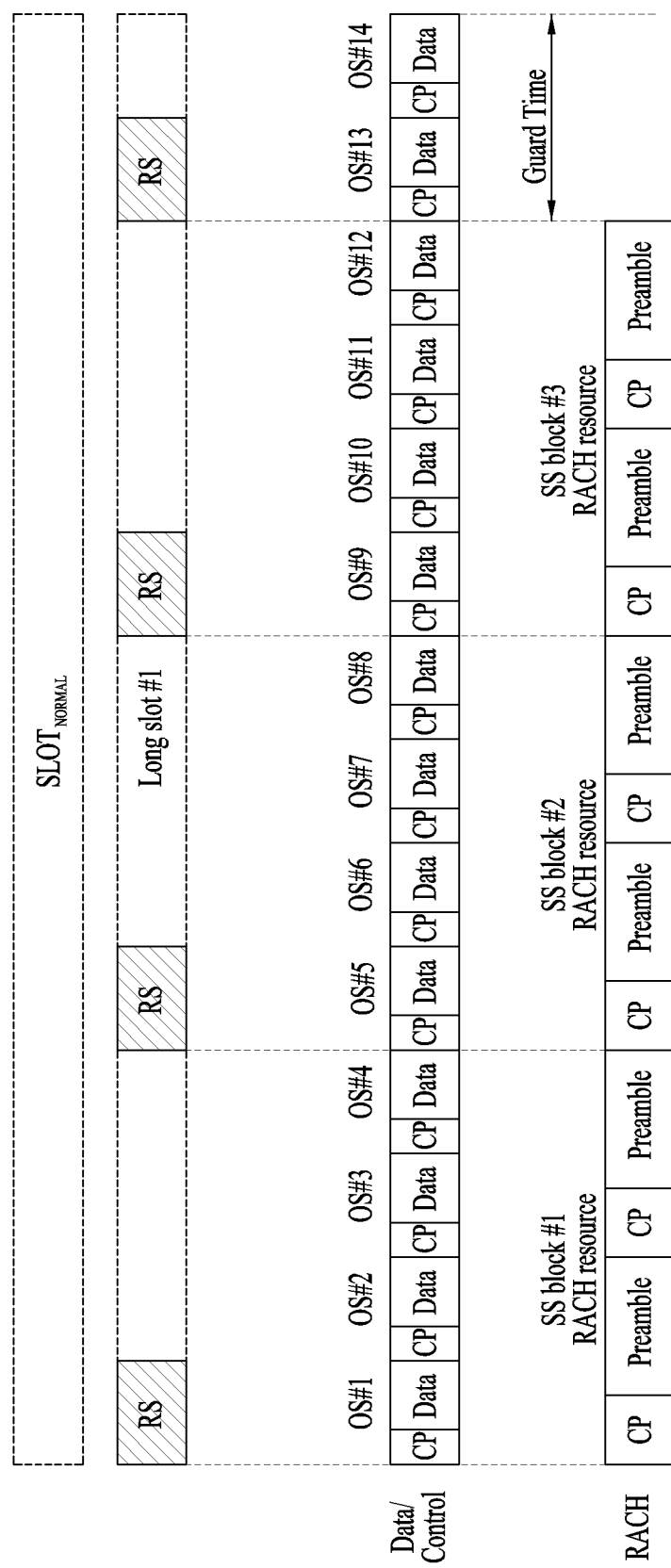
FIG. 15 illustrates an example of transmitting data by performing mini slot concatenation with the same length as a normal slot when BC holds.

FIG. 15 illustrates an example of transmitting data by performing mini slot concatenation with the same length as a normal slot when BC holds. Particularly, FIG. 15 illustrates transmission of concatenated mini slots and insertion of a reference signal during a RACH resource duration when BC holds. For example, one data packet may be transmitted throughout a long slot obtained by concatenating mini slots so that the long slot may have the same length as a normal slot. In this case, one data packet is dividedly transmitted in mini slots within the long slot.

Thus, in the case of data transmission using the concatenated mini slots, since the gNB forms an Rx beam of each RACH resource using information about an SS block transmission direction, the UE desirably transmits a signal in a direction capable of receiving each SS block with the best quality. Therefore, the gNB informs the UE of information related to Rx beam formation (e.g., information associated with the SS block) with respect to each OFDM symbol (when BC does not hold) or with respect to each RACH resource (when BC holds) in a RACH resource time region. In this case, smooth reception of the data channel may not be performed because the Rx beam of the gNB is changed during signal transmission while the UE performs signal transmission through concatenated mini slots and transmits a reference signal in a format defined for a normal slot. Therefore, it is necessary to insert the reference signal in a unit in which the Rx beam direction of the gNB varies in consideration of variation in the Rx beam direction of the gNB. To this end, a reference signal structure for the concatenated mini slots allocated in a RACH resource duration may be desirably defined. The UE to which the data or control channel of a concatenated mini slot format is allocated in the RACH resource duration should transmit the reference signal of the concatenated mini slot format.

During transmission of a PUSCH or a PUCCH, if one stable gNB Rx beam for a UE Tx beam direction of the PUSCH or the PUCCH is not present or a plurality of beams has similar quality, the PUSCH or a long PUCCH may be stably received by transmitting the PUSCH or the PUCCH through concatenated mini slots so as to use a beam diversity characteristic. In this case, the gNB may efficiently use a time resource to which a RACH resource is allocated by transmitting the PUSCH or the PUCCH in a RACH resource region.

Additionally, the gNB performs beam tracking for a Tx beam or an Rx beam so that a beam having the best quality is maintained as a serving beam in order to stably maintain a service in a multi-beam environment. Accordingly, the gNB may measure quality of the gNB Rx beam or the UE Tx beam and perform beam tracking by causing the UE to perform repetitive transmission of the PUSCH, the long PUCCH, or a short PUCCH in each RACH resource region or transmit an RS defined for beam tracking through a plurality of mini slots, using a characteristic in which the gNB changes the Rx beam in a slot duration to which the RACH resource is allocated. That is, for efficient use of a resource for beam tracking, the gNB may cause the UE to transmit a physical channel suitable for a characteristic for a time region to which the RACH resource is allocated and the gNB may use the physical channel as a resource for beam tracking. In other words, for efficient use of the resource for beam tracking, the gNB may indicate, to the UE, that the UE should transmit the physical channel through a UE Tx beam suitable for each of mini slot(s) configured in the time region to which the RACH resource is allocated and the gNB may use the physical channel in each mini slot for beam tracking. In order for the UE to efficiently transmit a signal for beam tracking, the gNB informs the UE of information about change in a beam direction as described above and the UE inserts a reference signal into each Rx beam of the gNB according to this information and a predefined rule and transmits the reference signal. The gNB may use the reference signal as a signal for channel estimation for an Rx beam duration or a signal for signal quality measurement for beam tracking.

Upon transmitting the PUSCH or the long PUCCH which is received in the gNB through beam diversity, since the gNB attempts to receive a signal in each Rx beam duration, antenna gain may have a different characteristic. Therefore, the UE may differently configure transmission power of the PUSCH/PUCCH with respect to each Rx beam direction (e.g., each RACH resource region). To this end, the gNB may inform the UE that reference channel/signal information and a power control parameter, for pathloss calculation used for open loop power control, should be separately configured with respect to each RACH resource region. The UE configures and transmits different transmission powers in a RACH resource time region using this information.

Unlike this, during transmission of a signal for beam tracking (or beam management) in a plurality of RACH resource regions, the respective RACH resource regions should maintain the same transmission power in order for a gNB to measure quality of a signal received by the gNB. In this case, only one reference channel/signal is needed for control of one power. If the gNB informs the UE of information about the reference channel/signal or the information is predefined by a rule, the UE may determine the magnitude of transmission power using the reference channel/signal and transmit the PUSCH/PUCCH by equally applying the transmission power to all regions.

The gNB may inform the UE of whether UL data or the control channel transmitted in a RACH resource transmission time region, i.e., a time region to which the RACH resource is configured in a corresponding cell, is used for beam diversity or for beam tracking with respect to each UL channel and cause the UE to perform a power control operation according to the above usage.

<PRACH Configuration>

PRACH configuration includes time/frequency information of a RACH resource and may be included in the remaining minimum system information (RMSI). The RMSI may be interpreted as a system information block 1 (SIB1) and represents system information that the UE should acquire after receiving a master system information block (MIB) through a physical broadcast channel (PBCH). Upon receiving the PRACH configuration information, the UE is able to transmit PRACH message 1 (Msg1) on a designated time and frequency resource using one preamble in a preamble set included in the PRACH configuration. A preamble format in the PRACH configuration information may also provide CP length, number of repetitions, subcarrier spacing, sequence length, etc. Hereinafter, details on the PRACH configuration will be described.

1. RACH Resource Configuration in Time Domain

Figure 16:
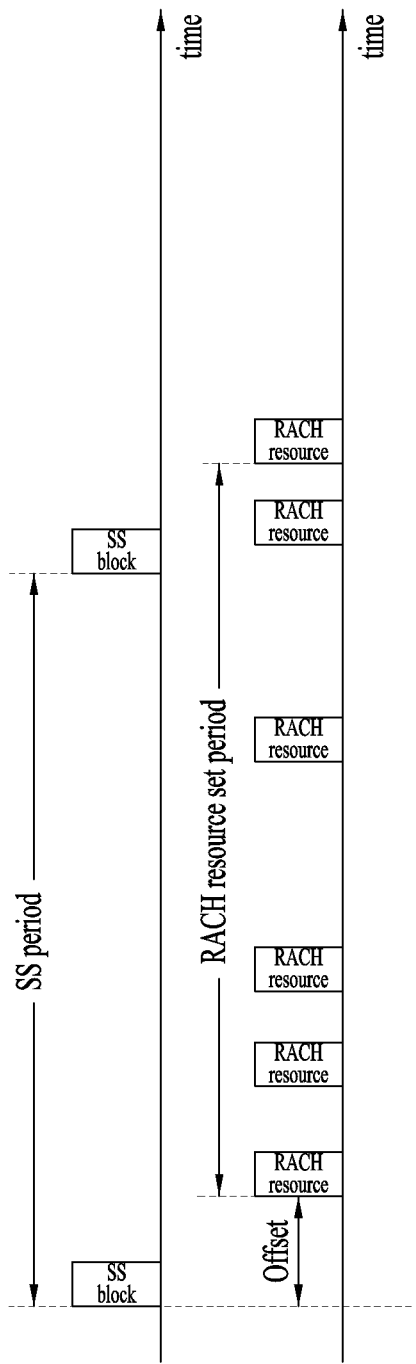
FIGS. 16 and 17 illustrate RACH resource configuration in the time domain.
Figure 17:
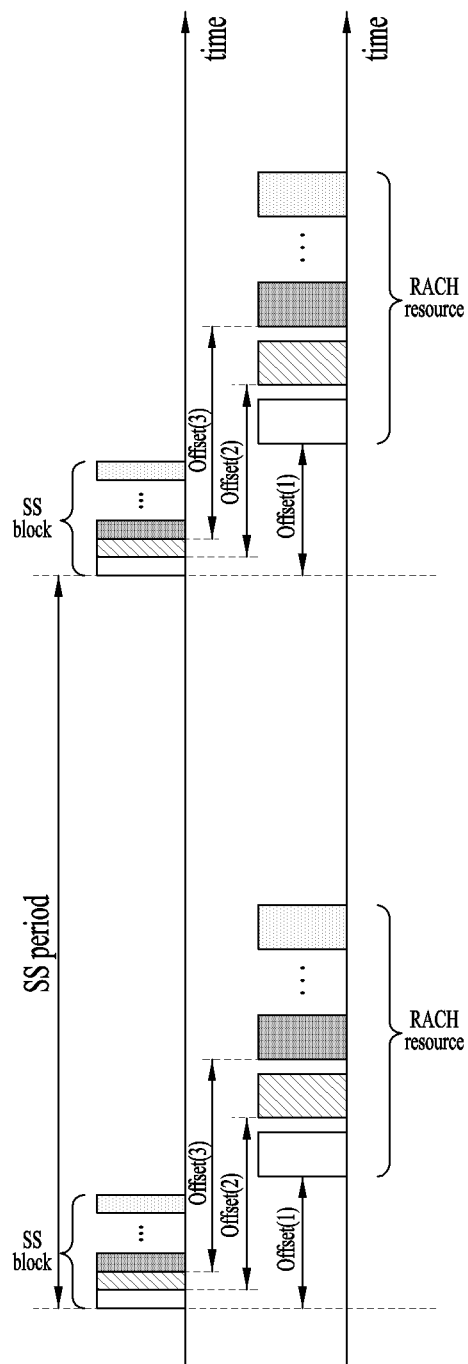

FIGS. 16 and 17 illustrate RACH resource configuration in the time domain.

RACH resource configuration in the time domain will now be described with reference to FIGS. 16 and 17. Herein, a RACH resource may mean a time/frequency resource in which PRACH Msg1 can be transmitted. Particularly, the RACH resource is associated with an SS block in order to be able to identify a preferred DL transmission beam direction. Each RACH resource in the time domain is associated with an SS block index.

A set of RACH resources in the time domain may be defined in terms of a default periodicity of an SS block in a cell. Multiple occasions of RACH resources in the time domain associated with one SS block may be present within the RACH resource set. Referring to FIG. 16, an SS block period and a RACH resource set period may be configured as illustrated in FIG. 16. The RACH resource set period may be determined based on the SS block period and, within the RACH resource set period, multiple RACH resources may be configured. Meanwhile, the RACH resource set period may be configured by the PRACH configuration information as described above and, in this case, the RACH resource set period may be equal to a PRACH configuration period. In the present invention, the PRACH configuration period, i.e., a RACH configuration period, may mean a time period in which a set of RACH resource(s) occurs according to RACH configuration.

In FIG. 16, each time instance to which a RACH resource is allocated is referred to as a RACH occasion. That is, when only the time domain and the frequency domain are considered without considering the sequence domain, one RACH resource may be referred to as one RACH occasion. If the RACH resource set period is determined based on the SS block period, an exact timing instance may be indicated as an offset from a transmission timing of an SS block associated with a corresponding RACH resource. Exact positions of RACH occasions within the RACH resource set are provided to the UE.

FIG. 17 illustrates a method of indicating association between an SS block and a RACH resource. Each RACH resource set is configured using an SS block period. An exact starting location in the time domain may differ per RACH resource set corresponding to an SS block. Therefore, a timing offset from each SS block to a corresponding RACH resource set may be signaled.

The duration of a RACH resource is determined by a PRACH preamble format. The length of a RACH preamble including a guard time (e.g., a preamble format) is configured depending on cell coverage. In addition, the number of preamble repetitions determines the duration of the RACH resource. Therefore, the configuration of the RACH resource includes the number of RACH sequence repetitions for indication of a preamble length in addition to a RACH preamble format for a CP length.

As described above, in the NR system using multiple beams, an initial DL beam acquisition procedure is preferentially performed through detection of the SS block having best reception quality. Thereby, the UE informs the gNB of information about a preferred DL beam through an initial RACH procedure. Therefore, in the NR system, the UE may indirectly indicate information about a beam index corresponding to an SS block detected thereby through a resource location for RACH preamble transmission. For example, as described with reference to FIG. 5, a RACH resource is linked to each SS block and the UE informs the gNB of the information about the beam index in the form of the RACH resource connected to each SS block. That is, the UE may inform the gNB of a DL beam preferred by the UE, i.e., an SS block, by transmitting a PRACH using a RACH resource associated with the SS block detected by the UE.

Thus, since the time/frequency resource of the RACH resource is basically connected to the SS block, it is desirable to allocate the RACH resource based on a basic transmission period of the SS block used in the initial access procedure. However, when there is a small number of UEs located in a cell of the gNB, the RACH resource may be intermittently allocated compared to the basic transmission period. Therefore, the present invention proposes that a slot to which the RACH resource is allocated be defined as a RACH slot and a periodiocity of the RACH slot be configured as a multiple of the basic transmission periodiocity of the SS block. Although the above description has been given based on a multi-beam environment, it may be efficient even in a single-beam environment to allocate the RACH resource in the same manner as that in the multi-beam environment, in order to maintain the same structure as that in the multi-beam environment. In addition, the periodiocity of the RACH slot may be associated with a RACH configuration periodiocity configured by the above-described PRACH configuration information. A period of RACH slots in the same location or having the same index within one RACH configuration period may be the same as the RACH configuration period. Information about a RACH time resource among RACH resource allocation information transmitted by a network/gNB to the UE may include elements described below.

1) Associated SS block index
2) Location of a RACH slot from an SS block
3) A RACH slot period expressed as a multiple of an SS block period or a function of the SS block period
4) An offset value for indicating an exact location without ambiguity when the RACH slot period relative to the SS block period is greater than 1. In this case, the offset value is configured based on subframe number 0.

In this way, if the time/frequency resource to which the RACH resource is allocated is associated with the SS block, the number of RACH resources, which corresponds to a timing at which the UE can perform RACH transmission, may be basically identical to the number of SS blocks. Generally, although the RACH resource includes all of time, frequency, and code domain resources in which a RACH preamble can be transmitted, the RACH resource in the present invention means a time/frequency resource block in which the RACH preamble can be transmitted, for convenience of description. However, the RACH resource mentioned together with a preamble sequence conceptually includes the sequence domain, i.e., the code domain. For example, if RACH resources share the same time/frequency resource, the RACH resources are one RACH resource in terms of the time/frequency resource but may correspond to a plurality of RACH resources when up to the sequence domain is considered.

However, in an environment in which there is a small number of UEs within the gNB, it may be inefficient to allocate a different RACH resource to each SS block. Therefore, if the gNB may receive RACH preambles through the same Rx beam or may simultaneously receive the RACH preambles through a plurality of beams, the same time/frequency resource may be allocated to RACH resources connected to a plurality of SS blocks. That is, multiple SS blocks may be associated with one RACH time-frequency resource. In this case, the SS blocks for the RACH resource may be distinguished by preamble indexes or preamble index sets used by the RACH resources. That is, the number of RACH resources may be allocated to be equal to or less than the number of SS blocks.

The gNB determines in which time/frequency region the RACH resource should be allocated and informs the UE of related information through system information. In the LTE system, since one or two subframes have constituted a RACH slot according to a preamble format, if the gNB designates a specific subframe location through the PRACH configuration information, the UE could be aware of the location of the RACH resource in the time domain. On the other hand, in the NR system, information different from that in the LTE system is required according to configuration and environment of the gNB. Particularly, in the NR system, a RACH preamble defines a base sequence of a short length due to robustness to a high Doppler frequency, Rx beam scanning, and design matched for TDD/FDD and configures the base sequence in the form of repetition to secure beam scanning and coverage. Hence, there is a high possibility that the location of the RACH time resource is variable according to the gNB or environment. Further, the NR system may be configured by a plurality of small cells having a very small size. In this case, the length of the RACH preamble becomes very short and a RACH slot in which a plurality of RACH preambles can be transmitted in the time domain may be configured. For example, RACH time resource information may be provided to the UE as illustrated in FIG. 18.

FIG. 18 illustrates RACH time resource information. Information related to a time resource of a RACH resource, i.e., PRACH time resource information, may include the following information:

1) A relative location of a RACH resource/slot to an SS block location of the RACH resource, or a location of a RACH slot to an SS period;
2) A location of an OFDM symbol on which a RACH resource is started within a RACH slot;
3) A preamble format for a RACH resource (i.e., CP length or sequence length) and the number of sequence repetitions; and/or
4) Information as to how many RACH resources defined as described above are allocated in the time domain. If multiple RACH resources are allocated and the multiple RACH resources are not consecutive in the time domain, this information indicates information corresponding to each location, for example, a relative location or an absolute location of each RACH resource.

Meanwhile, even if RACH resources linked to multiple SS blocks share the same time/frequency resource, the UE needs to transmit a RACH preamble by discerning to which SS block the RACH resources of the same time/frequency resource are linked in order to transmit beam acquisition information to the gNB. To this end, available preamble sequences in one RACH resource need to be separately allocated with respect to each SS block. In the LTE and NR systems, preamble sequences are configured by a combination of a root sequence for determining a base sequence and cyclic shifted versions of a sequence and orthogonal cover sequences having a zero correlation property within each root sequence. Herein, in order to raise efficiency of resources, multiple root sequences may be allocated to secure a large number of preamble sequences within the RACH resource. Generally, a cross correlation between the root sequences is greater than a cross correlation between sequences having different cyclic shift versions or sequences having different orthogonal covers. In addition, since a signal received from a beam different from a beam suitable for the UE is weak in reception intensity due to a beam characteristic, RACH reception performance is not affected even though a cross correlation between corresponding sequences has a slightly large value with respect to a beam direction different from a beam direction for the UE. Therefore, if multiple RACH resources share the same time/frequency resource, it is desirable that the respective RACH resources be configured by preamble sequences having as small a cross correlation as possible. As in the above-described embodiment, if RACH preamble sequences are configured by a combination of a root sequence and sequences having different cyclic shift versions or different orthogonal covers within the root sequence, preamble sequences having different cyclic shift versions within the same root sequence or preamble sequences having different orthogonal covers within the same root sequence may be allocated to RACH resources linked to the same beam, i.e., one SS block and then different root sequence indexes may be allocated. For example, preamble sequences may be allocated to a RACH time/frequency resource, as illustrated in FIG. 19.

FIG. 19 illustrates an example of allocating RACH preamble sequences.

Referring to FIG. 19, root sequences {15, 27, 127, 138} are allocated to one time/frequency resource and orthogonal covers {0, 1} and cyclic shift versions {0, 1, 2, 3} are allocated to each root sequence. If two RACH resources are allocated to the time/frequency resource, a ZC index consisting of an OCC index and a cyclic shift version is first allocated to a RACH resource linked to an N-th SS block and a RACH preamble sequence set consisting of two root sequences {15, 27} is allocated. The RACH preamble sequence set is also allocated in the same order to a RACH resource linked to an (N+1)-th SS block. To inform the UE of the RACH resource, the gNB informs the UE of information for configuring a RACH preamble sequence set for each RACH resource and determines an order of RACH preamble sequences within a RACH preamble sequence set by a predefined rule. According to the predefined rule, a RACH preamble sequence index first increases with respect to {OCC index, cyclic shift version} and the next RACH preamble sequence index increases based on a root sequence index. That is, the RACH preamble sequence index preferentially increases according to an order of a low cross correlation between sequences.

2. RACH Resource Configuration in Frequency Domain

PRACH configuration may provide a RACH resource in the frequency domain. When the UE attempts to transmit a PRACH in a situation in which the UE has not yet connected to a cell, the UE may not be aware of whole system bandwidth or resource block indexing.

In the LTE system, an SS is transmitted in the center of system bandwidth and a PBCH provides the system bandwidth so that the UE may easily obtain an exact location of a RACH resource. However, in the NR system, the SS is not guaranteed to be transmitted in the center of the system bandwidth. Therefore, in the NR system, it may not be easy to obtain resource block indexing when the UE transmits the PRACH. Hence, a method of providing a RACH resource location in the frequency domain is needed.

UEs in an idle mode acquire frequency synchronization based on an SS block and therefore it is preferable that information about a frequency location of a RACH resource is provided in terms of SS block bandwidth. The RACH resource in the frequency domain should be located within a bandwidth of the SS block in which the UE detects the SS block. The transmission bandwidth of a RACH preamble has a fixed value with a 15 kHz default subcarrier spacing of a PSS/SSS/PBCH. For example, the transmission bandwidth of the RACH preamble may be fixed to 1.08 MHz at a 15 kHz default subcarrier spacing. If the transmission bandwidth of the RACH preamble is 1.08 MHz, the transmission bandwidth of the SS block assumed to have a 15 kHz subcarrier spacing is four times the transmission bandwidth of the RACH preamble. A network needs to provide an exact location of the RACH resource in the frequency domain within the SS block.

If the network configures a RACH resource outside an SS block in which the PSS/SSS/PBCH is transmitted, information about the RACH resource should be signaled based on a bandwidth of the SS block and a bandwidth of the RACH resource. Whole system bandwidth is indexed in units of SS block bandwidth.

3. Number of Resources in Time Domain

If a short ZC sequence is used for an NR PRACH preamble, the short ZC sequence may cause sequence shortage in a time resource (defined as a CP and a RACH preamble). In order to overcome this problem, multiple time and frequency resources in a RACH may be allocated for a RACH resource and the gNB needs to inform the UE of how many time resources are used in a RACH slot in addition to frequency resource information.

4. Sequence Information

In the LTE system, 64 sequences are allocated to a RACH resource. If a root code (i.e., root sequence) is assigned, then a cyclic shift version of the root code is first mapped to a preamble index before use of another root code due to a zero cross correlation property.

An NR PRACH may reuse the same property. Sequences with the zero cross correlation property may be first allocated for a RACH preamble. The zero cross correlation is provided by a cyclic shift version and a predefined orthogonal cover (if defined). If a root code is assigned, then the orthogonal cover is allocated by a predefined rule or configuration and the cyclic shift version with the root code and the orthogonal cover is mapped to a preamble index.

In summary, PRACH configuration signaled to the UE by the gNB may include the following parameters:

RACH resource allocation in the time/frequency domain: Preamble format (a CP duration and the number of repetitions of a ZC sequence)

Sequence information: Root code index, orthogonal cover index (if defined), cyclic shift length 5. Association Between RACH Resource and SS Block Index Hereinafter, a method of signaling link information between transmission beam directions of the gNB and RACH resources in an initial access state to the UE will be described in detail. The transmission beam direction of the gNB refers to a beam direction of an SS block as described above and, when the UE can observe/measure a specific RS in addition to the SS block in the initial access state, the transmission beam direction of the gNB may additionally refer to the corresponding RS. For example, the specific RS may be a CSI-RS.

In NR, a plurality of SS blocks may be formed and transmitted according to the number of beams of the gNB. Each SS block may have a unique index. The UE may derive an index of an SS block to which a corresponding PSS/SSS/PBCH belongs by detecting the PSS/SSS and decoding a PBCH. Next, system information transmitted by the gNB includes RACH configuration information. The RACH configuration information may include a list of multiple RACH resources, information for identifying the multiple RACH resources, and link information between each RACH resource and each SS block.

In the above description, the RACH resource has been limited to a time/frequency resource in which the UE is capable of transmitting the PRACH preamble. Likewise, in a description given below, the RACH resource is also limited to the time/frequency resource. Hereinafter, a method for indicating a RACH location in the frequency domain as well as a RACH location in the time domain will be described. As described above, one RACH resource has been linked to one or more SS blocks and consecutive RACH resources in the time domain have been defined as the RACH resource set. Plural RACH resource sets which are consecutive in the frequency domain as well as in the time domain are defined as one RACH resource block.

Figure 20:
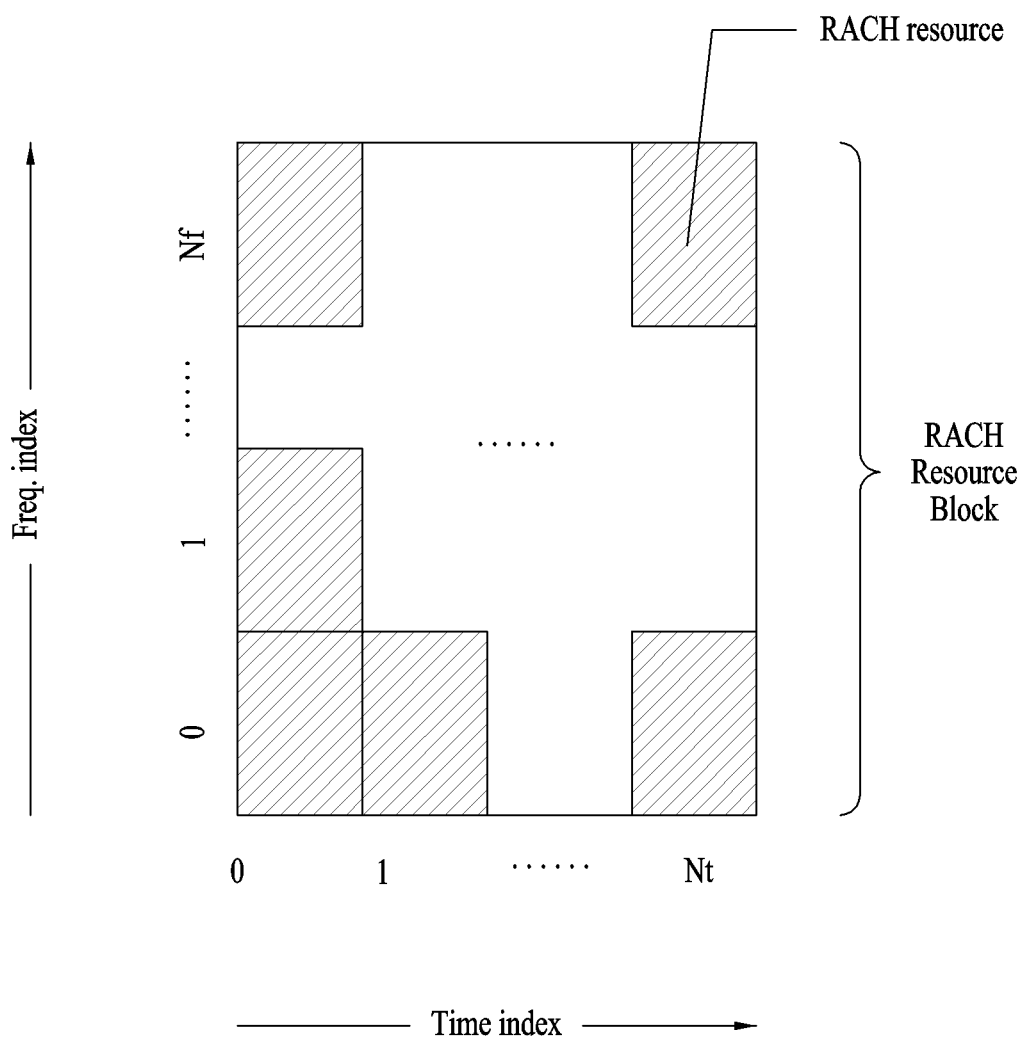
FIG. 20 illustrates a RACH resource block.

FIG. 20 illustrates a RACH resource block.

As illustrated in FIG. 20, the RACH resource block may be defined as one time/frequency chunk in which RACH resources are gathered. Respective RACH resources in the RACH resource block have unique indexes determined by time/frequency locations.

RACH resource indexes in the RACH resource block are mapped by a specific rule. For example, the RACH resource indexes may be assigned in a frequency-time order or time-frequency order. For example, referring to FIG. 20, in the case of the frequency-time order, RACH resources in the RACH resource block may be indexed as follows.

RACH resource #0 (time, frequency): (0,0),
RACH resource #1: (1, 0)
RACH resource #2: (2, 0)
. . .

Herein, a unit of a time axis length in the RACH resource block may be determined by a RACH preamble format and a unit of a frequency axis length may be determined by a unit of a RACH resource bandwidth (e.g., 1.08 MHz) or a resource block group (RBG).

Meanwhile, when the UE requests system information transmission by transmitting a specific RACH preamble, a plurality of RACH resource blocks may be designated in one system/cell according to the number of SS blocks or for the purpose of transmitting system information. Especially, when there are a large number of SS blocks, if all RACH resources corresponding to the respective SS blocks are consecutively configured as mentioned above, severe restrictions may be imposed on a UL/DL data service. Therefore, the network may configure consecutive RACH resources in the time/frequency domain as a RACH resource block and discontinuously arrange each of the configured RACH resource blocks. Thus, a plurality of RACH resource blocks may be configured and each of the RACH resource blocks may also have a unique index.

Figure 21:
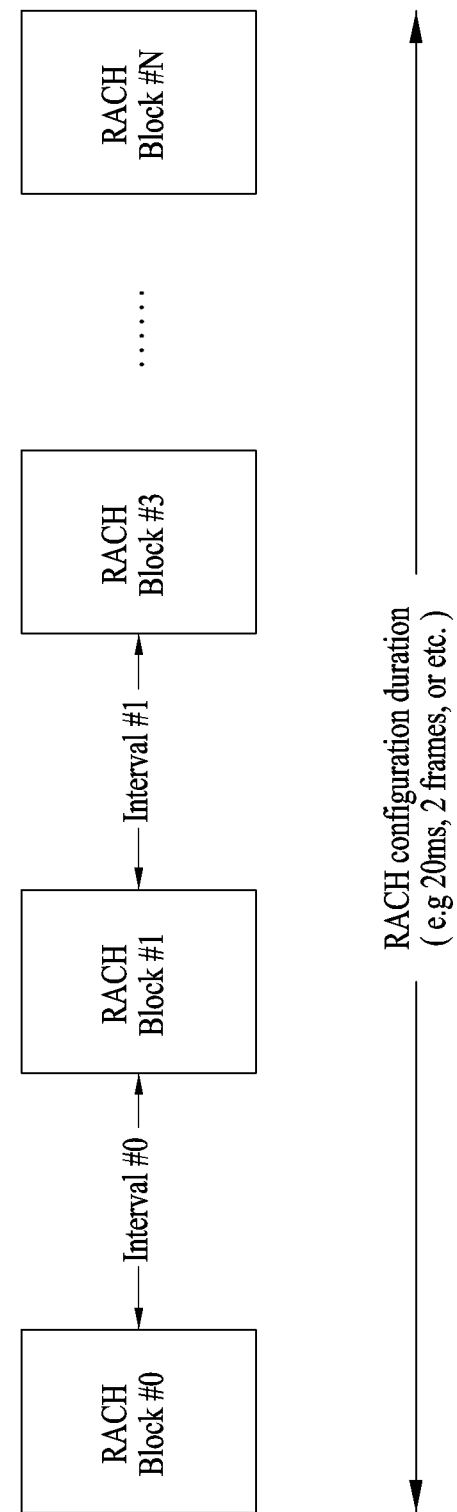
FIG. 21 illustrates a RACH configuration duration according to the present invention.

In other words, a duration in which RACH resource block(s) are configured (hereinafter, a RACH configuration duration) may be designated in one system/cell and one or more RACH blocks may be present in the RACH configuration duration. FIG. 21 illustrates a RACH configuration duration according to the present invention. Information of which the network/gNB should inform the UE may include the length of the RACH configuration duration, the number of RACH resource blocks (i.e., RACH blocks), and the location of each RACH block. As illustrated in FIG. 21, intervals between RACH blocks within the RACH configuration duration may be indicated to the UE. For example, the network/gNB may inform the UE of a relative location from RACH block #0, such as the number of slots or offset information of an absolute time unit, as RACH block location information, or may directly inform the UE of a start slot index of each RACH block within the RACH configuration duration.

Figure 22:
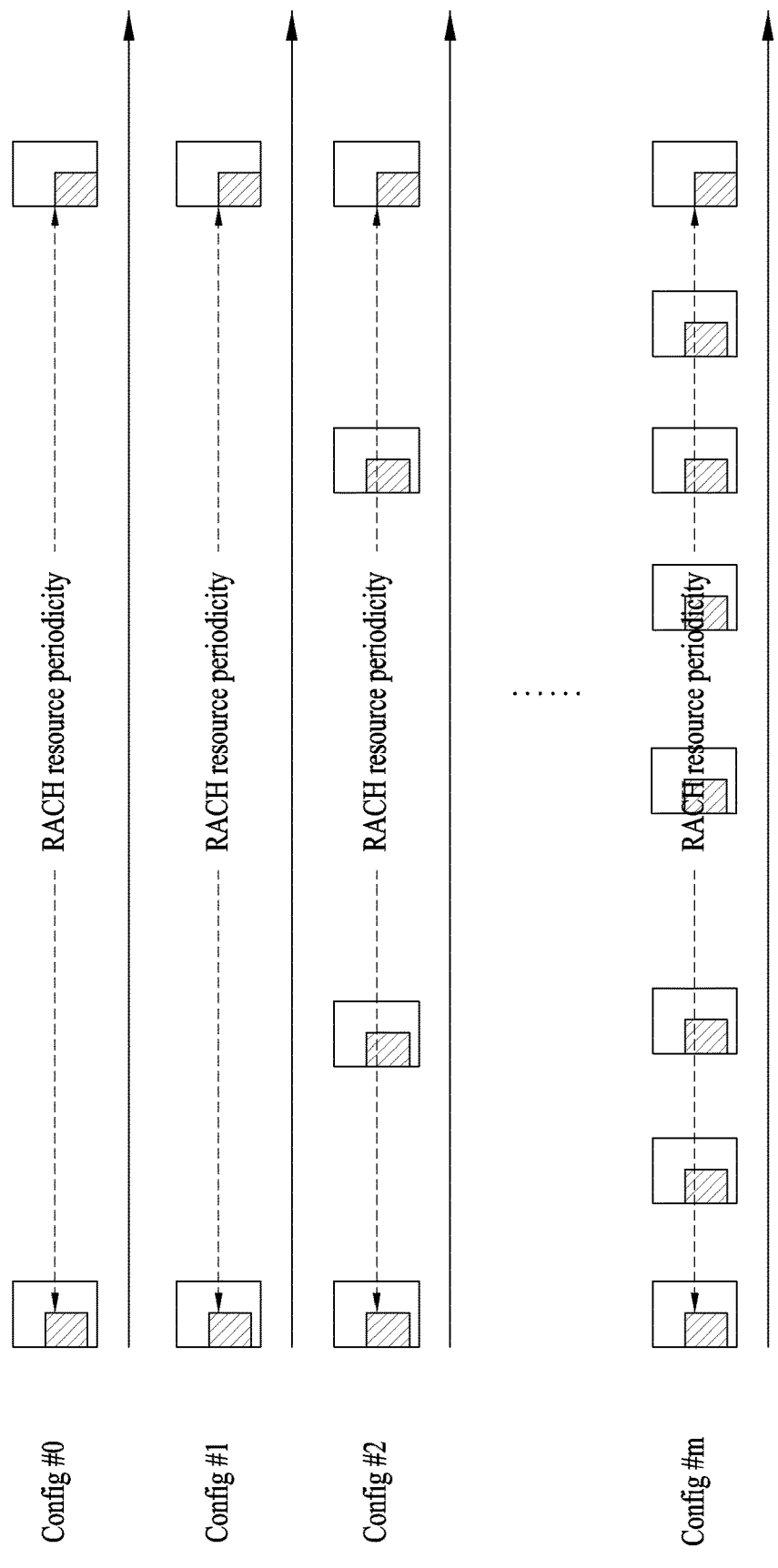
FIG. 22 illustrates a configuration of each RACH resource within a RACH resource block.

Each RACH resource within each RACH resource block may have a unique configuration. In this case, occurrence frequency and period of each RACH resource may differ with respect to and each RACH resource may be linked to a specific SS block, CSI-RS, or DL beam direction. In this link relationship, information about this link relation is provided to the UE. FIG. 22 illustrates a configuration of each RACH resource within a RACH resource block. Slot indexes that can be reserved as RACH resources in a specific RACH resource period may be defined in the standard document. As illustrated in FIG. 22, different configuration numbers may be allocated according to an occurrence frequency of a RACH resource. The network/gNB may inform the UE of an occurrence frequency/period of a specific RACH resource by indicating a specific configuration number through system information.

The network may inform the UE of the number of RACH resource blocks (i.e., RACH blocks) and a starting time (e.g., slot index) of each RACH resource block. In addition, upon informing the UE of information about each RACH resource block, the network informs the UE of the number Nt of RACH resources in the time domain and the number Nf of RACH resources in the frequency domain. Nt and Nf may differ according to each RACH resource block. The network/gNB maps RACH resource indexes in the RACH resource block according to the time/frequency locations of RACH resources and informs the UE of information indicating a period/occurrence frequency of each RACH resource (e.g., configuration number) and information about a linked SS block or CSI-RS index. In this case, the period/occurrence frequency of each RACH resource may be indicated to the UE by indicating a specific configuration number which is configured according to the occurrence frequency of the RACH resource as described above.

In addition, a RACH preamble format may be configured with respect to each RACH resource. Although all RACH preamble formats may be equally configured in a system, the above-described RACH preamble formats may be differently configured between RACH resource blocks while equally maintaining a subcarrier spacing and the number of repetitions within the RACH resource block in reality. Notably, although the number of repetitions of the RACH preamble within the same RACH resource block may be equally configured, respective RACH resources included in the RACH resource block may be configured to use different preamble sequences. For example, respective RACH resources in the RACH resource block may be configured to use different root indexes or cyclic shift (CS) versions.

In summary, in terms of signaling for a RACH configuration, the network performs a procedure of identifying a time/frequency resource for RACH preamble transmission, i.e., a RACH resource. To this end, in the present invention, a RACH resource index is determined by a RACH resource block index and by a RACH resource index within the RACH resource block and the occurrence frequency/period of the RACH resource of each RACH resource index may correspond to each of plural RACH configuration numbers. Additionally, the network transmits, to the UE, information about a RACH preamble capable of being used in each RACH resource and information about a linked SS block index or CSI-RS index. Thereby, the UE may acquire information about a RACH time/frequency resource and preamble resource to be used when performing a RACH procedure for a specific DL beam direction and perform the RACH procedure using the corresponding resource.

<RACH Preamble Formats for Slot/Symbol Boundary Alignment>

Hereinafter, the RACH preamble format described with reference to FIG. 10 will be described in detail. In consideration of features and requirements of the RACH preamble format in NR described in FIG. 10, the relationship between the RACH resource and the RACH preamble format according to the present invention is described and how RACH preamble formats of the present invention are aligned with a UL slot and a slot boundary of the NR system is explained.

Generally, a sequence part of the RACH preamble in LTE uses a length-839 ZC sequence having a subcarrier spacing (SCS) of 1.25 kHz and the RACH preamble in LTE usually occupies a subframe of 1 ms. RACH preamble formats in the LTE system are listed in Table 1. Although RACH preambles have the same sequence length, if coverage ranges that the RACH preambles desire to support are different, the RACH preambles may have different CP lengths. As a CP length increases, coverage that can be supported by a corresponding cell increases and, as a CP length decreases, coverage that can be supported by a corresponding cell decreases. As the length of a sequence constituting a preamble increases, since a receiver may receive a signal by gathering much energy, combining gain can be obtained and therefore detection performance of a RACH can be improved.

In the NR system, two types of RACH sequence may be defined. Similarly to the case of the LTE system, a long sequence for the purpose of supporting wide coverage and a short sequence for RACH repetition of the UE and Rx beam sweeping of the gNB may be defined. The short sequence has not only a purpose of RACH repetition by the UE and Rx beam sweeping by the gNB but also a purpose of supporting high speed and immediately providing a service which is critical to latency of a communication system by not reserving an excessively long UL resource.

The long RACH sequence for supporting wide coverage may be introduced to the NR system in a similar form to that of the LTE system by using a RACH sequence of the LTE system or modifying a part of the RACH sequence of the LTE system. However, in the short RACH sequence, a preamble format should be designed to be suitable for the purpose of the short RACH sequence and a RACH resource in which a corresponding RACH preamble is transmitted should be able to well match UL PUSCH transmission.

FIG. 23 illustrates a slot structure. Particularly, FIG. 23(a) illustrates a slot structure in a slot having 14 symbols and FIG. 23(b) illustrates a slot structure in a slot having 7 symbols. In NR, it is considered configuring one slot as 7 symbols or 14 symbols. In FIG. 23, "DD/UD" means that DL data or UL data can be scheduled on a corresponding symbol. Likewise, in FIG. 23, "Gap/DC/DD" means that a gap, DL control, or DL data can be transmitted after a DL control (DC) symbol, which is the first symbol.

The present invention proposes a method for the network to efficiently use a RACH resource and a UL data (e.g., PUSCH) resource. In the present invention, an SCS of a short RACH sequence uses the same value as a default PUSCH SCS of a corresponding cell so as to match sampling rates of a PRACH and a PUSCH.

Figure 24:
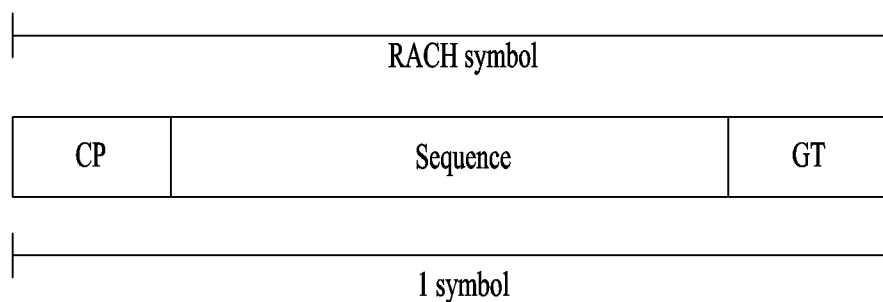
FIG. 24 illustrates a RACH preamble format in an OFDM symbol.

FIG. 24 illustrates a RACH preamble format in an OFDM symbol. As illustrated in FIG. 24, if one symbol RACH preamble is transmitted using a short RACH sequence, a CP length becomes too short so that coverage that can be supported by the corresponding RACH preamble becomes too narrow. Therefore, one symbol RACH preamble may not function as an actual RACH preamble. Accordingly, in the present invention, two symbols are configured as the smallest RACH symbol unit during transmission of a short RACH sequence and, if necessary, the CP length may increase or the number of repetitions may be adjusted by extending the number of RACH symbols. The number of RACH symbols may be extended to a multiple of a basic unit.

Figure 25:
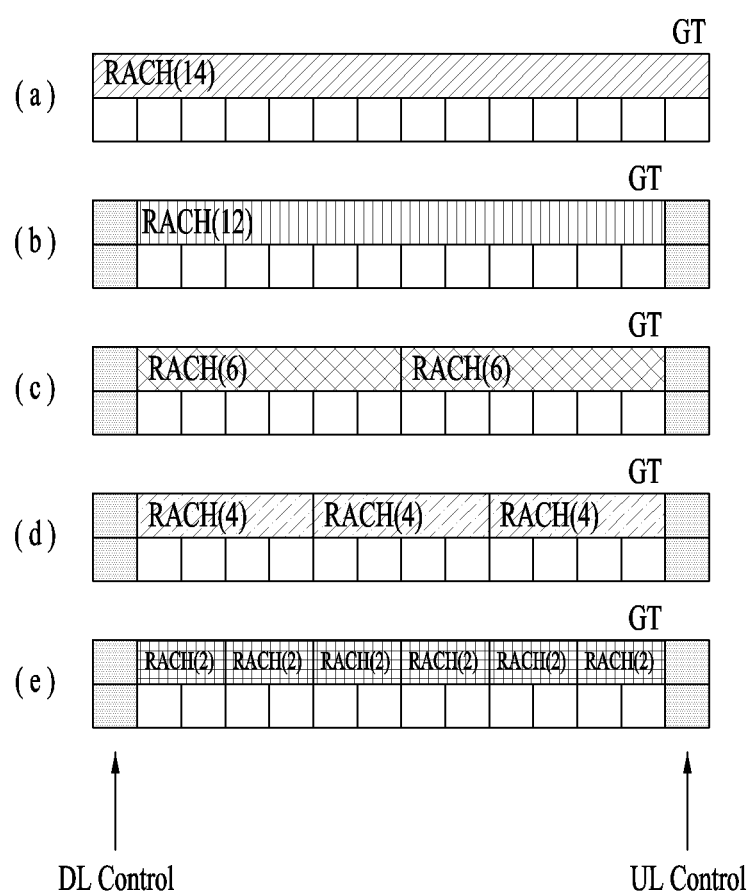
FIGS. 25 and 26 illustrate alignment of RACH preambles in a slot.
Figure 26:
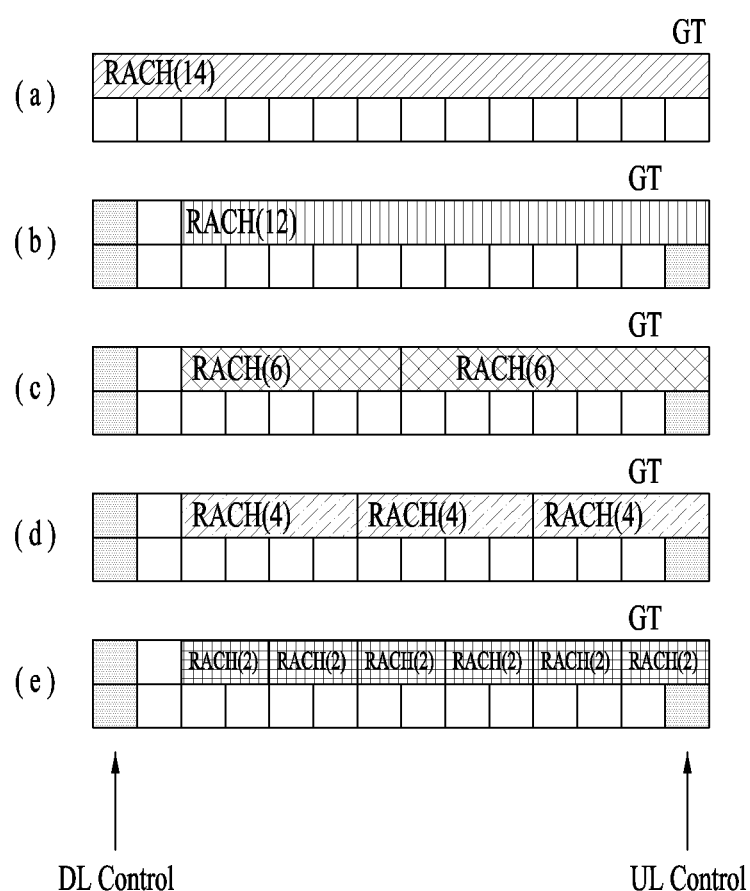

FIGS. 25 and 26 illustrate alignment of RACH preambles in a slot. Particularly, FIGS. 25 and 26 illustrate symbol locations at which PRACH preambles can be transmitted in a slot having 14 symbols when a RACH preamble has a length of 2, 4, 6, or 12 symbols, i.e., RACH resources in a slot. In FIGS. 25 and 26, "RACH(x)" indicates the number of repetitions of a preamble (i.e., the number of repetitions of a RACH sequence). Hereinafter, "RACH(x)" is referred to as x symbol RACHs, x symbol RACH resources, or x symbol RACH preambles.

Referring to FIG. 25(a), in the case of a 14-symbol RACH, i.e., a RACH in which a RACH preamble of a 1-symbol length is repeated 14 times, the RACH preamble occupies all of a slot of a 1-ms length. If a signal other than the RACH preamble is transmitted, i.e., if DL control/data or UL control/data is transmitted, in an adjacent slot immediately after the slot in which the RACH preamble is transmitted, the adjacent data/control signal should be protected by inserting a guard time (GT) into the last end of the RACH preamble repeated 14 times so as not to transmit a signal during a predetermined time. Similarly, in the case of a RACH in which one preamble is repeated 12 times, for example, in the case of a 12-symbol RACH of FIG. 25(b), if a data/control signal other than the RACH preamble is transmitted on a symbol immediately after the RACH, the GT is inserted into the rear part of the RACH preamble. FIG. 25(a) illustrates a preamble format capable of being used when a corresponding slot is a UL only slot. As DL control, if the first OFDM symbol of the corresponding slot is used and the last 14th symbol is reserved for UL control transmission, a RACH preamble format having the longest length is illustrated in FIG. 25(b).

Assuming that one symbol for DL control and one symbol for UL control are used, locations at which RACH preambles can be transmitted in one slot with respect to a 2-symbol RACH, a 4-symbol RACH, and a 6-symbol RACH are illustrated in FIGS. 25 and 26. In FIG. 25, a RACH resource is configured at locations except for the first and last symbols so that the first symbol of a slot may be used for DL control and a UL control region of the last symbol may be protected, except for FIG. 25(a) illustrating a RACH preamble format of a 14-symbol length. In FIG. 26, a DL control signal of the first symbol is avoided, the second symbol is emptied in consideration of a DL-to-UL switching time of the gNB, and a RACH preamble is transmitted starting from the third symbol. If the RACH preamble is configured to occupy symbols up to a UL control region which is the last symbol of a slot, a RACH signal is prioritized over UL control in a corresponding symbol duration. That is, if a specific time/frequency resource in a time/frequency region in which the UE should transmit UL control is configured as a RACH resource, the UE drops UL control transmission in the corresponding time/frequency resource.

As illustrated in FIGS. 25 and 26(b) to 26(e), a plurality of RACH resources may be configured in one slot configured for a RACH and the RACH resources may be consecutive. When the network configures the multiple RACH resources, if the multiple RACH resources are concatenated in the time domain, a GT does not have to be inserted between the concatenated RACH resources on the premise that a CP length of RACH preambles transmitted in the concatenated RACH resources is sufficient. That is, if a set of the concatenated RACH resources in the time domain is referred to as a RACH block (or RACH burst), the GT does not have to be inserted into a RACH preamble transmitted in a RACH resource within a RACH block. Herein, the meaning of "the GT is inserted" is that a signal is not transmitted during a corresponding time duration, i.e., a corresponding time duration is null. The GT is inserted into a RACH preamble transmitted in the rearmost RACH resource in the time domain within a RACH block, i.e., a gap time at which signal transmission is not performed during a predetermined time duration is configured, so that other signals transmitted after the RACH preamble are protected. In the case of a RACH preamble format including repetition of a preamble, consecutive signals are transmitted in a RACH resource even if the preamble is repeated.

Figure 27:
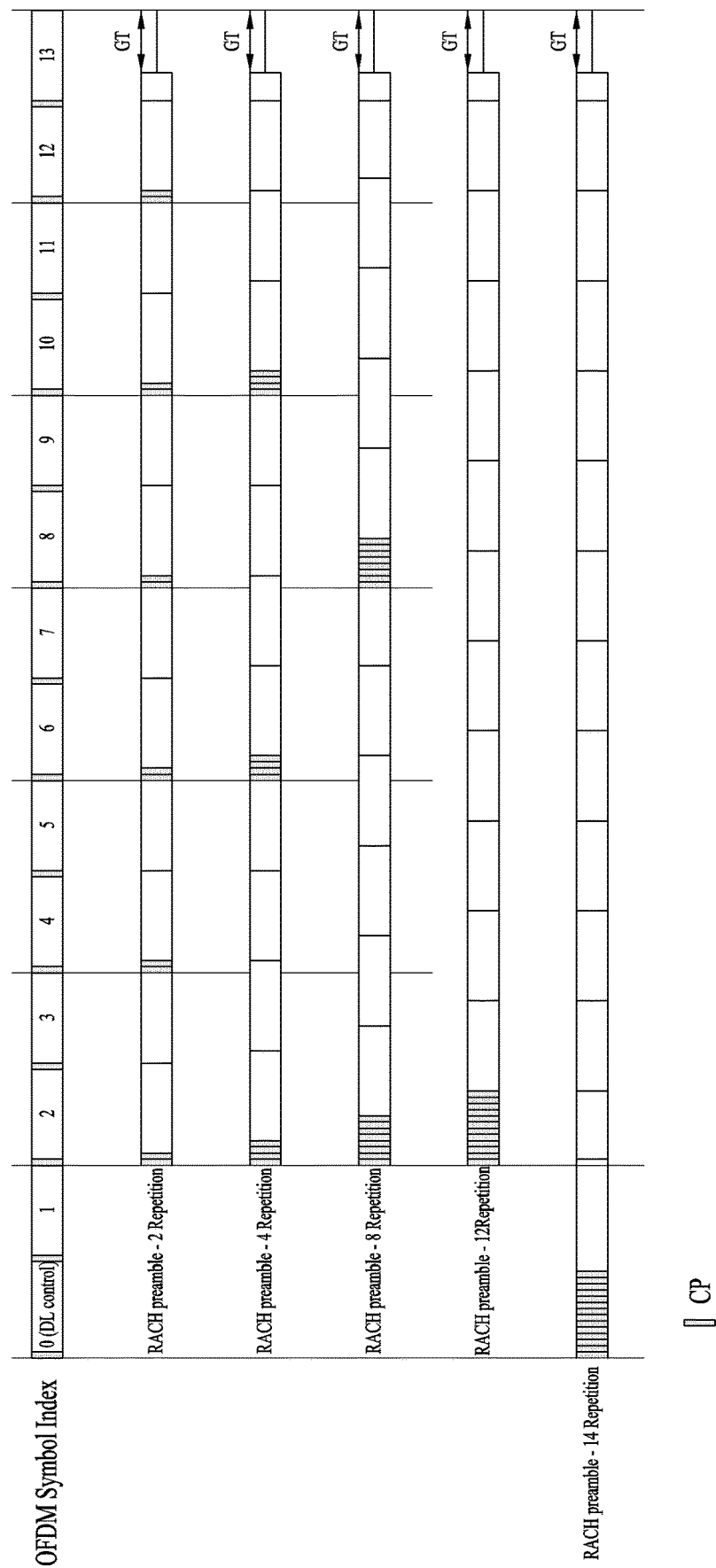
FIG. 27 illustrates RACH preamble formats for aligning a RACH preamble and a symbol boundary by increasing a CP length according to the present invention.

When the RACH preamble is repeatedly transmitted, if the number of repetitions increases, i.e., if the number of symbols used for RACH transmission increases, a CP length may increase. In the case of two symbols for example, although a data transmission format in the two symbols is configured in the form of CP-data-CP-data, i.e., although CP+data are transmitted on one of the two symbols and CP+data are transmitted on the other one of the two symbols, the RACH preamble may be transmitted in the form of CP-CP-sequence-sequence-(GT) for coverage expansion. FIG. 27 illustrates RACH preamble formats for aligning a RACH preamble and a symbol boundary by increasing a CP length according to the present invention. Specifically, FIG. 27 illustrates increasing a CP length according to the number of repetitions of a RACH preamble. Then, cell coverage supported by a corresponding RACH preamble format can be extended by repeating the RACH preamble, i.e., repeating a RACH sequence. In the RACH preamble format of FIG. 27, the GT is located within the last RACH resource of the RACH block in the time domain.

Figure 28:
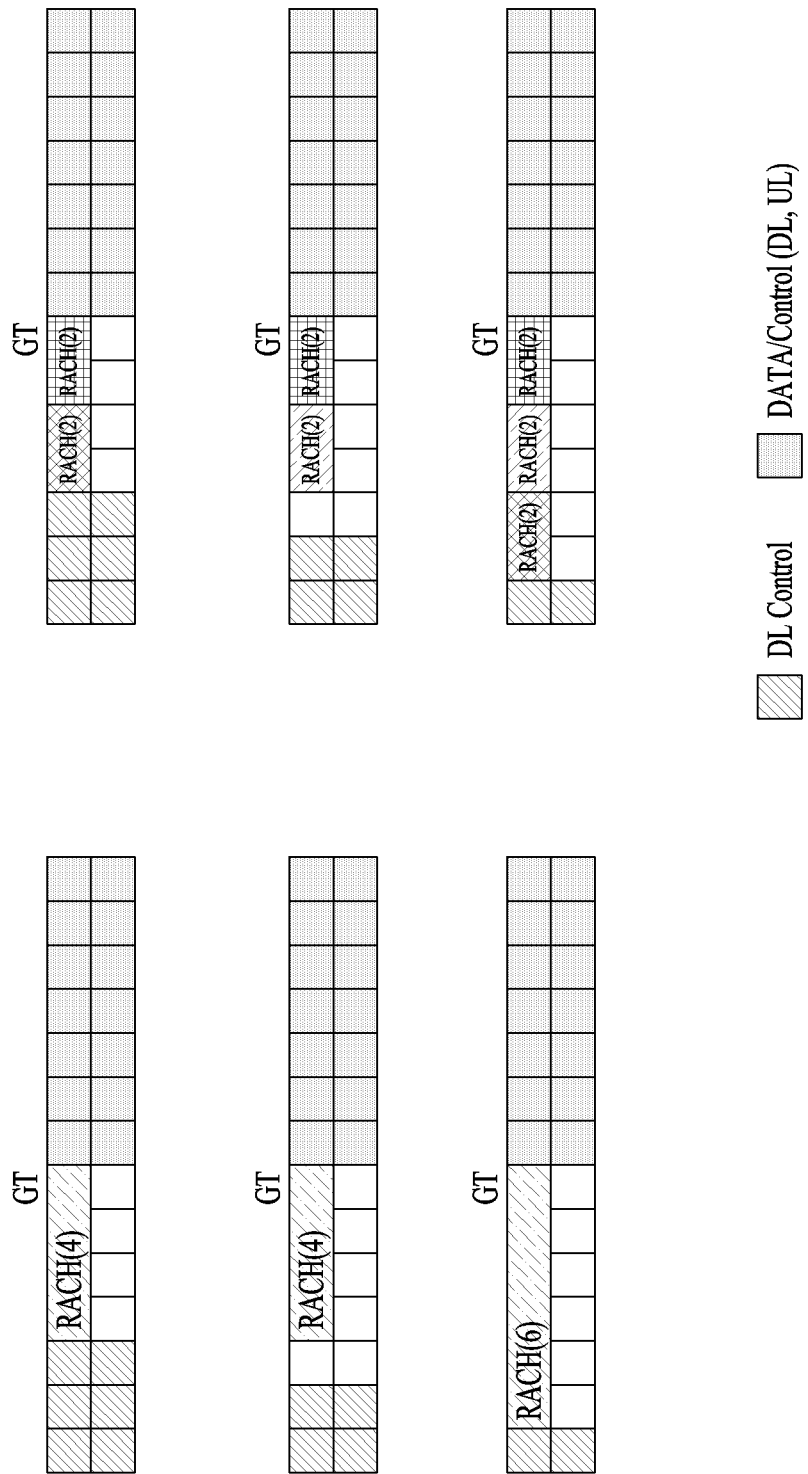
FIG. 28 illustrates a RACH resource in a slot consisting of 7 symbols and RACH preamble mapping according to the number of preamble repetitions.

FIG. 28 illustrates a RACH resource in a slot consisting of 7 symbols and RACH preamble mapping according to the number of preamble repetitions. As described above, when other data/control signals are transmitted after a RACH resource, the GT is inserted into a RACH resource immediately before the data/control signals. That is, during the GT, signals are not transmitted and are emptied.

Figure 29:
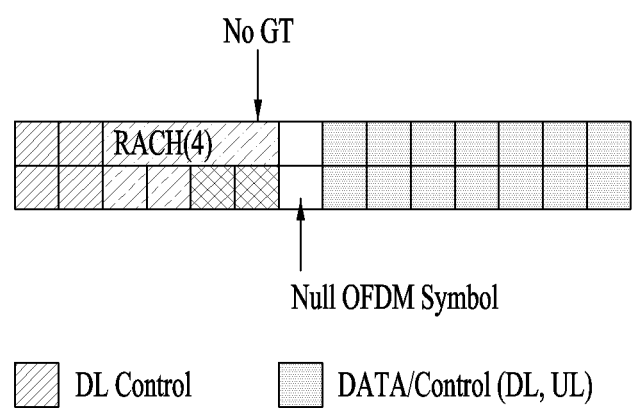
FIG. 29 illustrates a null OFDM symbol located after a RACH symbol.

FIG. 29 a null OFDM symbol located after a RACH symbol.

The GT is inserted into a point at which concatenated RACH resources are ended, i.e., at the last location of a RACH block, thereby protecting a subsequent signal. Another method of protecting the subsequent signal is to empty a symbol after the RACH resources, i.e., a symbol immediately after the RACH block. In other words, no signals are transmitted on a symbol immediately after the RACH block. If the symbol after the RACH block is null, the GT does not have to be inserted into the last symbol of the RACH block. A corresponding null OFDM symbol is used as the GT by emptying the symbol immediately after the RACH block and a signal transmitted after the null OFDM symbol can be protected. For making a specific OFDM symbol null, the specific OFDM symbol may be pre-signaled by the gNB to the UE or designated by the standards. For example, while transmitting PRACH configuration to the UE, the gNB may signal, to the UE, that a specific symbol is null. Alternatively, when the gNB configures concatenated RACH resources in the time domain, the UE may receive all of this information and it may be promised between the UE and the gNB that a time point at which consecutive RACH resources are ended, i.e., a symbol immediately after a RACH block, is null. Alternatively, whether the symbol immediately after the RACH block is null may be signaled. If the gNB commands that the symbol immediately after the RACH block be null, the UE may make the symbol immediately after the RACH block null and does not include the GT in a RACH preamble within the RACH block. Upon receiving a command indicating that the symbol immediately after the RACH block should not be null, if the UE transmits a preamble in the rearmost RACH resource within the RACH block in the time domain, the UE configures the GT during which a signal is not transmitted after transmitting the preamble, in a corresponding RACH resource.

An advantage of the method in which RACH resources are concatenated in the time domain is that there is no need to insert the GT into every RACH preamble. Since a CP length of a RACH preamble transmitted in a RACH resource transmitted immediately after one RACH preamble is sufficiently long, a corresponding CP may be used as the GP of a RACH preamble transmitted in a previous RACH resource. Therefore, the present invention proposes first indexing RACH resources in the time domain and next indexing the RACH resources in the frequency domain. That is, referring to FIG. 20, RACH resources are first configured in the time domain. Next, if the RACH resources are not enough than what is needed, the RACH resources may be further configured in the frequency domain. Accordingly, indexing of RACH resources within a RACH block are desirably performed first in the time domain.

Figure 30:
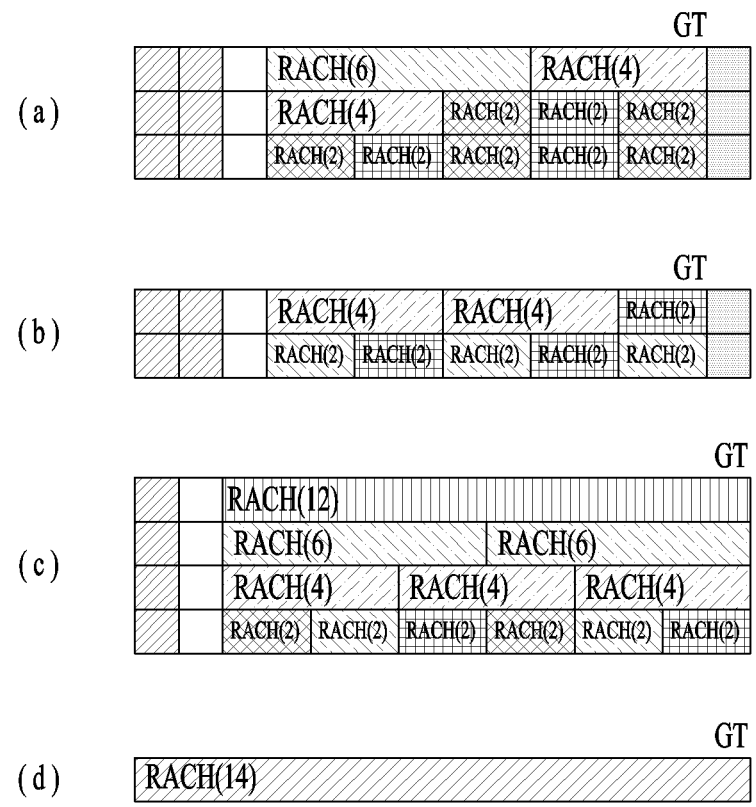
FIG. 30 illustrates a method of multiplexing RACH resources in a slot.

Hereinafter, a method of multiplexing RACH resources for RACH preamble formats having different repetition lengths in the same slot will be described with reference to FIG. 30. FIG. 30 illustrates a method of multiplexing RACH resources in a slot. In FIG. 30, "RACH(x)" indicates the number of repetitions of a preamble (i.e., the number of repetitions of a RACH sequence) in a corresponding RACH resource. Hereinafter, "RACH(x)" is referred to as x symbol RACHs, x symbol RACH resources, or x symbol RACH preambles.

In consideration of multiple beams, target DL Rx directions between RACH resources located in different frequencies at the same time should be the same. That is, Rx directions of the gNB should be the same. For example, referring to FIG. 30(a), an Rx direction of the gNB for a 6-symbol RACH resource ("RACH(6)" in FIG. 30) starting on a symbol of index 3 should be equal to an Rx direction of the gNB of RACH(4) and RACH(2), nested by the corresponding RACH resource at a corresponding time, i.e., located within a symbol boundary of RACH(6). This means that DL channels/signals of the gNB associated with RACH resources should be equal and, typically, this may mean that indexes of SS blocks associated with corresponding RACH resources should be equal. For example, referring to FIG. 30(a), RACH(6) may be used for a RACH preamble format having a RACH sequence repeated 6 times. RACH(4) and RACH(2) in frequencies different from frequencies of RACH(6) within a time duration of RACH(6), may be formed such that one RACH(4) for a RACH preamble format having a RACH sequence repeated 4 times and one RACH(2) for a RACH preamble format having a RACH sequence repeated twice are consecutively configured in the time domain. Alternatively, 3 RACH(2) may be consecutively configured in the time domain in frequencies different from frequencies of RACH(6) within the time duration of RACH(6). Thus, this method of configuring different RACH resources by varying lengths of RACH sequences, consequently, by varying the RACH preamble formats, even when the RACH sequences are associated with the same SS block may be used to distinguish between a contention-based RACH resource and a contention-free RACH resource or to configure an additional RACH resource for requesting system information when RACH transmission is used for a system information request. Generally, a RACH resource for contention-based initial access may occupy a long length (i.e., a large number) of symbols and a RACH resource having a purpose of handover having a high possibility that the UE discerns coverage of a target cell to some degree or a system information request may occupy a relatively short length (i.e., small number) of symbols.

Hereinafter, a RACH preamble format in the NR system will be proposed in detail based on the above description of the present invention. Regarding the RACH preamble format for the NR system, the present invention has assumed that a data symbol length (i.e., an effective symbol duration corresponding to a pure data/information signal) in one OFDM symbol is $2048*T_s$ and a CP length in one OFDM symbol is $144*T_s$. Therefore, the length of one OFDM symbol available for data transmission is $(2048+144)*T_s$, where $T_s$ is a sampling time. Hereinafter, for convenience of description, $T_s$ will be omitted in mentioning a symbol length. Table 8 lists numerologies based on the length of one OFDM symbol of a preamble having an SCS of 15 kHz and a RACH sequence length of 139. In Table 8, an effective symbol length of 2048 is a length other than a CP in an OFDM symbol duration. Particularly, Table 8 shows numerologies of an OFDM symbol constituting a slot when a sampling frequency is 30.72 MHz and a time sampling unit is $T_s=1/(15000*2048)$ based on an SCS of 15 kHz and FFT of 2048. In this case, a multipath profile supported by a length-144 CP is a maximum of 4.68 μsec.

TABLE 8

| | |
|---|---|
| Effective symbol length ($T_s$) | 2048 |
| CP length ($T_s$) | 144 |
| Sequence length | 139 |
| Subcarrier spacing (kHz) | 15 |
| Multipath profile (μsec) | 4.69 |
| Sampling frequency (MHz) | 30.72 |

In numerologies for SCSs of 30 kHz, 60 kHz, and 120 kHz, $T_s$ is scaled to be inversely proportional to $T_s$ for 15 kHz depending on how many times 15 kHz the SCS is. However, the effective symbol length and the CP length of an OFDM symbol are basically maintained at 2048 and 144, respectively.

The following tables show preamble formats according to the present invention. Particularly, Table 9 shows preamble formats in the case of a preamble sequence with an SCS of 15 kHz, Table 10 shows preamble formats in the case of a preamble sequence with an SCS of 30 kHz, Table 11 shows preamble formats in the case of a preamble sequence with an SCS of 60 kHz, and Table 12 shows preamble formats in the case of a preamble sequence with an SCS of 120 kHz. In Tables 9 to 11, a guard period is configured on an OFDM symbol after the end of a RACH burst for preamble format A1 or A2.

TABLE 9

| Preamble format | | Symbol duration | CP length | Number of sequence repetitions | Effective symbol length | Guard period | Cell radius (meter) |
|---|---|---|---|---|---|---|---|
| 1 | A1 | 2 | 288 | 2 | 4096 | 2048 | 703 |
| | A2 | 2 | 2336 | 1 | 2048 | 2048 | 9297 |
| | B | 2 | 1240 | 1 | 2048 | 1096 | 5352 |
| 2 | A1 | 4 | 576 | 4 | 8192 | 2048 | 2109 |
| | A2 | 4 | 2624 | 3 | 6144 | 2048 | 9297 |
| | B | 4 | 1384 | 3 | 6144 | 1240 | 6055 |
| 3 | A1 | 6 | 864 | 6 | 12288 | 2048 | 3516 |
| | A2 | 6 | 2912 | 5 | 10240 | 2048 | 9297 |
| | B | 6 | 1528 | 5 | 10240 | 1384 | 6758 |
| 4 | A1 | 12 | 1728 | 12 | 24576 | 2048 | 7734 |
| | A2 | 12 | 3776 | 11 | 22528 | 2048 | 9297 |
| | B | 12 | 1960 | 11 | 22528 | 1816 | 8867 |
| 5 | A1 | 14 | 2016 | 14 | 28672 | 2048 | 9141 |
| | A2 | 14 | 4064 | 13 | 26624 | 2048 | 9297 |
| | B | 14 | 2104 | 13 | 26624 | 1960 | 9297 |

TABLE 10

| Preamble format | | Symbol duration | CP length | Number of sequence repetitions | Effective symbol length | Guard period | Cell radius (meter) |
|---|---|---|---|---|---|---|---|
| 1 | A1 | 2 | 288 | 2 | 4096 | 2048 | 352 |
| | A2 | 2 | 2336 | 1 | 2048 | 2048 | 4648 |
| | B | 2 | 1240 | 1 | 2048 | 1096 | 2676 |
| 2 | A1 | 4 | 576 | 4 | 8192 | 2048 | 1055 |
| | A2 | 4 | 2624 | 3 | 6144 | 2048 | 4648 |
| | B | 4 | 1384 | 3 | 6144 | 1240 | 3027 |
| 3 | A1 | 6 | 864 | 6 | 12288 | 2048 | 1758 |
| | A2 | 6 | 2912 | 5 | 10240 | 2048 | 4648 |
| | B | 6 | 1528 | 5 | 10240 | 1384 | 3379 |
| 4 | A1 | 12 | 1728 | 12 | 24576 | 2048 | 3867 |
| | A2 | 12 | 3776 | 11 | 22528 | 2048 | 4648 |
| | B | 12 | 1960 | 11 | 22528 | 1816 | 4434 |
| 5 | A1 | 14 | 2016 | 14 | 28672 | 2048 | 4570 |
| | A2 | 14 | 4064 | 13 | 26624 | 2048 | 4648 |
| | B | 14 | 2104 | 13 | 26624 | 1960 | 4648 |

TABLE 11

| Preamble format | | Symbol duration | CP length | Number of sequence repetitions | Effective symbol length | Guard period | Cell radius (meter) |
|---|---|---|---|---|---|---|---|
| 1 | A1 | 2 | 288 | 2 | 4096 | 2048 | 176 |
| | A2 | 2 | 2336 | 1 | 2048 | 2048 | 2324 |
| | B | 2 | 1240 | 1 | 2048 | 1096 | 1338 |
| 2 | A1 | 4 | 576 | 4 | 8192 | 2048 | 527 |
| | A2 | 4 | 2624 | 3 | 6144 | 2048 | 2324 |
| | B | 4 | 1384 | 3 | 6144 | 1240 | 1514 |
| 3 | A1 | 6 | 864 | 6 | 12288 | 2048 | 879 |
| | A2 | 6 | 2912 | 5 | 10240 | 2048 | 2324 |
| | B | 6 | 1528 | 5 | 10240 | 1384 | 1689 |
| 4 | A1 | 12 | 1728 | 12 | 24576 | 2048 | 1934 |
| | A2 | 12 | 3776 | 11 | 22528 | 2048 | 2324 |
| | B | 12 | 1960 | 11 | 22528 | 1816 | 2217 |
| 5 | A1 | 14 | 2016 | 14 | 28672 | 2048 | 2285 |
| | A2 | 14 | 4064 | 13 | 26624 | 2048 | 2324 |
| | B | 14 | 2104 | 13 | 26624 | 1960 | 2324 |

TABLE 12

| Preamble format | | Symbol duration | CP length | Number of sequence repetitions | Effective symbol length | Guard period | Cell radius (meter) |
|---|---|---|---|---|---|---|---|
| 1 | A1 | 2 | 288 | 2 | 4096 | 2048 | 88 |
| | A2 | 2 | 2336 | 1 | 2048 | 2048 | 1162 |
| | B | 2 | 1240 | 1 | 2048 | 1096 | 669 |
| 2 | A1 | 4 | 576 | 4 | 8192 | 2048 | 264 |
| | A2 | 4 | 2624 | 3 | 6144 | 2048 | 1162 |
| | B | 4 | 1384 | 3 | 6144 | 1240 | 757 |
| 3 | A1 | 6 | 864 | 6 | 12288 | 2048 | 439 |
| | A2 | 6 | 2912 | 5 | 10240 | 2048 | 1162 |
| | B | 6 | 1528 | 5 | 10240 | 1384 | 845 |
| 4 | A1 | 12 | 1728 | 12 | 24576 | 2048 | 967 |

TABLE 12-continued

| Preamble format | Symbol duration | CP length | Number of sequence repetitions | Effective symbol length | Guard period | Cell radius (meter) |
|---|---|---|---|---|---|---|
| A2 | 12 | 3776 | 11 | 22528 | 2048 | 1162 |
| B | 12 | 1960 | 11 | 22528 | 1816 | 1108 |
| A1 | 14 | 2016 | 14 | 28672 | 2048 | 1143 |
| A2 | 14 | 4064 | 13 | 26624 | 2048 | 1162 |
| B | 14 | 2104 | 13 | 26624 | 1960 | 1162 |

In Table 9 to Table 12, an effective symbol length is a length of a part other than a CP in a RACH preamble, i.e., a length $T_{SEQ}$ of a sequence part.

Figure 31:
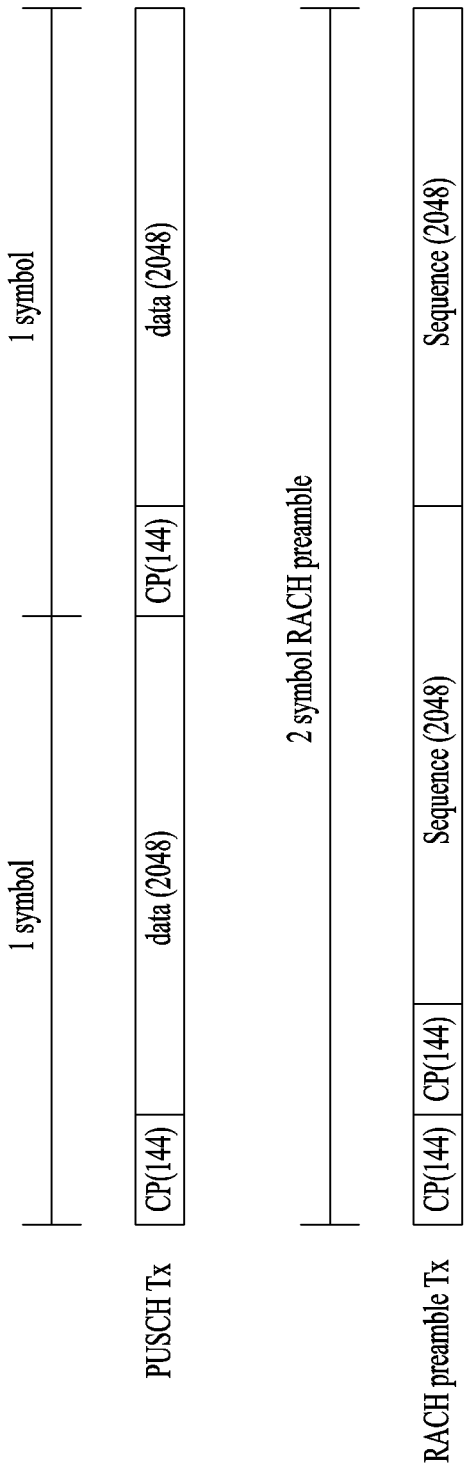
FIG. 31 illustrates a transmission format of a RACH preamble of a 2-symbol length aligned with two symbols.

Preamble formats for the NR system proposed in the present invention will be described in detail based on preamble format 1 of Table 9. Preamble format 1 corresponds to the case in which a RACH preamble has a length of two symbols and the same preamble is repeated twice on the two symbols. FIG. 31 illustrates a transmission format of a RACH preamble of a 2-symbol length (hereinafter, a 2-symbol RACH preamble) aligned with two symbols. If a RACH resource of a 2-symbol length is configured for the UE that transmits a RACH preamble and a RACH preamble format suitable for the RACH resource is indicated, the UE transmits a preamble of a 2048-sample length by repeating twice after a CP of a 288-sample length as illustrated in FIG. 31. However, when the gNB receives the RACH preamble as illustrated in FIG. 31, cell coverage capable of being supported by the RACH preamble differs according to which scheme the gNB uses upon receiving the RACH preamble.

Figure 32:
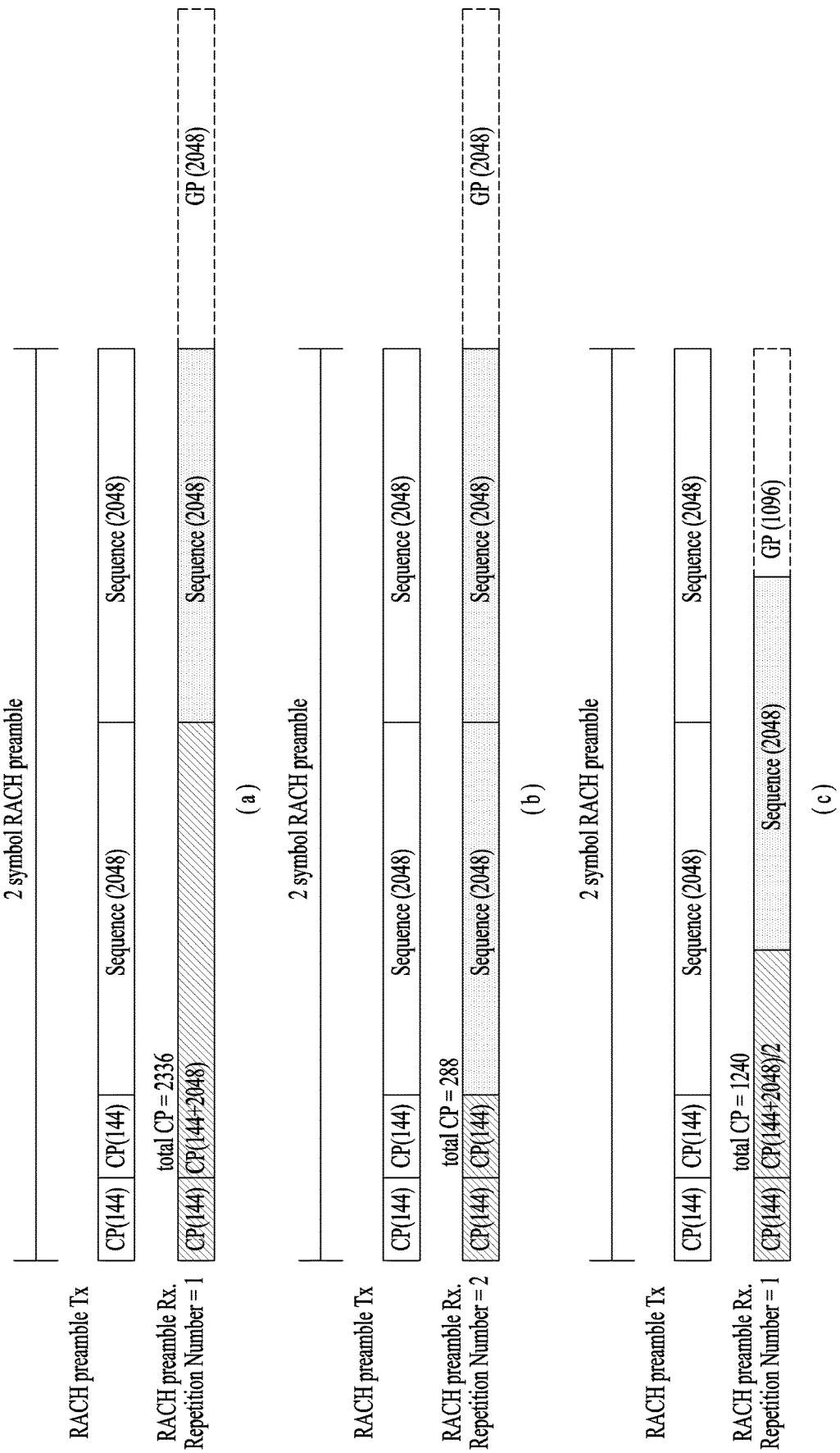
FIG. 32 illustrates preamble formats corresponding to preamble format 1 of Table 9.

FIG. 32 illustrates preamble formats corresponding to preamble format 1 of Table 9. Particularly, FIG. 32(a) illustrates A2 of preamble format 1 (hereinafter, preamble format 1-A2) of Table 9, FIG. 32(b) illustrates A1 of preamble format 1 (hereinafter, preamble format 1-A1) of Table 9, and FIG. 32(c) illustrates B of preamble format 1 (hereinafter, preamble format 1-B) of Table 9.

Referring to FIG. 32(a), for example, in preamble format 1-A2 of Table 9, the gNB receives a RACH preamble under the assumption that the RACH preamble is a signal repeated once. In this case, the gNB assumes that a part other than a 2048-length sequence consists of a CP and a guard period (GP) (which is the same as GT). Notably, the gNB receives the RACH preamble under the assumption that a maximum of 2048 samples after a sequence of the RACH preamble is the GP according to preamble format 1-A2. When RACH resources are concatenated, since a CP length of the concatenated RACH resources is sufficient, there is no problem in receiving another RACH preamble in an adjacent RACH resource even if the gNB receives the RACH preamble under the assumption that a CP duration of a subsequent RACH preamble is the GP. Therefore, in preamble format 1-A2 of Table 9, in terms of reception by the gNB, a CP length may be regarded as 2336, a GP length may be regarded as 2048, and the number of repetitions of the RACH preamble is 1. Due to a sufficient GP length, the corresponding format may support a maximum cell radius up to 9297 m.

Unlike this, in a cell having a small cell radius, the gNB may receive a RACH preamble that the UE has transmitted in the form illustrated in FIG. 31 by regarding the RACH preamble is a preamble sequence signal repeated twice. That is, referring to FIG. 32(b), it may be assumed that a CP length is 288 and a sequence part length is 4096. The sequence part of the RACH preamble may be understood as a signal obtained by repeating a length-2048 sequence twice.

This corresponds to preamble format 1-A1. Obviously, the GP may be secured by making a symbol after a corresponding RACH resource, i.e., a symbol subsequent to the RACH resource, null. Alternatively, if the GP is within a CP length of the subsequent symbol, an actual GP length is limited by the length of a subsequent CP. That is, in the case of the GP of a RACH preamble, a symbol after the RACH preamble may be null and a CP of a signal transmitted on the subsequent symbol may be used as the GP. In the latter case, however, since the CP of the subsequent signal is used as the GP, the GP length cannot be greater than the CP length. In other words, when RACH resources are consecutive in the time domain, if a signal subsequent to one arbitrary RACH resource other than the last RACH resource among consecutive RACH resources is a RACH preamble and the RACH preamble adjacent to the RACH resource is preamble format 1-A1, a CP length of the RACH preamble becomes 288. Consequently, in preamble format 1-A1, a maximum radius capable of being supported by the corresponding preamble format is limited by the CP length and the GP length. As shown in Table 9, if the RACH preamble is 15 kHz, a maximum cell radius supported by preamble format 1-A1 format is 703 m.

Unlike this, in preamble format 1-B, all of a CP, a sequence, and a GP may be designed to be included in one RACH resource. That is, although the UE transmits a sequence through repetition two times as illustrated in FIG. 31, the gNB detects the sequence by securing both a CP and a GP within a corresponding RACH preamble transmission duration. In this case, referring to FIG. 32(c), if one RACH preamble occupies two symbols, the gNB may regard a maximum number of repetitions of the sequence as one. If one RACH preamble occupies N symbols, the gNB may regard the number of sequence repetitions as N−1.

To generalize the present invention, the case in which 6 symbols are used to transmit the RACH preamble will now be described, by way of example, with reference to Table 9 in which an SCS of the RACH preamble is 15 kHz. If a RACH preamble format using 6 symbols for RACH preamble transmission is referred to as preamble format 3, in preamble format 3-B, the UE transmits a CP of a length corresponding to 6 times a data CP length during a corresponding RACH resource duration, i.e., during a 6-OFDM symbol duration, and transmits the same preamble through repetition 6 times, as described with respect to preamble format 1-B. However, upon receiving the preamble, the gNB assumes that the preamble has been repeated five times in order to secure a GP within the corresponding RACH resource and the gNB obtains 5 other than 6 as repetition gain for the corresponding RACH preamble. Since the UE transmits the same preamble through repetition 6 times, when the gNB desires to obtain repetition gain of 6 times (preamble format 3-A1), a maximum cell radius supported by the corresponding preamble sequence is 3516 m and, when the gNB desires to obtain repetition gain of five times (preamble format 3-A2), a maximum cell radius supported by the corresponding preamble sequence is 9297 m. In other words, when the gNB commands the UE to transmit the RACH preamble with a preamble format having a preamble repeated 6 times, if a cell radius of the gNB is less than 3516 m, the gNB may obtain repetition gain of 6 times from the RACH preamble. However, if the gNB supports a greater cell radius than 3516 m, repetition gain that can be obtained by the gNB is only 5 times.

In other words, in Table 9 to Table 12, numbers in preamble formats 1, 2, 3, 4, and 5 are values indicating how many times the RACH preamble are repeatedly transmitted during a duration of corresponding symbols by the UE. Preamble format 1 means repetition two times (or 2 symbols), preamble format 2 means repetitions four times (or 4 symbols), preamble format 3 means repetition 6 times (or 6 symbols), preamble format 4 means repetition 12 times (or 12 symbols), and preamble format 5 means repetition 14 times (or 14 symbols). In Table 9 to Table 12, A1, A2, and B indicate a scheme in which the gNB detects a corresponding signal according to a cell radius. In which manner the gNB is to detect a RACH preamble may be an implementation issue but a cyclic shift value (i.e., $N_{CS}$) of a RACH sequence that the UE can use or the gNB can detect may differ depending to how the gNB performs detection. That is, when a cell radius is large, if adjacent CSs are used with respect to ZC sequences having the same root index, this may deteriorate RACH performance. Therefore, in this case, it is desirable to use/allocate CSs having a big difference.

In Table 9 to Table 12, preamble formats 4 and 5 are formats in which a preamble is repeated 12 times and 14 times, respectively. As opposed to preamble formats 1, 2, and 3, it may be understood that format A1 or A2 hardly obtains gain relative to format B. In preamble formats 1, 2, and 3, gain of format A1 or A2 relative to format B is support of a wide cell radius, whereas, in preamble formats 4 and 5, it is difficult to consider that plural RACH resources having a corresponding length in a slot are consecutively present. Particularly, in the case of preamble format 5, since all of 14 symbols are used as a RACH resource, one symbol after 14 symbols should be null for cell radius expansion. However, since it is burdensome to make a symbol on which a DL control channel of a subsequent slot should be transmitted null, preamble format 5 inevitably uses only a GP capable of being occupied in a RACH resource. Therefore, in preamble format 5, a maximum cell radius is determined by a GP that can be secured within 14 symbols rather than an additionally securable GP. Similarly to preamble format 5, in preamble format 4, the maximum cell radius is determined by a GP that can be secured in the RACH resource. Accordingly, preamble formats 4 and 5 desirably support only format B rather than format A1 and/or A2.

On the other hand, in preamble formats 1, 2, and 3, format A2 and format B may obtain the same repetition gain, whereas a cell radius supported by format B is smaller than a cell radius supported by format A2. Therefore, it is desirable for preamble formats 1, 2, and 3 to support only format A1 and/or A2 and not to support format B.

In the NR standard document, distinguishment between formats A1 and A2 and format B may be meaningless. However, when a RACH preamble format is specified, since a cell radius supported by the RACH preamble format should be definite, the corresponding formats may be separately defined for the above purpose. Particularly, in formats A1 and A2, a CS of a PRACH preamble becomes different due to a difference between cell radiuses that can be supported by the respective formats and therefore a set of CS values that the UE can select becomes different. Obviously, the network may indicate the same RACH preamble format, e.g., designate a preamble format only by a number of preamble formats 1/2/3/4/5 in Table 9 to Table 12, and differently designate and signal a CS value of each format according to coverage supported by the gNB.

While the above description of the RACH preamble formats of the present invention has been given focusing on a 15 kHz SCS of Table 9, the above description of the present invention is equally applied to preamble formats having other SCSs of Table 10 to Table 12. Obviously, a supported cell radius is scaled down by the length of an SCS.

A preamble format proposed by the present invention may be modified using a few methods described below.

Method 1) A short sequence based RACH preamble is configured to match N times (where N is a natural number greater than 1) the length of OFDM symbols used for data transmission. If a sequence is repeated a maximum of M times, a RACH preamble may be configured to be equal to or shorter than a length corresponding to M times the length of the OFDM symbols. Meanwhile, if the sequence is repeated a maximum of K (where K is a natural number greater than M), the RACH preamble is configured to be shorter than K times the length of OFDM symbols. For example, if the RACH preamble is transmitted in a slot consisting of 14 OFDM symbols, the short sequence based RACH preamble is configured such that a sequence is repeated M times (e.g., M=2, 4, 6, 12, 14) and a CP is also added to the preamble. In this case, the RACH preamble is divided into a plurality of resources in a slot in time according to the length of the RACH preamble. For example, in a slot consisting of 14 OFDM symbols, a RACH preamble in which the sequence is repeated 6 times may be divided into two RACH resources within the slot in time. On the other hand, for a RACH preamble in which a sequence is repeated 12 times, one RACH resource divided within the slot in time may be present. When M=12 and 14, a RACH preamble of a shorter length than M times the length of the OFDM symbols is defined. On the other hand, when M=2, 4, and 6, aRACH preamble having the same length as the length of the OFDM symbols as well as a RACH preamble having a shorter length than M times the length of the OFDM symbols may be defined.

Method 2) A resource of time and frequency durations may be defined for a short sequence based RACH preamble. If M RACH resources are configured using time/frequency resources, the RACH resources are preferentially configured in time.

In a multi-beam environment of NR, a plurality of physical time/frequency resources is needed to transmit the RACH preamble. In a specific slot, a location at which a RACH resource is configured is associated with the number of repetitions of the RACH preamble. An exact location of the RACH resource, i.e., a symbol number, is determined based on a slot format in a slot in which the RACH resource is configured. If a slot in which the RACH resource is configured is referred to as a RACH slot, an exact resource location at which the RACH preamble can be transmitted is determined with respect to each RACH preamble format according to a slot type of the RACH slot. The RACH slot type may be indicated to the UE through a RACH configuration and semi-statically fixed. Herein, indication of the RACH slot type means indicating the number and locations of symbols on which a DL control channel and a UL control channel can be transmitted in a corresponding slot and may be understood as indication of a slot format. The locations and number of RACH resources in a slot are determined by the RACH configuration.

FIGS. 33 to 35 illustrate locations of RACH resources in a slot according to RACH slot types. The RACH slot types proposed in FIGS. 33 to 35 are purely exemplary and the RACH resources may be started at any timings of a corresponding slot, designated by a system, in addition to starting locations illustrated in FIGS. 33 to 35.

Referring to FIGS. 33 to 35, upon signaling RACH resources to the UE, the gNB provides the UE with information about a slot type of a slot to which each RACH resource belongs, the location of each RACH resource in the slot, and the number of OFDM symbols. The network needs to configure one or more RACH resources (i.e., RACH time/frequency resources) and inform the UE that the RACH resources are configured. Herein, a RACH resource refers to a time/frequency resource in which one RACH preamble format can be transmitted. A RACH preamble format used with respect to each RACH resource should be designated and signaled. As can be appreciated from Table 9 to Table 12, an OFDM symbol length of a RACH resource is determined by the RACH preamble format and the UE may be aware of the symbol length (i.e., the number of OFDM symbols) of the RACH resource using information about the RACH preamble format designated according to each RACH resource. In Table 9 to Table 12 illustrating preamble formats according to the present invention, a symbol duration of each preamble format means the length of the preamble, more precisely, the number of OFDM symbols occupied by a corresponding preamble format through repetition of the preamble. However, there is no reason that a duration of a RACH preamble used in an idle state for initial access is differently configured according to each RACH resource even if the network configures a plurality of RACH resources. This is because, since maximum cell coverage supported by a corresponding cell should be supported, there is no reason that a preamble duration in any RACH resource is configured to be long and a preamble duration in another RACH resource is configured to be short. Therefore, if the preamble duration is configured to be equal with respect to each RACH resource, the gNB may commonly designate the preamble format for RACH resources without designating a preamble format for each RACH resource. Alternatively, RACH resources may be divided into RACH resource groups (e.g., a long RACH preamble group and a short RACH preamble group) and a preamble format may be designated with respect to each RACH resource group. When the preamble format is commonly designated with respect to RACH resources or is designated with respect to each RACH resource group, the network may signal one of preamble formats 1, 2, 3, 4, and 5, as described with reference to Table 9 to Table 12. For example, if a preamble format signaled by the network is 2, one RACH resource consists of 4 symbols. If three RACH resources each having a 4-OFDM symbol length are reserved, a preamble format in the preceding first and second RACH resources among the three RACH resources which are consecutively subjected to time division multiplexing (TDM) may forcibly apply to preamble A (A1 or A2) and a preamble format in the last RACH resource of a RACH block may forcibly apply to format B. That is, when the RACH preamble is transmitted in the last RACH resource of the RACH block, the gNB causes the UE to necessarily insert a gap duration.

Alternatively, when RACH resources are consecutively present, the network may signal a set of RACH preamble formats with respect to the consecutively configured RACH resources. For example, when preamble format 1 is used and three consecutive RACH resources are configured, a RACH preamble format capable of being applied to the RACH resource block in the form of a set of RACH preamble formats, for example, {A1, B}, {A1, A1}, {A2, A2}, or {A2, B}, may be signaled to be equally applied to each RACH resource block or all RACH resource blocks. If the network signals a combination of {A1, B}, the UE uses preamble format 1-B in the last RACH resource among consecutive RACH resources and uses preamble format 1-A1 in other RACH resource(s) except for the last RACH resource. That is, in the case in which the network signals a combination of formats, for example, a combination of {A1, B}, if a RACH resource associated with a detected SS block is not the last RACH resource among RACH resources of a RACH slot in the time domain, the UE transmits a RACH preamble of preamble format A1 in the associated RACH resource and, if the associated RACH resource is the last RACH resource of the RACH slot, the UE transmits the RACH preamble of preamble format B.

When one or more RACH resources configured by the network are present, a unique index may be assigned to each RACH resource in order to identify each RACH resource. Information that should be specified with respect to each RACH resource index is as follows.

Associated SS block index (or indexes): When there are multiple associated SS block indexes, preamble sequence resources are separately signaled with respect to respective SS blocks.
  Sequence resources (e.g., a root index, CSs, etc.) for a RACH preamble: Root index information and CS information of the RACH preamble capable of being used in a corresponding RACH resource are signaled.
  RACH preamble format: A preamble format used in a corresponding RACH resource and the length of the RACH resource (e.g., the number of symbols) are indicated.
  Time domain information: Time information of a corresponding RACH resource. Time domain information may include the following elements:
  i. A slot index and a frame number to which a corresponding RACH resource belongs;
  ii. Type information of a slot to which a corresponding RACH resource belongs, i.e., type information of a RACH slot; and/or
  iii. A symbol location in a slot to which a corresponding RACH resource belongs. Information indicating a symbol location in a slot to which a RACH resource belongs may be information about a symbol number at which the RACH resource is started and a duration of the RACH resource (e.g., the number of symbols). Alternatively, the information indicating the symbol location in a slot to which the RACH resource belongs may be information indicating the location of a RACH resource in order within a RACH slot. The number of RACH resources and the number of symbols within the RACH slot may be inferred by the UE through the RACH preamble format and the UE may identify, through the above type information of the RACH slot, a location of a symbol at which the RACH resource is started in a slot. This information, for example, a RACH resource unit number in a slot (i.e. a RACH resource in a RACH slot) with reference to FIGS. 33 to 35, may be signaled as follows according to the length (i.e., duration) of the RACH preamble format:
    (a) omittable in the case of a 12-symbol preamble format
    (b) 1 bit (0 or 1) in the case of a 6-symbol preamble format
    (c) 2 bits in the case of a 4-symbol preamble format
    (d) 2 bits in the case of a 3-symbol preamble format
    (e) 3 bits in the case of a 2-symbol preamble format
    (f) 4 bits in the case of a 1-symbol preamble format
  Frequency domain information: Frequency location information of a corresponding RACH resource. For the purpose of indicating a reference point of a frequency location of a RACH resource, information about the lowest (or highest) frequency location at which the RACH resource can be located may be signaled. For example, the above-described frequency location at which a RACH resource block is started is signaled.

The frequency location information of the RACH resource may be signaled as RACH resource common information within a RACH configuration. Bandwidth of the RACH resource, i.e., a RACH bandwidth, is signaled. Alternatively, a subband size of the RACH resource, i.e., the RACH bandwidth, may be determined depending upon a RACH preamble format. A RACH bandwidth when a long sequence based preamble is used and a RACH bandwidth when a short sequence based preamble is used may be differently determined. That is, if a preamble format is signaled with respect to each RACH resource or each RACH resource group, the UE may easily identify the RACH bandwidth of the long sequence based preamble and the RACH bandwidth of the short sequence based preamble, in consideration of an SCS.

Figure 36:
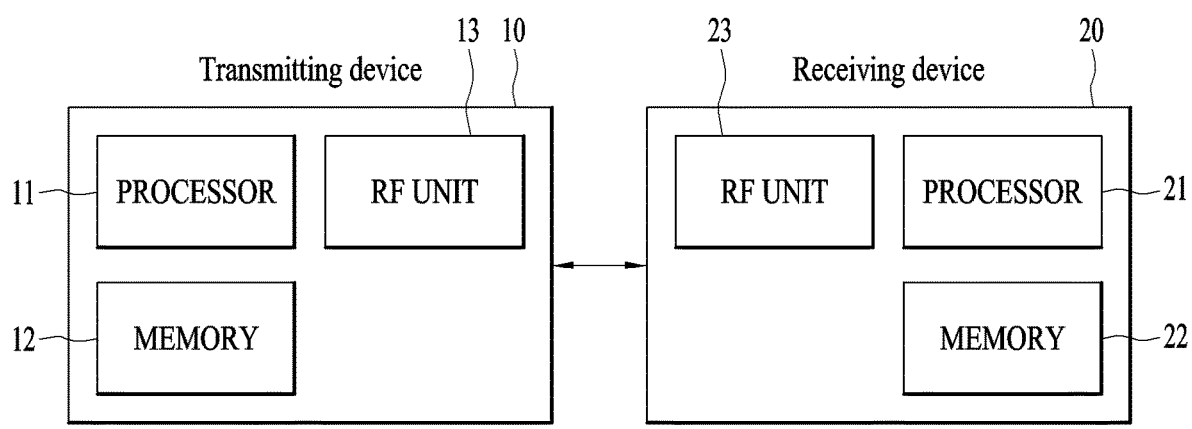
FIG. 36 is a block diagram illustrating elements of a transmitting device 10 and a receiving device 20 for implementing the present invention.

FIG. 36 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas. In the present invention, the RF unit is also referred to as a transceiver.

In the present invention, the RF units 13 and 23 may support Rx BF and Tx BF. For example, in the present invention, the RF units 13 and 23 may be configured to perform the function illustrated in FIG. 3.

In the embodiments of the present invention, a UE operates as the transmitting device 10 in UL and as the receiving device 20 in DL. In the embodiments of the present invention, a gNB operates as the receiving device 20 in UL and as the transmitting device 10 in DL. Hereinafter, a processor, a transceiver, and a memory included in the UE will be referred to as a UE processor, a UE transceiver, and a UE memory, respectively, and a processor, a transceiver, and a memory included in the gNB will be referred to as a gNB processor, a gNB transceiver, and a gNB memory, respectively.

The gNB processor of the present invention controls the gNB transceiver to transmit RACH configuration information according to the present invention. The RACH configuration information may indicate a preamble format. The preamble format is one of preamble formats according to the present invention. The RACH configuration information may include information indicating a slot in which a RACH preamble can be transmitted, i.e., a slot in which a RACH resource is configured (hereinafter, a RACH slot). The RACH slot information may include information indicating the number of RACH time resources within the RACH slot. The RACH configuration information may include preamble sequence information capable of being used in the RACH resource. The gNB processor may control the gNB transceiver to receive a signal in the RACH resource within the RACH slot. The gNB processor may attempt to detect the RACH preamble according to a preamble format corresponding to the RACH resource. For example, if the RACH configuration information indicates preamble format 1-A1 (Table 9 to Table 12), the gNB processor may attempt to detect a RACH preamble corresponding to preamble format 1-A1. As another example, if the RACH configuration information indicates a preamble format which is a combination of preamble formats A1 and B proposed in the present invention, the gNB processor may attempt to detect the RACH preamble according to preamble format A1 in a RACH resource other than the last RACH resource among consecutive RACH resources in the RACH slot and attempt to detect the RACH preamble according to preamble B in the last RACH resource.

The UE transceiver of the present invention receives the RACH configuration information and the UE processor controls the UE transceiver to transmit the RACH preamble based on the RACH configuration information. For example, if the UE transceiver receives the RACH configuration information including preamble format information indicating preamble format A1 proposed in the present invention, the UE processor controls the UE transceiver to transmit a RACH preamble of preamble format A1. The RACH preamble includes a CP part and a sequence part in the time domain. The UE processor generates the RACH preamble to match a preamble format according to the preamble formation information in the RACH configuration information and controls the UE transceiver to transmit the RACH preamble. For example, if the preamble format indicated by the RACH configuration information is preamble format A1, the UE processor may generate the RACH preamble such that a CP length of the RACH preamble is N times a CP length $N_{CP}$ of an OFDM symbol for data using the same SCS as an SCS used for the RACH preamble. Herein, N may be a value greater than 1, indicating the number of OFDM symbols used for RACH preamble transmission. For example, referring to Table 9 to Table 12, the UE processor may generate the RACH preamble such that N=2 upon receiving RACH configuration information indicating preamble format 1-A1, N=4 upon receiving RACH configuration information indicating preamble format 2-A1, and N=6 upon receiving RACH configuration information indicating preamble format 3-A1. The length of a sequence part of the RACH preamble increases in proportion to N. The UE processor may generate the sequence part that includes a length-139 ZC sequence N times. In the case of preamble format A1 or A2 in the present invention, the UE processor may generate the RACH preamble such that the length of the RACH preamble is to be N times the length of an OFDM symbol used for data having the same SCS as an SCS used for the RACH preamble. The UE processor may control the UE transceiver to transmit the RACH preamble aligned with a boundary of N OFDM symbols used for data. For example, the UE processor may generate the RACH preamble such that the RACH preamble of preamble format A1 is equal to a total length of N OFDM symbols used to transmit the RACH preamble and controls the UE transceiver to transmit the RACH preamble at a timing at which the set of the N OFDM symbols are started.

The preamble information in the RACH configuration information may indicate a combination of preamble format A1 or A2 and preamble format B. For example, if a combination of preamble format 1-A1 and preamble format 1-B is indicated, the UE generates a RACH preamble according to preamble format 1-A1 when an RACH resource to be used for RACH transmission is not the last RACH resource in the time domain of a RACH slot and controls the UE transceiver to transmit the RACH preamble in the RACH resource. In contrast, the UE generates a RACH preamble according to preamble format 1-B when the RACH resource used for RACH transmission is the last RACH resource in the time domain of the RACH slot and controls the UE transceiver to transmit the RACH preamble in the RACH resource. The UE processor controls the UE transceiver to transmit the RACH preamble in a RACH resource linked to an SS block detected in a cell. A plurality of SS blocks may be transmitted in a cell. The UE processor may select an SS block according to a specific criterion from among detected SS block(s) and use a RACH resource associated with the selected SS block for transmission of the RACH preamble.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

While the method of transmitting a RACH and the apparatus therefor have been described focusing on an example applied to the 5G NewRAT system, the method and apparatus are applicable to various wireless communication systems in addition to the 5G NewRAT system.

The invention claimed is:

1. A method of transmitting a random access channel (RACH) preamble by a user equipment in a wireless communication system, the method comprising:
   receiving configuration information that comprises preamble format information; and
   transmitting, in a RACH resource in a slot, a RACH preamble with a first format or a RACH preamble with a second format, based on the preamble format information indicating a combination of the first format and the second format,
   wherein the RACH resource has a length of N orthogonal frequency division multiplexing (OFDM) symbols in a time domain, where N is a positive integer greater than 1,
   wherein the RACH preamble with the first format includes a single cyclic prefix (CP) part and a single sequence part in the time domain,
   wherein the single sequence part is arranged in the time domain after an entirety of the single CP part in the RACH preamble with the first format,
   wherein the RACH preamble with the first format is transmitted such that: a length of the single CP part of the RACH preamble with the first format plus a length of the single sequence part of the RACH preamble with the first format is equal to a total length of the N OFDM symbols in the time domain,
   wherein a start and an end of the RACH preamble with the first format are aligned, respectively, with a start and an end of the N OFDM symbols in the time domain, wherein the RACH preamble with the second format includes a CP part and a sequence part in the time domain, and the sequence part of the RACH preamble with the second format is followed by a guard time with no signal, wherein based on the RACH resource being not a last RACH resource among RACH resources of the slot in the time domain, the RACH preamble with the first format is transmitted, and wherein based on the RACH resource being the last RACH resource among the RACH resources of the slot in the time domain, the RACH preamble with the second format is transmitted.

2. The method of claim 1, wherein the first format specifies the length of the single CP part and the length of the single sequence part.

3. The method of claim 1, wherein the first format is one among a plurality of preamble formats, and
wherein the plurality of preamble formats specify different lengths of the single CP part and different lengths of the single sequence part.

4. The method of claim 1, wherein the length of the single sequence part of the RACH preamble with the first format is equal to $N*N_S$, where $N_S$ is equal to a length of a data portion of each OFDM symbol in the time domain, and
wherein the length of the single CP part of the RACH preamble with the first format is equal to the total length of the N OFDM symbols minus $N*N_S$.

5. The method of claim 1, wherein a time duration of the single CP part is $N*144*T$, and a time duration of the single sequence part is $N*2048*T$, where T is a sampling time based on a subcarrier spacing.

6. The method of claim 5, wherein $144*T$ is equal to $N_{CP}$, where $N_{CP}$ is a length of a CP portion of an OFDM symbol, and
wherein $2048*T$ is equal to a length of a data portion of each OFDM symbol.

7. The method of claim 1, wherein N is equal to one of 2, 4, or 6.

8. The method of claim 1, wherein the single sequence part of the RACH preamble with the first format comprises a preamble sequence that has a sequence length of $N*139$.

9. The method of claim 1, wherein the configuration information further comprises information regarding a slot that is used for the RACH preamble.

10. A user equipment (UE) comprising:
at least one transceiver;
at least one processor; and
at least one computer memory operably connectable to the at least one processor and storing instructions that, when executed, cause the at least one processor to perform operations comprising:
receiving, through the at least one transceiver, configuration information that comprises preamble format information;
transmitting, in a random access channel (RACH) resource in a slot, a RACH preamble with a first format or a RACH preamble with a second format, based on the preamble format information indicating a combination of the first format and the second format,
wherein the RACH resource has a length of N orthogonal frequency division multiplexing (OFDM) symbols in a time domain, where N is a positive integer greater than 1,
wherein the RACH preamble with the first format includes a single cyclic prefix (CP) part and a single sequence part in the time domain, wherein the single sequence part is arranged in the time domain after an entirety of the single CP part in the RACH preamble with the first format, and wherein the RACH preamble with the first format is transmitted such that: a length of the single CP part of the RACH preamble with the first format plus a length of the single sequence part of the RACH preamble with the first format is equal to a total length of the N OFDM symbols in the time domain, wherein a start and an end of the RACH preamble with the first format are aligned, respectively, with a start and an end of the N OFDM symbols in the time domain, wherein the RACH preamble with the second format includes a CP part and a sequence part in the time domain, and the sequence part of the RACH preamble with the second format is followed by a guard time with no signal, wherein based on the RACH resource being not a last RACH resource among RACH resources of the slot in the time domain, the RACH preamble with the first format is transmitted, and wherein based on the RACH resource being the last RACH resource among the RACH resources of the slot in the time domain, the RACH preamble with the second format is transmitted.

11. The UE of claim 10, wherein the first format specifies the length of the single CP part and the length of the single sequence part.

12. The UE of claim 10, wherein the first format is one among a plurality of preamble formats, and
wherein the plurality of preamble formats specify different lengths of the single CP part and different lengths of the single sequence part.

13. The UE of claim 10, wherein the length of the single sequence part of the RACH preamble with the first format is equal to $N*N_S$, where $N_S$ is equal to a length of a data portion of each OFDM symbol in the time domain, and
wherein the length of the single CP part of the RACH preamble with the first format is equal to the total length of the N OFDM symbols minus $N*N_S$.

14. The UE of claim 10, wherein a time duration of the single CP part is $N*144*T$, and a time duration of the single sequence part is $N*2048*T$, where T is a sampling time based on a subcarrier spacing.

15. The UE of claim 14, wherein $144*T$ is equal to $N_{CP}$, where $N_{CP}$ is a length of a CP portion of an OFDM symbol, and
wherein $2048*T$ is equal to a length of a data portion of each OFDM symbol.

16. The UE of claim 10, wherein N is equal to one of 2, 4, or 6.

17. A method of receiving a random access channel (RACH) preamble by a base station (BS) in a wireless communication system, the method comprising:
transmitting configuration information that comprises preamble format information;
attempting to detect, in a RACH resource in a slot, a RACH preamble with a first format or a RACH preamble with a second format, based on the preamble format information indicating a combination of the first format and the second format,
wherein the RACH resource has a length of N orthogonal frequency division multiplexing (OFDM) symbols in a time domain, where N is a positive integer greater than 1, wherein the RACH preamble with the first format includes a single cyclic prefix (CP) part and a single sequence part in the time domain, wherein the single sequence part is arranged in the time domain after an entirety of the single CP part in the RACH preamble with the first format, wherein the RACH preamble with the first format is detected based on: a length of the single CP part of the RACH preamble with the first format plus a length of the single sequence part of the RACH preamble with the first format is equal to a total length of N orthogonal frequency division multiplexing (OFDM) symbols in the time domain, wherein a start and an end of the RACH preamble with the first format are aligned, respectively, with a start and an end of the N OFDM symbols in the time domain, wherein the RACH preamble with the second format includes a CP part and a sequence part in the time domain, and the sequence part of the RACH preamble with the second format is followed by a guard time with no signal, wherein based on the RACH resource being not a last RACH resource among RACH resources of the slot in the time domain, the RACH preamble with the first format is attempted to be detected, and wherein based on the RACH resource being the last RACH resource among the RACH resources of the slot in the time domain, the RACH preamble with the second format is attempted to be detected.

18. A base station (BS) comprising:
at least one transceiver;
at least one processor; and
at least one computer memory operably connectable to the at least one processor and storing instructions that, when executed, cause the at least one processor to perform operations comprising:
transmitting configuration information that comprises preamble format information; and
attempting to detect, in a random access channel (RACH) resource in a slot, a RACH preamble with a first format or a RACH preamble with a second format, based on the preamble format information indicating a combination of the first format and the second format, wherein the RACH resource has a length of N orthogonal frequency division multiplexing (OFDM) symbols in a time domain, where N is a positive integer greater than 1, wherein the RACH preamble with the first format includes a single cyclic prefix (CP) part and a single sequence part in the time domain, wherein the single sequence part is arranged in the time domain after an entirety of the single CP part in the RACH preamble with the first format, and wherein the RACH preamble with the first format is detected based on: a length of the single CP part of the RACH preamble with the first format plus a length of the single sequence part of the RACH preamble with the first format is equal to a total length of the N OFDM symbols in the time domain, wherein a start and an end of the RACH preamble with the first format are aligned, respectively, with a start and an end of the N OFDM symbols in the time domain, wherein the RACH preamble with the second format includes a CP part and a sequence part in the time domain, and the sequence part of the RACH preamble with the second format is followed by a guard time with no signal;

wherein based on the RACH resource being not a last RACH resource among RACH resources of the slot in the time domain, the RACH preamble with the first format is attempted to be detected, and wherein based on the RACH resource being the last RACH resource among the RACH resources of the slot in the time domain, the RACH preamble with the second format is attempted to be detected.

* * * * *